(12) United States Patent
Bogdanowicz et al.

(10) Patent No.: US 12,518,365 B2
(45) Date of Patent: *Jan. 6, 2026

(54) SYSTEM AND METHOD FOR DISPLAYING SUPER SATURATED COLOR

(71) Applicant: Baylor University, Waco, TX (US)

(72) Inventors: Mitchell J. Bogdanowicz, Somis, CA (US); James M. DeFilippis, Pacific Palisades, CA (US); Corey P. Carbonara, Waco, TX (US); Michael F. Korpi, Hewitt, TX (US); Gary B. Mandle, Los Altos, CA (US)

(73) Assignee: Baylor University, Waco, TX (US)

( * ) Notice: Subject to any disclaimer, the term of this patent is extended or adjusted under 35 U.S.C. 154(b) by 161 days.

This patent is subject to a terminal disclaimer.

(21) Appl. No.: 18/495,294

(22) Filed: Oct. 26, 2023

(65) Prior Publication Data

US 2024/0054624 A1    Feb. 15, 2024

Related U.S. Application Data

(63) Continuation of application No. 17/985,560, filed on Nov. 11, 2022, now Pat. No. 11,816,819, which is a (Continued)

(51) Int. Cl.
*G09G 5/00*    (2006.01)
*G06T 5/92*    (2024.01)
*G09G 5/06*    (2006.01)

(52) U.S. Cl.
CPC ............... *G06T 5/92* (2024.01); *G09G 5/006* (2013.01); *G09G 5/06* (2013.01);
(Continued)

(58) Field of Classification Search
CPC ............ G06T 5/92; G06T 2207/20208; G09G 5/06; G09G 5/006
See application file for complete search history.

(56) References Cited

U.S. PATENT DOCUMENTS 6,769,772 B2    8/2004    Roddy et al.
7,598,961 B2    10/2009    Higgins
(Continued)

FOREIGN PATENT DOCUMENTS

EP              635971 B1       10/1999
WO          2010008468 A1       1/2010

OTHER PUBLICATIONS

Krawczyk et al. ("Brightness Adjustment for HDR and Tone Mapped Images," 15th Pacific Conference on Computer Graphics and Applications; Date of Conference: Oct. 29-Nov. 2, 2007) (Year: 2007).

*Primary Examiner* — Antonio A Caschera
(74) *Attorney, Agent, or Firm* — NEO IP

(57) ABSTRACT

Systems and methods for displaying super saturated color. Image data for display on a display or viewing device with a potential white luminance in a standard system with a maximum luminance is processed such that colors near the white point are reduced to a limited luminance. As the chroma of the displayed color is increased, a luminance attenuation is decreased. The scaling of the reduction is operable to be a linear function, a non-linear function, or any other function.

20 Claims, 64 Drawing Sheets
(45 of 64 Drawing Sheet(s) Filed in Color)

System 1

Related U.S. Application Data continuation-in-part of application No. 17/748,655, filed on May 19, 2022, now Pat. No. 11,501,419.

(52) U.S. Cl.
CPC .............. *G06T 2207/20208* (2013.01); *G09G 2320/0666* (2013.01); *G09G 2340/0428* (2013.01); *G09G 2340/06* (2013.01); *G09G 2360/16* (2013.01); *G09G 2370/02* (2013.01)

(56) References Cited

U.S. PATENT DOCUMENTS

| | | |
|---|---|---|
| 7,916,939 B2 | 3/2011 | Roth et al. |
| 8,081,835 B2 | 12/2011 | Elliott et al. |
| 8,599,226 B2 | 12/2013 | Ben-Chorin et al. |
| 8,848,098 B2 | 9/2014 | Satou et al. |
| 8,861,843 B2 | 10/2014 | Kitajima |
| 9,230,509 B2 | 1/2016 | Van Der Vleuten |
| 9,373,305 B2 | 6/2016 | Kawaguchi |
| 10,222,263 B2 | 3/2019 | Shigezane |
| 10,607,527 B1 | 3/2020 | Mandle |
| 11,501,419 B1* | 11/2022 | Bogdanowicz ........ G09G 5/026 |
| 11,816,819 B2* | 11/2023 | Bogdanowicz ........ G09G 5/026 |
| 2005/0018226 A1 | 1/2005 | Chiba |
| 2010/0232691 A1 | 9/2010 | Sekiguchi et al. |
| 2013/0071023 A1 | 3/2013 | Sasaki |
| 2013/0278993 A1 | 10/2013 | Heikenfeld et al. |
| 2015/0221280 A1* | 8/2015 | Van Der Vleuten ...... G06T 3/10 382/167 |
| 2016/0212433 A1 | 7/2016 | Zhu et al. |
| 2017/0339418 A1 | 11/2017 | Ramasubramonian et al. |
| 2020/0105221 A1 | 4/2020 | Marcu et al. |
| 2021/0035487 A1 | 2/2021 | Bogdanowicz et al. |
| 2022/0198653 A1 | 6/2022 | Yin et al. |
| 2023/0084711 A1 | 3/2023 | Bogdanowicz et al. |

\* cited by examiner

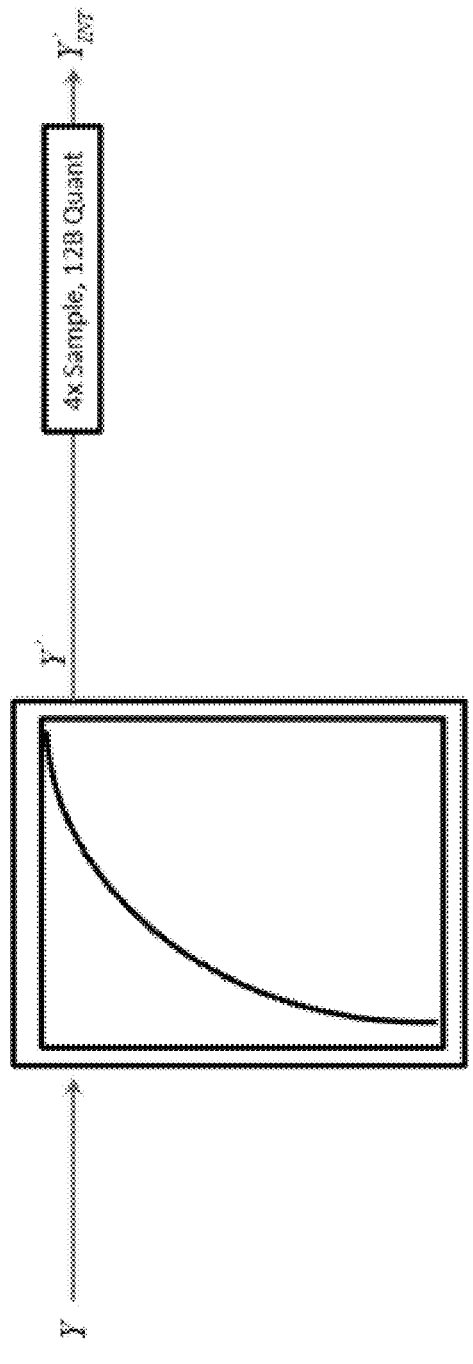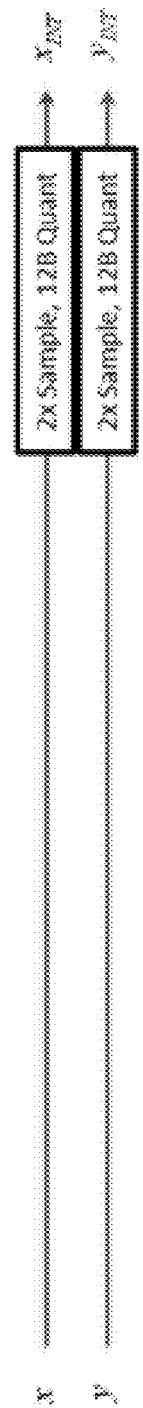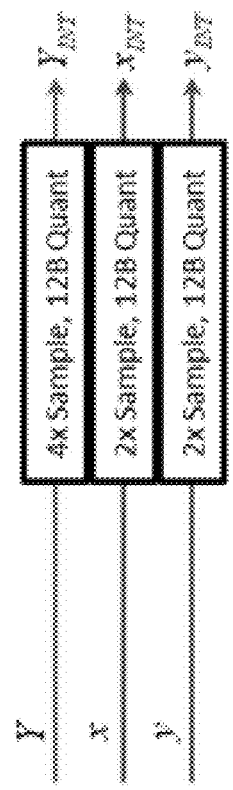
FIG. 17
FIG. 18

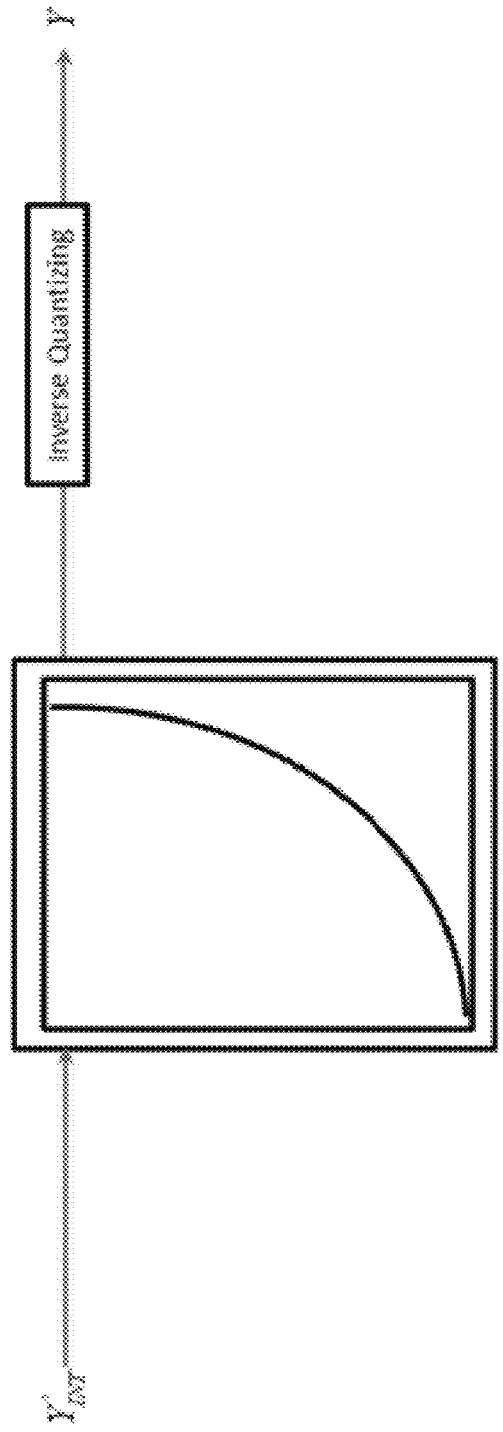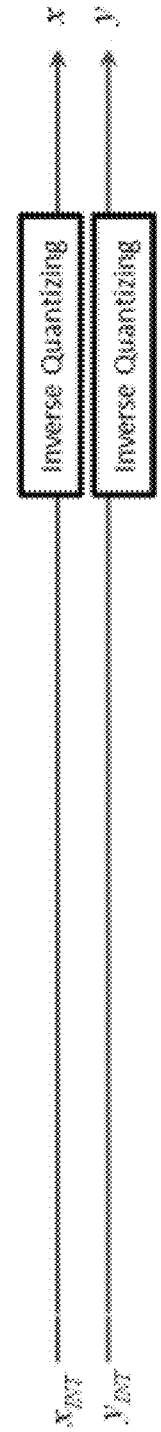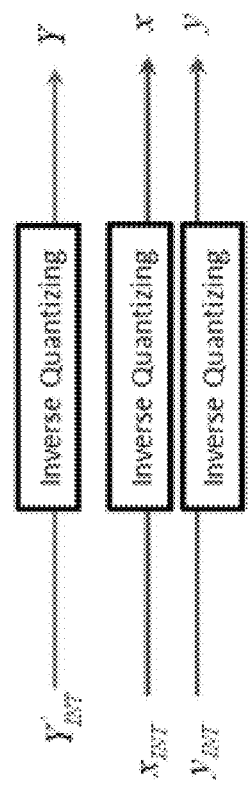
FIG. 26A
FIG. 26B

| Primary | RGB set | | Cartesian TLx TLy set | | Polar TLx TLy set | | Chroma (C) saturation |
|---|---|---|---|---|---|---|---|
| R | R | 1 | TLx | 1.0 | Radius | 1 | 1 |
| | G | 0 | | | | | |
| | B | 0 | TLy | 0.0 | Hue angle | 0° | |
| G | R | 0 | TLx | -0.5 | Radius | 1 | 1 |
| | G | 1 | | | | | |
| | B | 0 | TLy | 0.9 | Hue angle | 120° | |
| B | R | 0 | TLx | -0.5 | Radius | 1 | 1 |
| | G | 0 | | | | | |
| | B | 1 | TLy | -0.9 | Hue angle | 240° | |
| C | R | 0 | TLx | -1.0 | Radius | 1 | 1 |
| | G | 1 | | | | | |
| | B | 1 | TLy | 0.0 | Hue angle | 180° | |
| M | R | 1 | TLx | 0.5 | Radius | 1 | 1 |
| | G | 0 | | | | | |
| | B | 1 | TLy | -0.9 | Hue angle | 300° | |
| Y | R | 1 | TLx | 0.5 | Radius | 1 | 1 |
| | G | 1 | | | | | |
| | B | 0 | TLy | 0.9 | Hue angle | 60° | |
| W | R | 1 | TLx | 0.0 | Radius | 1 | $1 \times 10^{-7}$ |
| | G | 1 | | | | | |
| | B | 1 | TLy | 0.0 | Hue angle | 0° | |
| Test | R | 0.617 | TLx | 0.3 | Radius | 0.3205 | 0.3205 |
| | G | 0.342 | | | | | |
| | B | 0.265 | TLy | 0.1 | Hue angle | 12° | |

FIG. 52A

| C | C^2 | C^3 | C^4 | C^5 |
|---|---|---|---|---|
| 0.05 | 0.002500 | 0.000125 | 0.000006 | 0.000000 |
| 0.10 | 0.010000 | 0.001000 | 0.000100 | 0.000010 |
| 0.15 | 0.022500 | 0.003375 | 0.000506 | 0.000076 |
| 0.20 | 0.040000 | 0.008000 | 0.001600 | 0.000320 |
| 0.25 | 0.062500 | 0.015625 | 0.003906 | 0.000977 |
| 0.30 | 0.090000 | 0.027000 | 0.008100 | 0.002430 |
| 0.35 | 0.122500 | 0.042875 | 0.015006 | 0.005252 |
| 0.40 | 0.160000 | 0.064000 | 0.025600 | 0.010240 |
| 0.45 | 0.202500 | 0.091125 | 0.041006 | 0.018453 |
| 0.50 | 0.250000 | 0.125000 | 0.062500 | 0.031250 |
| 0.55 | 0.302500 | 0.166375 | 0.091506 | 0.050328 |
| 0.60 | 0.360000 | 0.216000 | 0.129600 | 0.077760 |
| 0.65 | 0.422500 | 0.274625 | 0.178506 | 0.116029 |
| 0.70 | 0.490000 | 0.343000 | 0.240100 | 0.168070 |
| 0.75 | 0.562500 | 0.421875 | 0.316406 | 0.237305 |
| 0.80 | 0.640000 | 0.512000 | 0.409600 | 0.327680 |
| 0.85 | 0.722500 | 0.614125 | 0.522006 | 0.443705 |
| 0.90 | 0.810000 | 0.729000 | 0.656100 | 0.590490 |
| 0.95 | 0.902500 | 0.857375 | 0.814506 | 0.773781 |
| 1.00 | 1.000000 | 1.000000 | 1.000000 | 1.000000 | skin color (rows 0.15–0.30)

FIG. 53A

SYSTEM AND METHOD FOR DISPLAYING SUPER SATURATED COLOR

CROSS REFERENCES TO RELATED APPLICATIONS

This application is a continuation of U.S. patent application Ser. No. 17/985,560, filed Nov. 11, 2022, which is a continuation-in-part of U.S. patent application Ser. No. 17/748,655, filed May 19, 2022, which claims priority from U.S. Provisional Patent Application No. 63/196,539, filed Jun. 3, 2021. Each of the above listed applications is incorporated herein by reference in its entirety.

BACKGROUND OF THE INVENTION

1. Field of the Invention

The present invention relates to color systems, and more specifically to systems and methods for displaying super saturated color in red, green, and blue (RGB) systems and multi-primary systems.

2. Description of the Prior Art

It is generally known in the prior art to provide for an increased color gamut system within a display. It is also generally known in the prior art to provide tone curves while processing images. Further, it is also generally known in the prior art to convert from a first luminance range to a second luminance range.

Prior art patent documents include the following:

U.S. Pat. No. 10,222,263 for RGB value calculation device by inventor Yasuyuki Shigezane, filed Feb. 6, 2017 and issued Mar. 5, 2019, is directed to a microcomputer that equally divides the circumference of an RGB circle into 6×n (n is an integer of 1 or more) parts, and calculates an RGB value of each divided color. (255, 0, 0) is stored as a reference RGB value of a reference color in a ROM in the microcomputer. The microcomputer converts the reference RGB value depending on an angular difference of the RGB circle between a designated color whose RGB value is to be found and the reference color, and assumes the converted RGB value as an RGB value of the designated color.

U.S. Pat. No. 9,373,305 for Semiconductor device, image processing system and program by inventor Hiorfumi Kawaguchi, filed May 29, 2015 and issued Jun. 21, 2016, is directed to an image process device including a display panel operable to provide an input interface for receiving an input of an adjustment value of at least a part of color attributes of each vertex of n axes (n is an integer equal to or greater than 3) serving as adjustment axes in an RGB color space, and an adjustment data generation unit operable to calculate the degree of influence indicative of a following index of each of the n-axis vertices, for each of the n axes, on a basis of distance between each of the n-axis vertices and a target point which is an arbitrary lattice point in the RGB color space, and operable to calculate adjusted coordinates of the target point in the RGB color space.

U.S. Publication No. 20130278993 for Color-mixing bi-primary color systems for displays by inventor Heikenfeld, et.al, filed Sep. 1, 2011 and published Oct. 24, 2013, is directed to a display pixel. The pixel includes first and second substrates arranged to define a channel. A fluid is located within the channel and includes a first colorant and a second colorant. The first colorant has a first charge and a color. The second colorant has a second charge that is opposite in polarity to the first charge and a color that is complimentary to the color of the first colorant. A first electrode, with a voltage source, is operably coupled to the fluid and configured to moving one or both of the first and second colorants within the fluid and alter at least one spectral property of the pixel.

U.S. Pat. No. 8,599,226 for Device and method of data conversion for wide gamut displays by inventor Ben-Chorin, et. al, filed Feb. 13, 2012 and issued Dec. 3, 2013, is directed to a method and system for converting color image data from a, for example, three-dimensional color space format to a format usable by an n-primary display, wherein n is greater than or equal to 3. The system may define a two-dimensional sub-space having a plurality of two-dimensional positions, each position representing a set of n primary color values and a third, scaleable coordinate value for generating an n-primary display input signal. Furthermore, the system may receive a three-dimensional color space input signal including out-of range pixel data not reproducible by a three-primary additive display, and may convert the data to side gamut color image pixel data suitable for driving the wide gamut color display.

U.S. Pat. No. 8,081,835 for Multiprimary color sub-pixel rendering with metameric filtering by inventor Elliot, et. al, filed Jul. 13, 2010 and issued Dec. 20, 2011, is directed to systems and methods of rendering image data to multiprimary displays that adjusts image data across metamers as herein disclosed. The metamer filtering may be based upon input image content and may optimize sub-pixel values to improve image rendering accuracy or perception. The optimizations may be made according to many possible desired effects. One embodiment comprises a display system comprising: a display, said display capable of selecting from a set of image data values, said set comprising at least one metamer; an input image data unit; a spatial frequency detection unit, said spatial frequency detection unit extracting a spatial frequency characteristic from said input image data; and a selection unit, said unit selecting image data from said metamer according to said spatial frequency characteristic.

U.S. Pat. No. 7,916,939 for High brightness wide gamut display by inventor Roth, et. al, filed Nov. 30, 2009 and issued Mar. 29, 2011, is directed to a device to produce a color image, the device including a color filtering arrangement to produce at least four colors, each color produced by a filter on a color filtering mechanism having a relative segment size, wherein the relative segment sizes of at least two of the primary colors differ.

U.S. Pat. No. 6,769,772 for Six color display apparatus having increased color gamut by inventor Roddy, et. al, filed Oct. 11, 2002 and issued Aug. 3, 2004, is directed to a display system for digital color images using six color light sources or two or more multicolor LED arrays or OLEDs to provide an expanded color gamut. Apparatus uses two or more spatial light modulators, which may be cycled between two or more color light sources or LED arrays to provide a six-color display output. Pairing of modulated colors using relative luminance helps to minimize flicker effects.

U.S. Pat. No. 7,598,961 for Method and apparatus for converting from a source color space to a target color space by inventor Higgins, filed Oct. 21, 2003 and issued Oct. 6, 2009, is directed to systems and methods to effect a multiple mode display system that may accept multiple input image data formats and output several possible image data formats. One method is disclosed for converting from a source color space to a target color space. The source color space results from a combination of N primary color points and the target color space resulting from combination of a N+1 or more primary color points in the target color space, wherein N is an integer.

U.S. Patent Publication No. 20170339418 for Methods and systems for generating and processing content color volume messages for video by inventors Ramasubramonian, et al., filed May 12, 2017 and published Nov. 23, 2017, is directed to systems, methods, and computer readable media for processing content color volume messages. In some examples, video data is obtained. The video data can include video data obtained from a camera, encoded video data, or decoded video data. Content color volume information associated with the video data is processed. The content color volume information is indicative of the content color volume of one or more pictures of the video data. For example, the content color volume information includes a first luminance value associated with a minimum luminance of the one or more pictures, a second luminance value associated with a maximum luminance of the one or more pictures, and one or more chromaticity coordinates of one or more color primaries describing a color gamut of the one or more pictures.

U.S. Pat. No. 8,848,098 for Imaging apparatus, imaging method, and program by inventors Satou, et al., filed Sep. 11, 2012 and issued Sep. 30, 2014, is directed to an imaging apparatus includes an image analysis unit obtaining brightness information for respective hue regions from an image signal of a picked-up image and an exposure control unit carrying out exposure control based on the brightness information obtained in the image analysis unit.

U.S. Pat. No. 8,861,843 for Image processing apparatus, image processing method and program by inventor Kitajima, filed Nov. 30, 2010 and issued Oct. 14, 2014, is directed to a method wherein the chroma of each block is calculated from color difference signals to calculate the number of blocks having chroma equal to or greater than a predetermined threshold from among the blocks that are not part of a detected face area, and to calculate a high-chroma block ratio of the high-chroma blocks (having their chroma equal to or greater than the predetermined threshold), to the number of blocks that are not in the face area. If the average chroma and the high-chroma block ratio match or exceed predetermined values, the scene is discriminated as a vivid color scene. The threshold of the criterion of the high-chroma block ratio is made to be small, if the scene has been discriminated as a vivid color scene in the past, while if the scene has not been discriminated as being such a scene, the threshold is made to be large.

U.S. Pat. No. 9,230,509 for Luminance changing image processing with color constraints by inventor Van Der Vleuten, filed Sep. 17, 2013 and issued Jan. 5, 2016, is directed to an image color processing apparatus arranged to transform an input color (L,x,y) of a pixel specified in a color representation corresponding to a first luminance dynamic range into an output color (L*,x,y) of a pixel specified in a color representation corresponding to a second luminance dynamic range, which first and second dynamic ranges differ in extent by at least a multiplicative factor 1.5, comprising a tone mapping deformation unit arranged to determine on the basis of an input tone mapping and a quantity linearly related to the luminance (L) of the input color, an adjusted output luminance (L*, 309), wherein the determining is arranged so that the adjusted output luminance (L*, 309) obtained by applying the input tone mapping to the input luminance (L) of all possible input luminances in its extent of valid values [0,1] giving the highest output (L*,L_HDR), is not higher than a maximum luminance Lmax(x,y) which for the chromatic coordinates (x,y) of the input color is maximally achievable in the gamut corresponding to the second luminance dynamic range for those chromatic coordinates (x,y).

SUMMARY OF THE INVENTION

It is an object of this invention to provide an enhancement to the current RGB systems or a replacement for them. It is also an object of this invention to provide super saturated colors for RGB and multi-primary systems.

In one embodiment, the present invention provides a system for displaying a primary color system, including a set of image data including a set of primary color signals, wherein the set of primary color signals corresponds to a set of values in a color space, wherein the set of values in the color space includes two colorimetric coordinates and a luminance, an image data converter, wherein the image data converter includes a digital interface, and wherein the digital interface is operable to encode and decode the set of values in the color space, and at least one viewing device, wherein the at least one viewing device and the image data converter are in communication, wherein the encode and the decode includes transportation of processed data, wherein the processed data includes data related to a relative luminance and the two colorimetric coordinates, wherein a white value corresponding to a white point of the at least one viewing device has a limited luminance, wherein the limited luminance is lower than a maximum luminance value of the at least one viewing device, wherein the relative luminance corresponding to the two colorimetric coordinates is greater than the limited luminance, and wherein the image data converter is operable to convert the set of image data for display on the at least one viewing device.

In another embodiment, the present invention provides a system for displaying a primary color system, including a set of image data including a set of primary color signals, wherein the set of primary color signals corresponds to a set of values in a color space, wherein the set of values in the color space includes two colorimetric coordinates and a luminance, an image data converter, wherein the image data converter includes a digital interface, and wherein the digital interface is operable to encode and decode the set of values in the color space, a set of Session Description Protocol (SDP) parameters, and at least one viewing device, wherein the at least one viewing device and the image data converter are in communication, wherein the encode and the decode includes transportation of processed data, wherein the processed data includes a relative luminance and the two colorimetric coordinates, wherein a white value corresponding to a white point of the at least one viewing device has a limited luminance, wherein the limited luminance is lower than a maximum luminance value of the at least one viewing device, wherein the relative luminance corresponding to the two colorimetric coordinates is greater than the limited luminance, and wherein the image data converter is operable to convert the set of image data for display on the at least one viewing device.

In yet another embodiment, the present invention provides a method for displaying a primary color system, including providing a set of image data including a set of primary color signals, wherein the set of primary color signals corresponds to a set of values in a color space, wherein the set of values in the color space includes two colorimetric coordinates and a luminance, encoding the set of image data in the color space using a digital interface of an image data converter, wherein the image data converter is in communication with at least one viewing device, processing a white value corresponding to a white point of the at least one viewing device to create a limited luminance, wherein the limited luminance is lower than a maximum luminance value of the at least one viewing device, decoding the set of image data in the color space using the digital interface of the image data converter, and the image data converter converting the set of image data for display on the at least one viewing device, wherein the encoding and the decoding include transportation of processed data, wherein the processed data includes data related to a relative luminance and the two colorimetric coordinates, wherein the relative luminance is greater than the limited luminance.

These and other aspects of the present invention will become apparent to those skilled in the art after a reading of the following description of the preferred embodiment when considered with the drawings, as they support the claimed invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 17 illustrates one embodiment of a 4:2:2 Yxy encode with an NLTF.

FIG. 18 illustrates one embodiment of a 4:2:2 Yxy encode without an NLTF.

FIG. 26A illustrates one embodiment of a Yxy decode with an inverse non-linear transfer function ($NLTF^{-1}$) applied only to the Y channel.

FIG. 26B illustrates one embodiment of a Yxy decode without an $NLTF^{-1}$ applied to any of the channels.

FIG. 52A is a table of primary data including RGB set, cartesian TLx and TLy set, polar TLx and TLy set, and Chroma (C) saturation values.

FIG. 53A is a table of values for C raised to various powers (e.g., 1-5).

DETAILED DESCRIPTION

Figure 1:
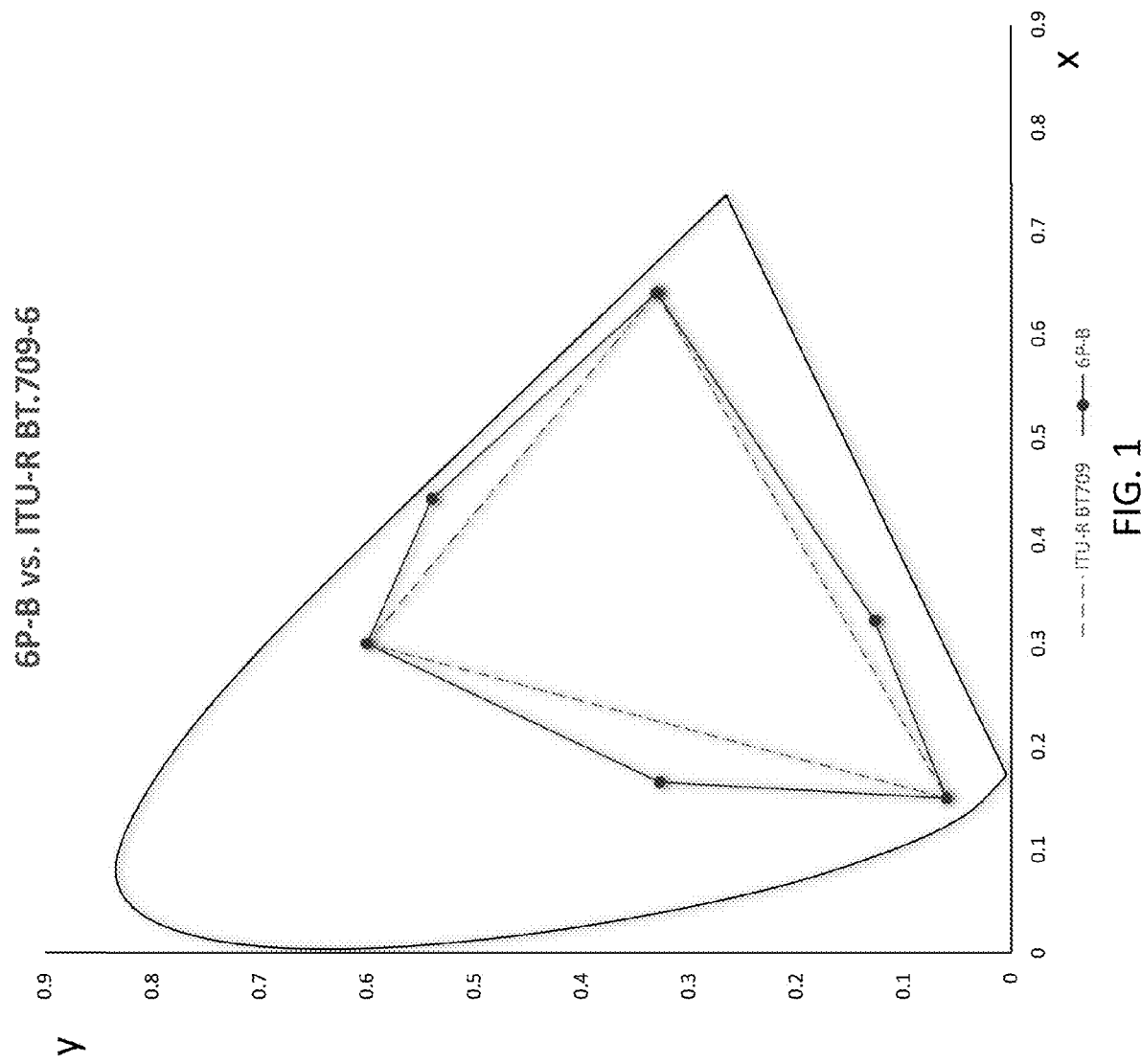
FIG. 1 illustrates one embodiment of a six primary system including a red primary, a green primary, a blue primary, a cyan primary, a magenta primary, and a yellow primary ("6P-B") compared to ITU-R BT.709-6.

The present invention relates to color systems, and more specifically to systems and methods for displaying super saturated color in RGB systems and multi-primary systems.

In one embodiment, the present invention provides a system for displaying a primary color system, including a set of image data including a set of primary color signals, wherein the set of primary color signals corresponds to a set of values in a color space, wherein the set of values in the color space includes two colorimetric coordinates and a luminance, an image data converter, wherein the image data converter includes a digital interface, and wherein the digital interface is operable to encode and decode the set of values in the color space, and at least one viewing device, wherein the at least one viewing device and the image data converter are in communication, wherein the encode and the decode includes transportation of processed data, wherein the processed data includes data related to a relative luminance and the two colorimetric coordinates, wherein a white value corresponding to a white point of the at least one viewing device has a limited luminance, wherein the limited luminance is lower than a maximum luminance value of the at least one viewing device, wherein the relative luminance corresponding to the two colorimetric coordinates is greater than the limited luminance, and wherein the image data converter is operable to convert the set of image data for display on the at least one viewing device. In one embodiment, the at least one viewing device is operable to display the primary color system based on the set of image data, wherein the primary color system displayed on the at least one viewing device is based on the set of image data. In one embodiment, the image data converter is operable to convert the set of primary color signals to the set of values in the color space. In one embodiment, the image data converter is operable to convert the set of values in the color space to a plurality of color gamuts. In one embodiment, the image data converter is operable to fully sample the processed data related to the relative luminance and subsample the processed data related to the two colorimetric coordinates. In one embodiment, the processed data related to the relative luminance and the two colorimetric coordinates are fully sampled. In one embodiment, the color space is Yxy, Yu'v', $IC_TC_P$, LMS, $YC_BC_R$, or $YP_BP_R$. In one embodiment, the encode includes converting the set of primary color signals to XYZ data and then converting the XYZ data to create the set of values in the color space. In one embodiment, the decode includes converting the processed data to XYZ data and then converting the XYZ data to a format operable to display on the at least one viewing device. In one embodiment, the luminance is converted to the relative luminance using at least one linear function, at least one non-linear function, and/or at least one lookup table (LUT). In one embodiment, the relative luminance is equal to or lower than the luminance. In one embodiment, the encode includes scaling of the two colorimetric coordinates, thereby creating scaled colorimetric coordinates, and wherein the decode includes rescaling of the scaled colorimetric coordinates. In one embodiment, the encode includes application of a data range reduction function with a value between about 0.25 and about 0.9 and/or the decode includes application of an inverse data range reduction function with a value between about 1.1 and about 4. In one embodiment, the primary color system is a Red, Green, and Blue (RGB) primary system or a multi-primary system. In one embodiment, the relative luminance increases as a distance of a chroma of the two colorimetric coordinates increases from the white point of the at least one viewing device. In one embodiment, the image data converter does not modify primary colors within a specified hue angle range and a specified chroma range.

In another embodiment, the present invention provides a system for displaying a primary color system, including a set of image data including a set of primary color signals, wherein the set of primary color signals corresponds to a set of values in a color space, wherein the set of values in the color space includes two colorimetric coordinates and a luminance, an image data converter, wherein the image data converter includes a digital interface, and wherein the digital interface is operable to encode and decode the set of values in the color space, a set of Session Description Protocol (SDP) parameters, and at least one viewing device, wherein the at least one viewing device and the image data converter are in communication, wherein the encode and the decode includes transportation of processed data, wherein the processed data includes a relative luminance and the two colorimetric coordinates, wherein a white value corresponding to a white point of the at least one viewing device has a limited luminance, wherein the limited luminance is lower than a maximum luminance value of the at least one viewing device, wherein the relative luminance corresponding to the two colorimetric coordinates is greater than the limited luminance, and wherein the image data converter is operable to convert the set of image data for display on the at least one viewing device. In one embodiment, the luminance is converted to the relative luminance using at least one linear function, at least one non-linear function, and/or at least one lookup table.

In yet another embodiment, the present invention provides a method for displaying a primary color system, including providing a set of image data including a set of primary color signals, wherein the set of primary color signals corresponds to a set of values in a color space, wherein the set of values in the color space includes two colorimetric coordinates and a luminance, encoding the set of image data in the color space using a digital interface of an image data converter, wherein the image data converter is in communication with at least one viewing device, processing a white value corresponding to a white point of the at least one viewing device to create a limited luminance, wherein the limited luminance is lower than a maximum luminance value of the at least one viewing device, decoding the set of image data in the color space using the digital interface of the image data converter, and the image data converter converting the set of image data for display on the at least one viewing device, wherein the encoding and the decoding include transportation of processed data, wherein the processed data includes data related to a relative luminance and the two colorimetric coordinates, wherein the relative luminance is greater than the limited luminance. In one embodiment, the luminance is converted to the relative luminance using at least one linear function, at least one non-linear function, and/or at least one lookup table (LUT).

The present invention relates to color systems. A multitude of color systems are known, but they continue to suffer numerous issues. As imaging technology is moving forward, there has been a significant interest in expanding the range of colors that are replicated on electronic displays. Enhancements to the television system have expanded from the early CCIR 601 standard to ITU-R BT.709-6, to SMPTE RP431-2, and ITU-R BT.2020. Each one has increased the gamut of visible colors by expanding the distance from the reference white point to the position of the Red (R), Green (G), and Blue (B) color primaries (collectively known as "RGB") in chromaticity space. While this approach works, it has several disadvantages. When implemented in content presentation, issues arise due to the technical methods used to expand the gamut of colors seen (typically using a more-narrow emissive spectrum), resulting in increased viewer metameric errors and requiring increased power due to lower illumination source. These issues increase both capital and operational costs.

With the current available technologies, displays are limited in respect to their range of color and light output. There are many misconceptions regarding how viewers interpret the display output technically versus real-world sensations viewed with the human eye. The reason we see more than just the three emitting primary colors is because the eye combines the spectral wavelengths incident on it into the three bands. Humans interpret the radiant energy (spectrum and amplitude) from a display and process it so that an individual color is perceived. The display does not emit a color or a specific wavelength that directly relates to the sensation of color. It simply radiates energy at the same spectrum which humans sense as light and color. It is the observer who interprets this energy as color.

When the CIE 2° standard observer was established in 1931, common understanding of color sensation was that the eye used red, blue, and green cone receptors (James Maxwell & James Forbes 1855). Later with the Munsell vision model (Munsell 1915), Munsell described the vision system to include three separate components: luminance, hue, and saturation. Using RGB emitters or filters, these three primary colors are the components used to produce images on today's modern electronic displays.

There are three primary physical variables that affect sensation of color. These are the spectral distribution of radiant energy as it is absorbed into the retina, the sensitivity of the eye in relation to the intensity of light landing on the retinal pigment epithelium, and the distribution of cones within the retina. The distribution of cones (e.g., L cones, M cones, and S cones) varies considerably from person to person.

Enhancements in brightness have been accomplished through larger backlights or higher efficiency phosphors. Encoding of higher dynamic ranges is addressed using higher range, more perceptually uniform electro-optical transfer functions to support these enhancements to brightness technology, while wider color gamuts are produced by using narrow bandwidth emissions. Narrower bandwidth emitters result in the viewer experiencing higher color saturation. But there can be a disconnect between how saturation is produced and how it is controlled. What is believed to occur when changing saturation is that increasing color values of a color primary represents an increase to saturation. This is not true, as changing saturation requires the variance of a color primary spectral output as parametric. There are no variable spectrum displays available to date as the technology to do so has not been commercially developed, nor has the new infrastructure required to support this been discussed.

Instead, the method that a display changes for viewer color sensation is by changing color luminance. As data values increase, the color primary gets brighter. Changes to color saturation are accomplished by varying the brightness of all three primaries and taking advantage of the dominant color theory.

Expanding color primaries beyond RGB has been discussed before. There have been numerous designs of multi-primary displays. For example, SHARP has attempted this with their four-color QUATTRON TV systems by adding a yellow color primary and developing an algorithm to drive it. Another four primary color display was proposed by Matthew Brennesholtz which included an additional cyan primary, and a six primary display was described by Yan Xiong, Fei Deng, Shan Xu, and Sufang Gao of the School of Physics and Optoelectric Engineering at the Yangtze University Jingzhou China. In addition, AU OPTRONICS has developed a five primary display technology. SONY has also recently disclosed a camera design featuring RGBCMY (red, green, blue, cyan, magenta, and yellow) and RGBCMYW (red, green, blue cyan, magenta, yellow, and white) sensors.

Actual working displays have been shown publicly as far back as the late 1990's, including samples from Tokyo Polytechnic University, Nagoya City University, and Genoa Technologies. However, all of these systems are exclusive to their displays, and any additional color primary information is limited to the display's internal processing.

Additionally, the Visual Arts System for Archiving and Retrieval of Images (VASARI) project developed a colorimetric scanner system for direct digital imaging of paintings. The system provides more accurate coloring than conventional film, allowing it to replace film photography. Despite the project beginning in 1989, technical developments have continued. Additional information is available at https://www.southampton.ac.uk/~km2/projs/vasari/ (last accessed Mar. 30, 2020), which is incorporated herein by reference in its entirety.

None of the prior art discloses developing additional color primary information outside of the display. Moreover, the system driving the display is often proprietary to the demonstration. In each of these executions, nothing in the workflow is included to acquire or generate additional color primary information. The development of a multi-primary color system is not complete if the only part of the system that supports the added primaries is within the display itself.

Referring now to the drawings in general, the illustrations are for the purpose of describing one or more preferred embodiments of the invention and are not intended to limit the invention thereto.

Additional details about multi-primary systems are available in U.S. Pat. Nos. 10,607,527; 10,950,160; 10,950,161; 10,950,162; 10,997,896; 11,011,098; and 11,017,708, U.S. Publication Nos. 20200402441, 20210027693, 20210020094, 20210035486, 20210035487, 20210043127, and 20210097923, and U.S. application Ser. No. 17/180,441, Ser. No. 17/182,775, Ser. No. 17/182,811, Ser. No. 17/182,858, Ser. No. 17/209,959, Ser. No. 17/225,734, and Ser. No. 17/727,372, each of which is incorporated herein by reference in its entirety.

In one embodiment, the super saturated color system is a red, green, and blue primary system. In another embodiment, the super saturated color system includes a multi-primary system. The multi-primary system of the present invention includes at least four primaries. The at least four primaries preferably include at least one red primary, at least one green primary, and/or at least one blue primary. In one embodiment, the at least four primaries include a cyan primary, a magenta primary, and/or a yellow primary. In one embodiment, the at least four primaries include at least one white emitter.

In one embodiment, the multi-primary system includes six primaries. In one preferred embodiment, the six primaries include a red primary, a green primary, a blue primary, a cyan primary, a magenta primary, and a yellow primary.

6P-B

6P-B is a color set that uses the same RGB values that are defined in the ITU-R BT.709-6 television standard. The gamut includes these RGB primary colors and then adds three more color primaries orthogonal to these based on the white point. The white point used in 6P-B is D65 (ISO 11664-2).

In one embodiment, the red primary has a dominant wavelength of 609 nm, the yellow primary has a dominant wavelength of 571 nm, the green primary has a dominant wavelength of 552 nm, the cyan primary has a dominant wavelength of 491 nm, and the blue primary has a dominant wavelength of 465 nm as shown in Table 1. In one embodiment, the dominant wavelength is approximately (e.g., within ±10%) the value listed in the table below. Alternatively, the dominant wavelength is within ±5% of the value listed in the table below. In yet another embodiment, the dominant wavelength is within ±2% of the value listed in the table below.

TABLE 1

| | x | y | u' | v' | λ |
|---|---|---|---|---|---|
| W (D65) | 0.3127 | 0.3290 | 0.1978 | 0.4683 | |
| R | 0.6400 | 0.3300 | 0.4507 | 0.5228 | 609 nm |
| G | 0.3000 | 0.6000 | 0.1250 | 0.5625 | 552 nm |
| B | 0.1500 | 0.0600 | 0.1754 | 0.1578 | 464 nm |
| C | 0.1655 | 0.3270 | 0.1041 | 0.4463 | 491 nm |
| M | 0.3221 | 0.1266 | 0.3325 | 0.2940 | |
| Y | 0.4400 | 0.5395 | 0.2047 | 0.5649 | 571 nm |

FIG. 1 illustrates 6P-B compared to ITU-R BT.709-6.

6P-C

6P-C is based on the same RGB primaries defined in SMPTE RP431-2 projection recommendation. Each gamut includes these RGB primary colors and then adds three more color primaries orthogonal to these based on the white point. The white point used in 6P-B is D65 (ISO 11664-2). Two versions of 6P-C are used. One is optimized for a D60 white point (SMPTE ST2065-1), and the other is optimized for a D65 white point.

In one embodiment, the red primary has a dominant wavelength of 615 nm, the yellow primary has a dominant wavelength of 570 nm, the green primary has a dominant wavelength of 545 nm, the cyan primary has a dominant wavelength of 493 nm, and the blue primary has a dominant wavelength of 465 nm as shown in Table 2. In one embodiment, the dominant wavelength is approximately (e.g., within ±10%) the value listed in the table below. Alternatively, the dominant wavelength is within ±5% of the value listed in the table below. In yet another embodiment, the dominant wavelength is within ±2% of the value listed in the table below.

TABLE 2

| | x | y | u' | v' | λ |
|---|---|---|---|---|---|
| W (D60) | 0.3217 | 0.3377 | 0.2008 | 0.4742 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1627 | 0.3419 | 0.0960 | 0.4540 | 493 nm |
| M | 0.3523 | 0.1423 | 0.3520 | 0.3200 | |
| Y | 0.4502 | 0.5472 | 0.2078 | 0.5683 | 570 nm |

Figure 2:
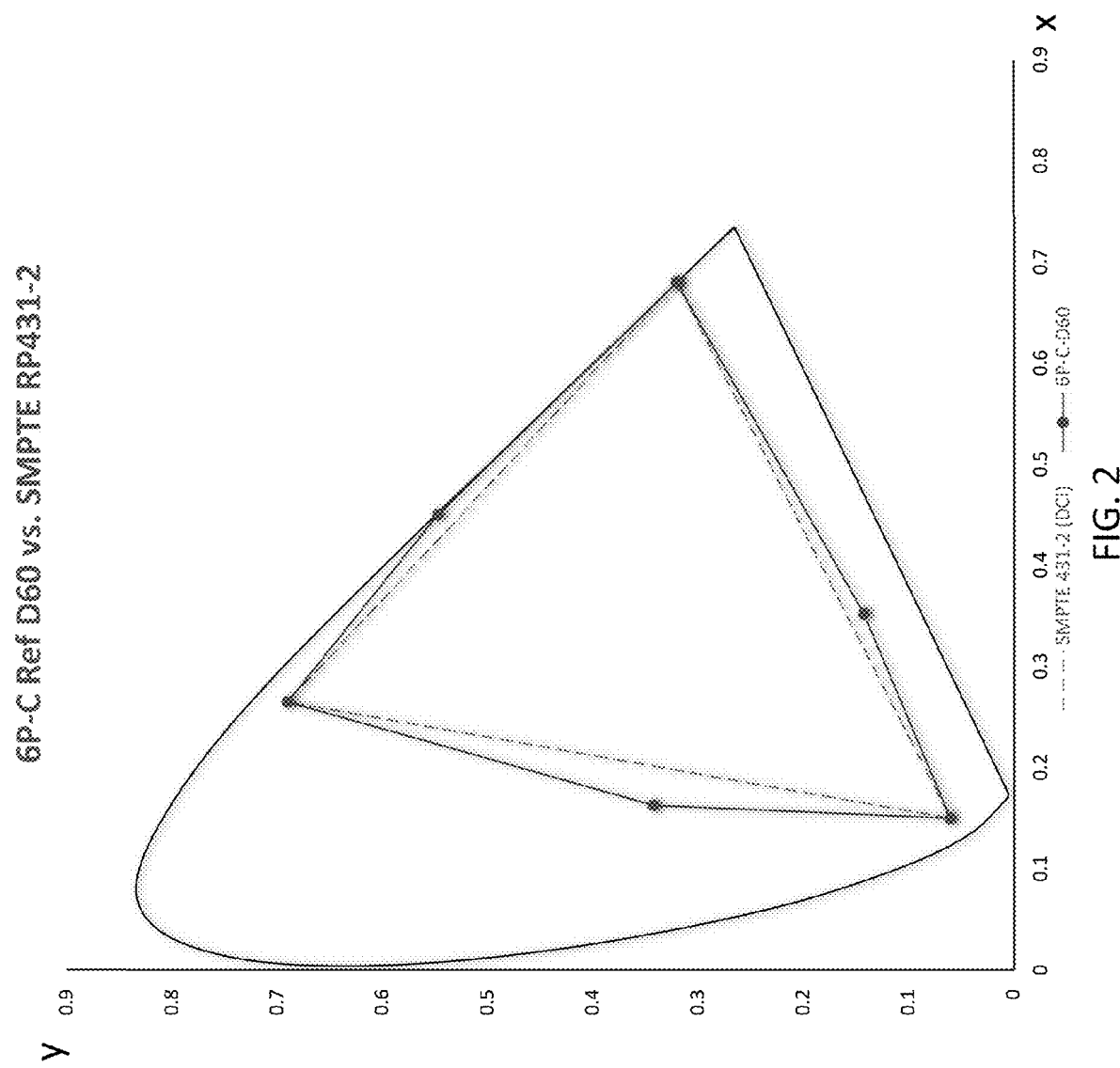
FIG. 2 illustrates another embodiment of a six primary system including a red primary, a green primary, a blue primary, a cyan primary, a magenta primary, and a yellow primary ("6P-C") compared to SMPTE RP431-2 for a D60 white point.

FIG. 2 illustrates 6P-C compared to SMPTE RP431-2 for a D60 white point.

In one embodiment, the red primary has a dominant wavelength of 615 nm, the yellow primary has a dominant wavelength of 570 nm, the green primary has a dominant wavelength of 545 nm, the cyan primary has a dominant wavelength of 423 nm, and the blue primary has a dominant wavelength of 465 nm as shown in Table 3. In one embodiment, the dominant wavelength is approximately (e.g., within ±10%) the value listed in the table below. Alternatively, the dominant wavelength is within ±5% of the value listed in the table below. In yet another embodiment, the dominant wavelength is within ±2% of the value listed in the table below.

TABLE 3

|   | x | y | u' | v' | λ |
|---|---|---|---|---|---|
| W (D65) | 0.3127 | 0.3290 | 0.1978 | 0.4683 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1617 | 0.3327 | 0.0970 | 0.4490 | 492 nm |
| M | 0.3383 | 0.1372 | 0.3410 | 0.3110 | |
| Y | 0.4470 | 0.5513 | 0.2050 | 0.5689 | 570 nm |

Figure 3:
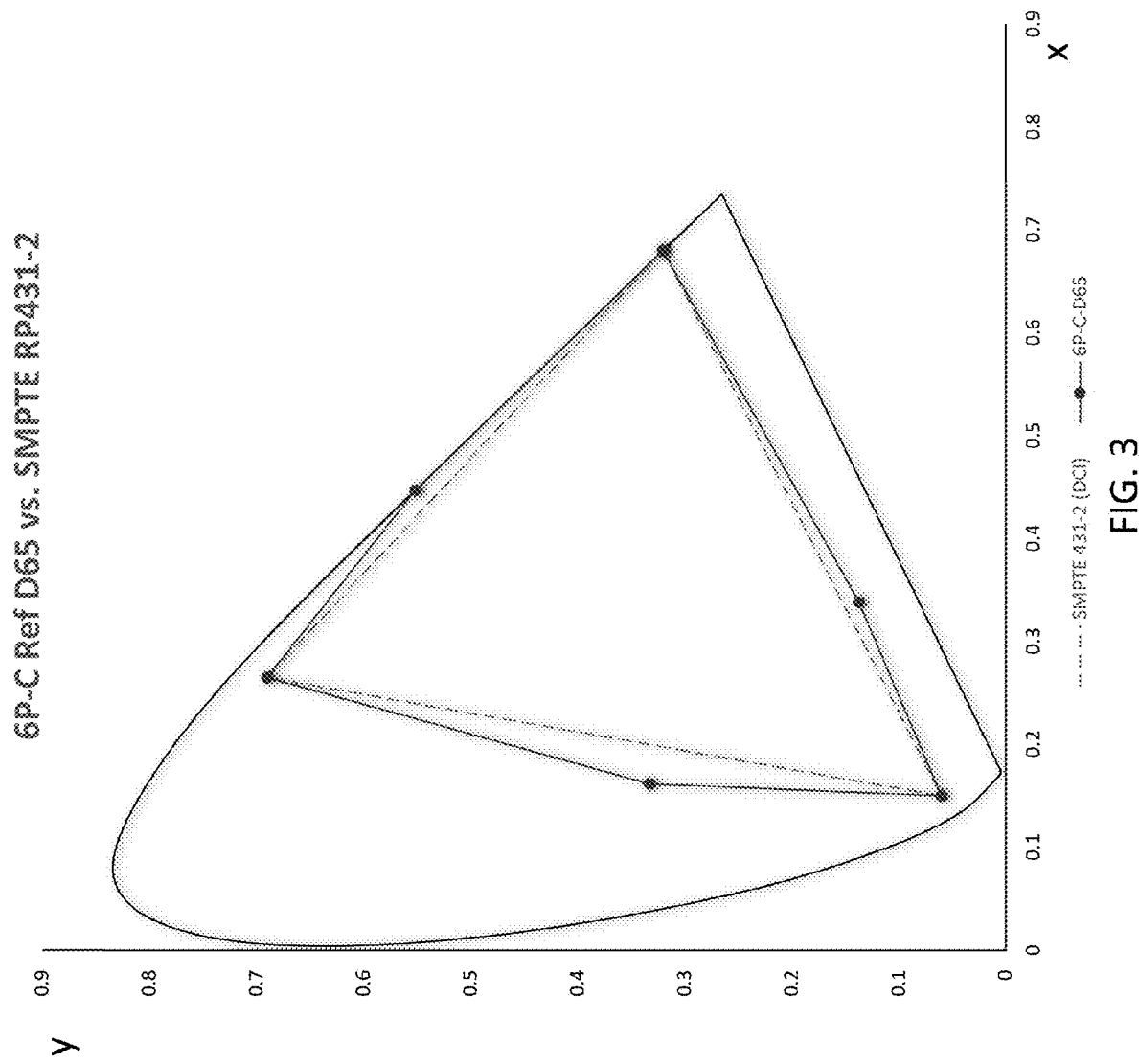
FIG. 3 illustrates yet another embodiment of a six primary system including a red primary, a green primary, a blue primary, a cyan primary, a magenta primary, and a yellow primary ("6P-C") compared to SMPTE RP431-2 for a D65 white point.

FIG. 3 illustrates 6P-C compared to SMPTE RP431-2 for a D65 white point.

SUPER 6P

Figure 4:
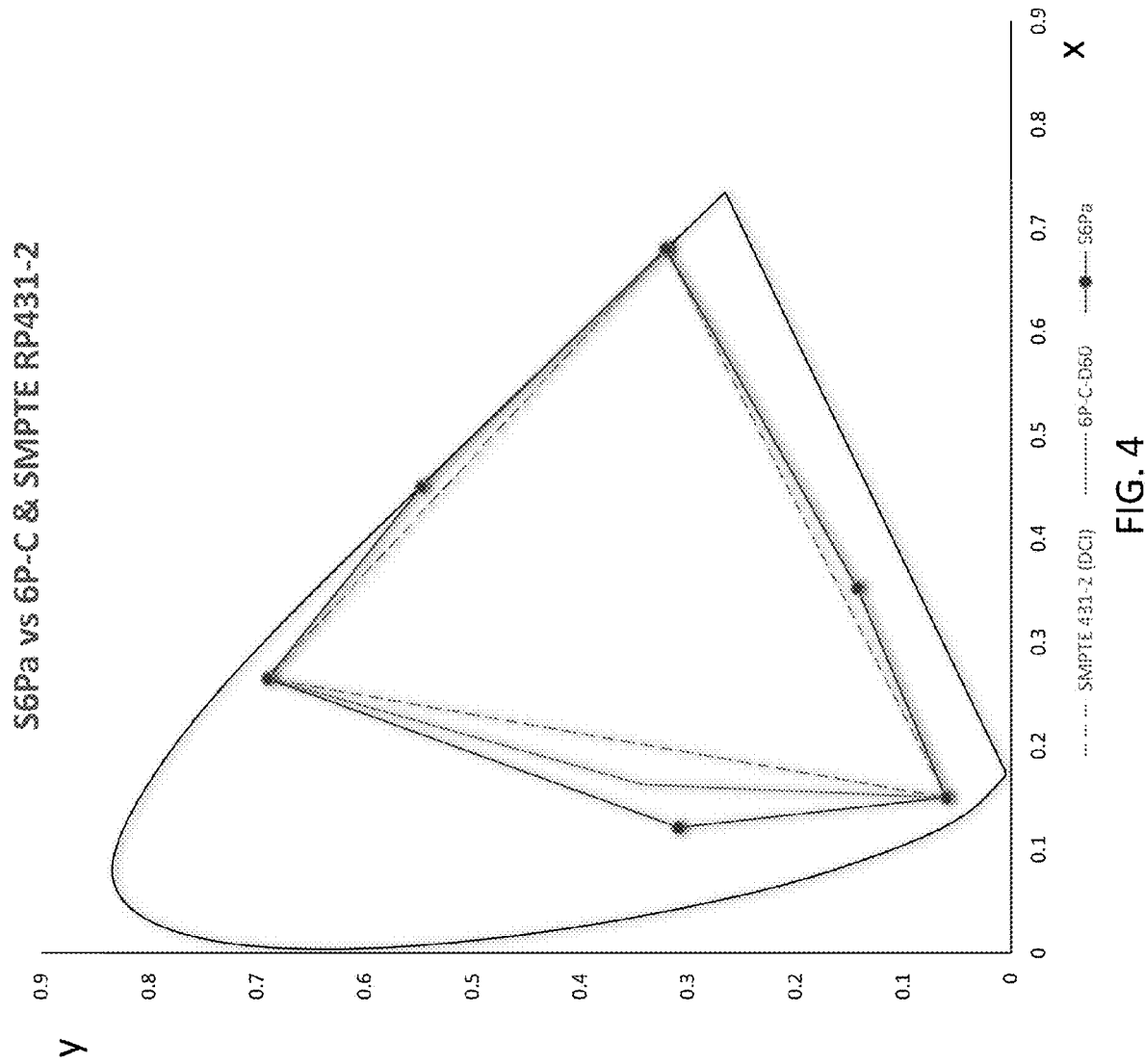
FIG. 4 illustrates Super 6Pa compared to 6P-C.

One of the advantages of ITU-R BT.2020 is that it is operable to include all of the Pointer colors and that increasing primary saturation in a six-color primary design could also do this. Pointer is described in "The Gamut of Real Surface Colors, M.R. Pointer, Published in Colour Research and Application Volume #5, Issue #3 (1980), which is incorporated herein by reference in its entirety. However, extending the 6P gamut beyond SMPTE RP431-2 ("6P-C") adds two problems. The first problem is the requirement to narrow the spectrum of the extended primaries. The second problem is the complexity of designing a backwards compatible system using color primaries that are not related to current standards. But in some cases, there may be a need to extend the gamut beyond 6P-C and avoid these problems. If the goal is to encompass Pointer's data set, then it is possible to keep most of the 6P-C system and only change the cyan color primary position. In one embodiment, the cyan color primary position is located so that the gamut edge encompasses all of Pointer's data set. In another embodiment, the cyan color primary position is a location that limits maximum saturation. With 6P-C, cyan is positioned as u'=0.096, v'=0.454. In one embodiment of Super 6P, cyan is moved to u'=0.075, v'=0.430 ("Super 6Pa" (S6Pa)). Advantageously, this creates a new gamut that covers Pointer's data set almost in its entirety. FIG. 4 illustrates Super 6Pa compared to 6P-C.

Table 4 is a table of values for Super 6Pa. The definition of x,y are described in ISO 11664-3:2012/CIE S 014 Part 3, which is incorporated herein by reference in its entirety. The definition of u',v' are described in ISO 11664-5:2016/CIE S 014 Part 5, which is incorporated herein by reference in its entirety. λ defines each color primary as dominant color wavelength for RGB and complementary wavelengths CMY.

TABLE 4

|   | x | y | u' | v' | λ |
|---|---|---|---|---|---|
| W (D60) | 0.3217 | 0.3377 | 0.2008 | 0.4742 | |
| W (D65) | 0.3127 | 0.3290 | 0.1978 | 0.4683 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1211 | 0.3088 | 0.0750 | 0.4300 | 490 nm |
| M | 0.3523 | 0.1423 | 0.3520 | 0.3200 | |
| Y | 0.4502 | 0.5472 | 0.2078 | 0.5683 | 570 nm |

Figure 5:
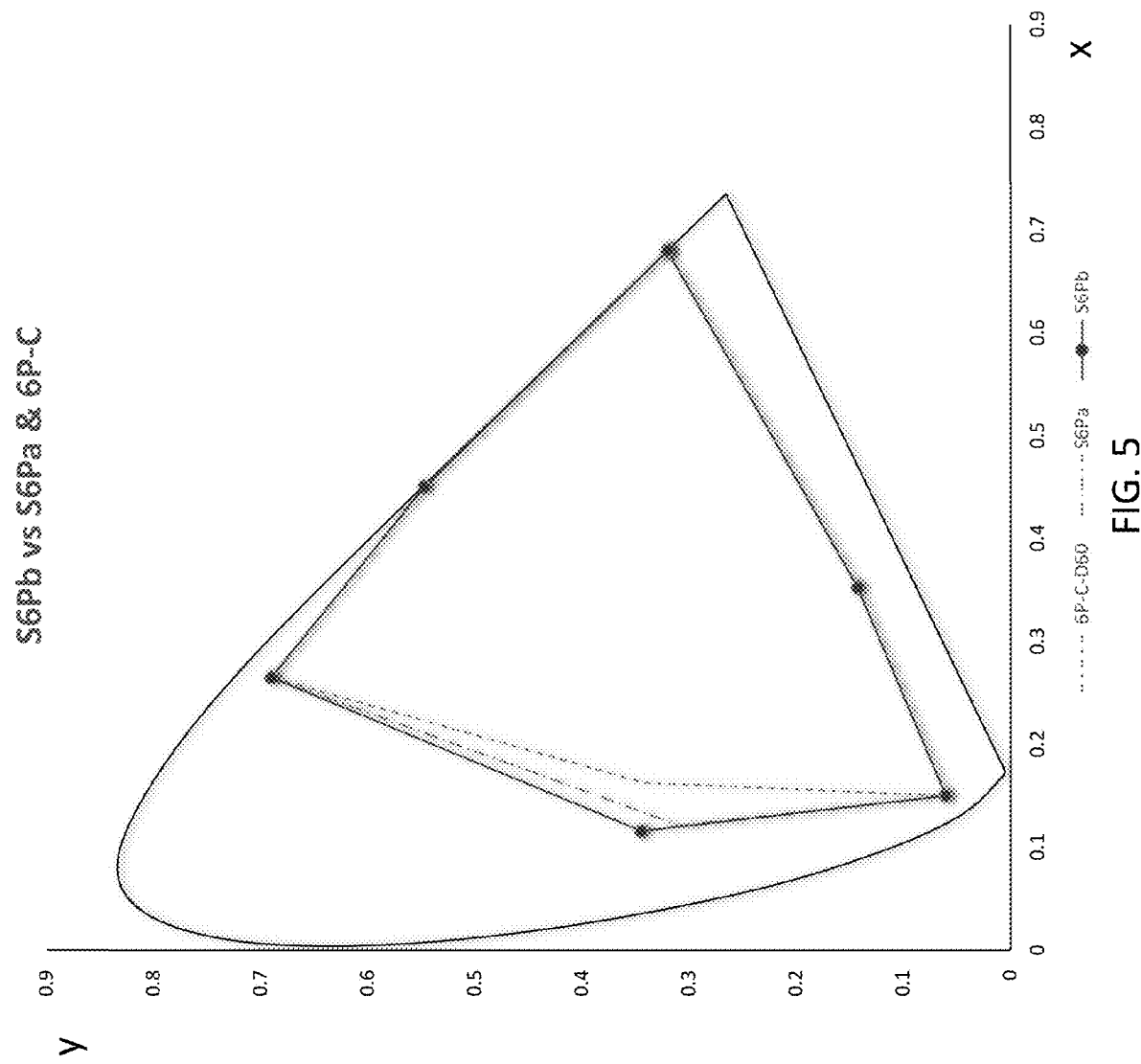
FIG. 5 illustrates Super 6Pb compared to Super 6Pa and 6P-C.

In an alternative embodiment, the saturation is expanded on the same hue angle as 6P-C as shown in FIG. 5. Advantageously, this makes backward compatibility less complicated. However, this requires much more saturation (i.e., narrower spectra). In another embodiment of Super 6P, cyan is moved to u'=0.067, v'=0.449 ("Super 6Pb" (S6Pb)). Additionally, FIG. 5 illustrates Super 6Pb compared to Super 6Pa and 6P-C.

Table 5 is a table of values for Super 6Pb. The definition of x,y are described in ISO 11664-3:2012/CIE S 014 Part 3, which is incorporated herein by reference in its entirety. The definition of u',v' are described in ISO 11664-5:2016/CIE S 014 Part 5, which is incorporated herein by reference in its entirety. λ defines each color primary as dominant color wavelength for RGB and complementary wavelengths CMY.

TABLE 5

|   | x | y | u' | v' | λ |
|---|---|---|---|---|---|
| W (ACES D60) | 0.32168 | 0.33767 | 0.2008 | 0.4742 | |
| W (D65) | 0.3127 | 0.3290 | 0.1978 | 0.4683 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1156 | 0.3442 | 0.0670 | 0.4490 | 493 nm |
| M | 0.3523 | 0.1423 | 0.3520 | 0.3200 | |
| Y | 0.4502 | 0.5472 | 0.2078 | 0.5683 | 570 nm |

In a preferred embodiment, a matrix is created from XYZ values of each of the primaries. As the XYZ values of the primaries change, the matrix changes. Additional details about the matrix are described below.

Formatting and Transportation of Multi-Primary Signals

The present invention includes three different methods to format video for transport: System 1, System 2, and System 3. System 1 is comprised of an encode and decode system, which is operable to be divided into base encoder and digitation, image data stacking, mapping into the standard data transport, readout, unstack, and finally image decoding. In one embodiment, the basic method of this system is to combine opposing color primaries within the three standard transport channels and identify them by their code value.

System 2 uses a sequential method where three color primaries are passed to the transport format as full bit level image data and inserted as normal. The three additional channels are delayed by one pixel and then placed into the transport instead of the first colors. This is useful in situations where quantizing artifacts may be critical to image performance. In one embodiment, this system is comprised of the six primaries (e.g., RGB plus a method to delay the CYM colors for injection), image resolution identification to allow for pixel count synchronization, start of video identification, and RGB Delay.

System 3 utilizes a dual link method where two wires are used. In one embodiment, a first set of three channels (e.g., RGB) are sent to link A and a second set of three channels (e.g., CYM) is sent to link B. Once they arrive at the image destination, they are recombined.

To transport up to six color components (e.g., four, five, or six), System 1, System 2, or System 3 is operable to be used as described. If four color components are used, two of the channels are set to "0". If five color components are used, one of the channels is set to "0". Advantageously, this transportation method works for all primary systems described herein that include up to six color components.

Comparison of Three Systems

Advantageously, System 1 fits within legacy SDI, CTA, and Ethernet transports. Additionally, System 1 has zero latency processing for conversion to an RGB display. However, System 1 is limited to 11-bit words.

System 2 is advantageously operable to transport 6 channels using 16-bit words with no compression. Additionally, System 2 fits within newer SDI, CTA, and Ethernet transport formats. However, System 2 requires double bit rate speed. For example, a 4K image requires a data rate for an 8K RGB image.

In comparison, System 3 is operable to transport up to 6 channels using 16-bit words with compression and at the same data required for a specific resolution. For example, a data rate for an RGB image is the same as for a 6P image using System 3. However, System 3 requires a twin cable connection within the video system.

Nomenclature

In one embodiment, a standard video nomenclature is used to better describe each system.

R describes red data as linear light. G describes green data as linear light. B describes blue data as linear light. C describes cyan data as linear light. M describes magenta data as linear light. $Y^C$ and/or Y describe yellow data as linear light.

R' describes red data as non-linear light. G' describes green data as non-linear light. B' describes blue data as non-linear light. C' describes cyan data as non-linear light. M' describes magenta data as non-linear light. $Y^{C'}$ and/or Y' describe yellow data as non-linear light.

$Y_6$ describes the luminance sum of RGBCMY data. $Y_{RGB}$ describes a System 2 encode that is the linear luminance sum of the RGB data. $Y_{CMY}$ describes a System 2 encode that is the linear luminance sum of the CMY data.

$C_R$ describes the data value of red after subtracting linear image luminance. $C_B$ describes the data value of blue after subtracting linear image luminance. $C_C$ describes the data value of cyan after subtracting linear image luminance. $C_Y$ describes the data value of yellow after subtracting linear image luminance.

$Y'_{RGB}$ describes a System 2 encode that is the nonlinear luminance sum of the RGB data. $Y'_{CMY}$ describes a System 2 encode that is the nonlinear luminance sum of the CMY data. −Y describes the sum of RGB data subtracted from $Y_6$.

$C'_R$ describes the data value of red after subtracting nonlinear image luminance. $C'_B$ describes the data value of blue after subtracting nonlinear image luminance. $C'_C$ describes the data value of cyan after subtracting nonlinear image luminance. $C'_Y$ describes the data value of yellow after subtracting nonlinear image luminance.

B+Y describes a System 1 encode that includes either blue or yellow data. G+M describes a System 1 encode that includes either green or magenta data. R+C describes a System 1 encode that includes either green or magenta data.

$C_R+C_C$ describes a System 1 encode that includes either color difference data. $C_B+C_Y$ describes a System 1 encode that includes either color difference data.

4:4:4 describes full bandwidth sampling of a color in an RGB system. 4:4:4:4:4 describes full sampling of a color in an RGBCMY system. 4:2:2 describes an encode where a full bandwidth luminance channel (Y) is used to carry image detail and the remaining components are half sampled as a Cb Cr encode. 4:2:2:2:2 describes an encode where a full bandwidth luminance channel (Y) is used to carry image detail and the remaining components are half sampled as a Cb Cr Cy Cc encode. 4:2:0 describes a component system similar to 4:2:2, but where Cr and Cb samples alternate per line. 4:2:0:2:0 describes a component system similar to 4:2:2, but where Cr, Cb, Cy, and Cc samples alternate per line.

Constant luminance is the signal process where luminance (Y) is calculated in linear light. Non-constant luminance is the signal process where luminance (Y) is calculated in nonlinear light.

Deriving Color Components

When using a color difference method (4:2:2), several components need specific processing so that they are operable to be used in lower frequency transports. These are derived as:

$$Y'_6 = 0.1063R' + 0.23195Y^{c'} + 0.3576G' + 0.19685C' + 0.0361B' + 0.0712M'$$

$$G'_6 = \left(\frac{1}{0.3576Y}\right) - (0.1063R') -$$
$$\quad (0.0361B') - (0.19685C') - (0.23195Y^{C'}) - (0.0712M')$$

$$-Y' = Y'_6 - (C' + Y^{c'} + M')$$

$$C'_R = \frac{R' - Y'_6}{1.7874} C'_B = \frac{B' - Y'_6}{1.9278} C'_C = \frac{C' - Y'_6}{16063} C'_Y = \frac{Y^{C'} - Y'_6}{1.5361}$$

$$R' = \frac{C'_R - Y'_6}{1.7874} B = \frac{C'_B - Y'_6}{19278} C' = \frac{C'_C - Y'_6}{1.6063} Y^{C'} = \frac{C'_Y - Y'_6}{1.5361}$$

The ratios for Cr, Cb, Cc, and Cy are also valid in linear light calcuations.

Magenta is operable to be calculated as follows:

$$M' = \frac{B' + R'}{B' \times R'} \text{ or } M = \frac{B + R}{B \times R}$$

System 1

In one embodiment, the multi-primary color system is compatible with legacy systems. A backwards compatible multi-primary color system is defined by a sampling method. In one embodiment, the sampling method is 4:4:4. In one embodiment, the sampling method is 4:2:2. In another embodiment, the sampling method is 4:2:0. In one embodiment of a backwards compatible multi-primary color system, new encode and decode systems are divided into the steps of performing base encoding and digitization, image data stacking, mapping into the standard data transport, readout, unstacking, and image decoding ("System 1"). In one embodiment, System 1 combines opposing color primaries within three standard transport channels and identifies them by their code value. In one embodiment of a backwards compatible multi-primary color system, the processes are analog processes. In another embodiment of a backwards compatible multi-primary color system, the processes are digital processes.

In one embodiment, the sampling method for a multi-primary color system is a 4:4:4 sampling method. Black and white bits are redefined. In one embodiment, putting black at midlevel within each data word allows the addition of CYM color data.

Figure 6:
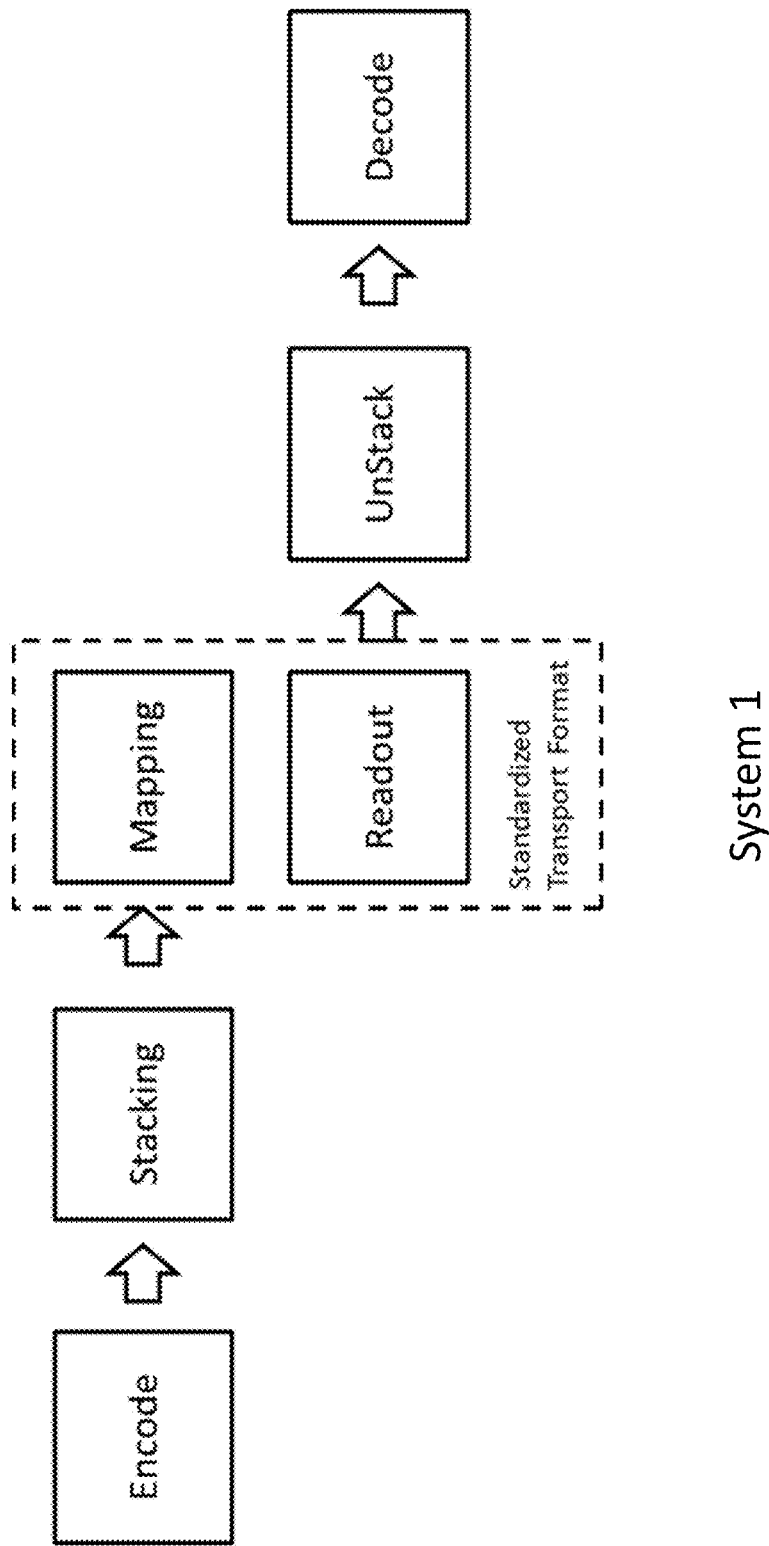
FIG. 6 illustrates an embodiment of an encode and decode system for a multi-primary color system.

FIG. 6 illustrates an embodiment of an encode and decode system for a multi-primary color system. In one embodiment, the multi-primary color encode and decode system is divided into a base encoder and digitation, image data stacking, mapping into the standard data transport, readout, unstack, and finally image decoding ("System 1"). In one embodiment, the method of this system combines opposing color primaries within the three standard transport channels and identifies them by their code value. In one embodiment, the encode and decode for a multi-primary color system are analog-based. In another embodiment, the encode and decode for a multi-primary color system are digital-based. System 1 is designed to be compatible with lower bandwidth systems and allows a maximum of 11 bits per channel and is limited to sending only three channels of up to six primaries at a time. In one embodiment, it does this by using a stacking system where either the color channel or the complementary channel is decoded depending on the bit level of that one channel.

System 2

Figure 7:
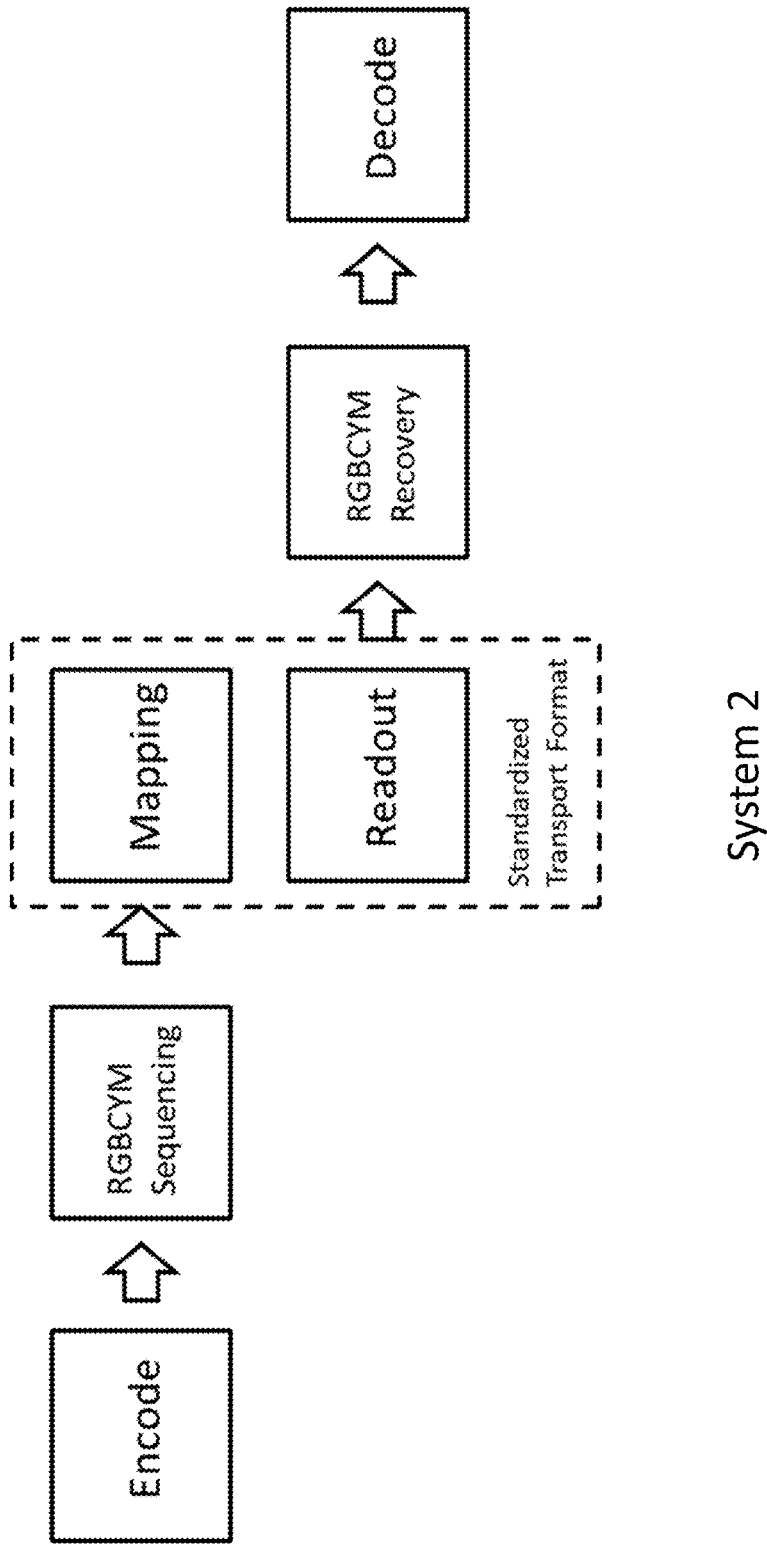
FIG. 7 illustrates a sequential method where three color primaries are passed to the transport format as full bit level image data and inserted as normal ("System 2").

FIG. 7 illustrates a sequential method where three color primaries are passed to the transport format as full bit level image data and inserted as normal ("System 2"). The three additional channels are delayed by one pixel and then placed into the transport instead of the first colors. This method is useful in situations where quantizing artifacts is critical to image performance. In one embodiment, this system is comprised of six primaries (RGBCYM), a method to delay the CYM colors for injection, image resolution identification to all for pixel count synchronization, start of video identification, RGB delay, and for YCCCCC systems, logic to select the dominant color primary. The advantage of System 2 is that full bit level video is operable to be transported, but at double the normal data rate.

System 2A

System 2 sequences on a pixel-to-pixel basis. However, a quadrature method is also possible ("System 2A") that is operable to transport six primaries in stereo or twelve primary image information. Each quadrant of the frame contains three color primary data sets. These are combined in the display. A first set of three primaries is displayed in the upper left quadrant, a second set of three primaries is displayed in the upper right quadrant, a third set of primaries is displayed in the lower left quadrant, and a fourth set of primaries is displayed in lower right quadrant. In one embodiment, the first set of three primaries, the second set of three primaries, the third set of three primaries, and the fourth set of three primaries do not contain any overlapping primaries (i.e., twelve different primaries). Alternatively, the first set of three primaries, the second set of three primaries, the third set of three primaries, and the fourth set of three primaries contain overlapping primaries (i.e., at least one primary is contained in more than one set of three primaries). In one embodiment, the first set of three primaries and the third set of three primaries contain the same primaries and the second set of three primaries and the fourth set of three primaries contain the same primaries.

Figure 8A:
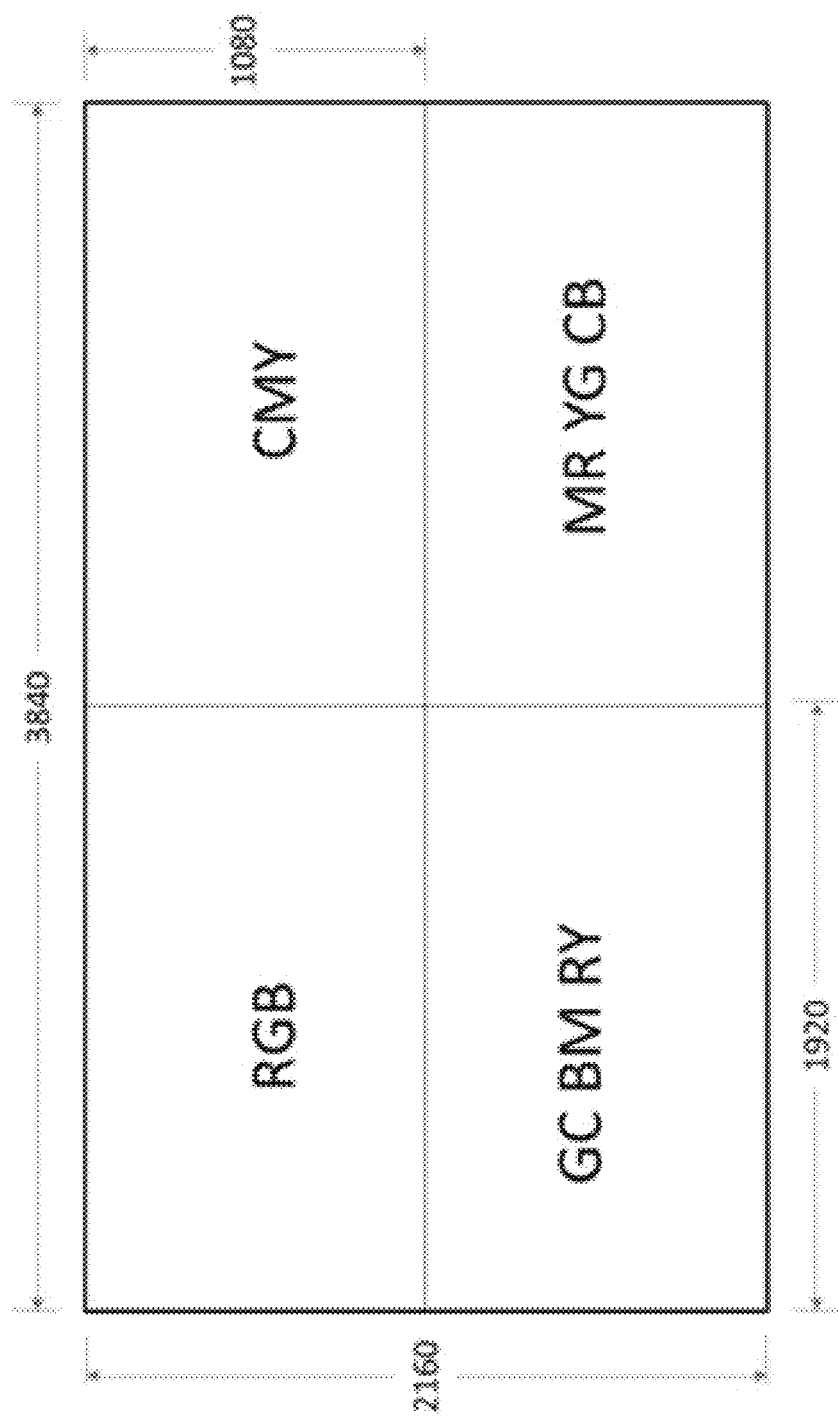
FIG. 8A illustrates one embodiment of a quadrature method ("System 2A").

FIG. 8A illustrates one embodiment of a quadrature method ("System 2A"). In the example shown in FIG. 8A, a first set of three primaries (e.g., RGB) is displayed in the upper left quadrant, a second set of three primaries (e.g., CMY) is displayed in the upper right quadrant, a third set of three primaries (e.g., GC, BM, and RY) is displayed in the lower left quadrant, and a fourth set of three primaries (e.g., MR, YG, and CB) is displayed in the lower right quadrant. Although the example shown in FIG. 8A illustrates a backwards compatible 12P system, this is merely for illustrative purposes. The present invention is not limited to the twelve primaries shown in FIG. 8A. Additionally, alternative pixel arrangements are compatible with the present invention.

Figure 8B:
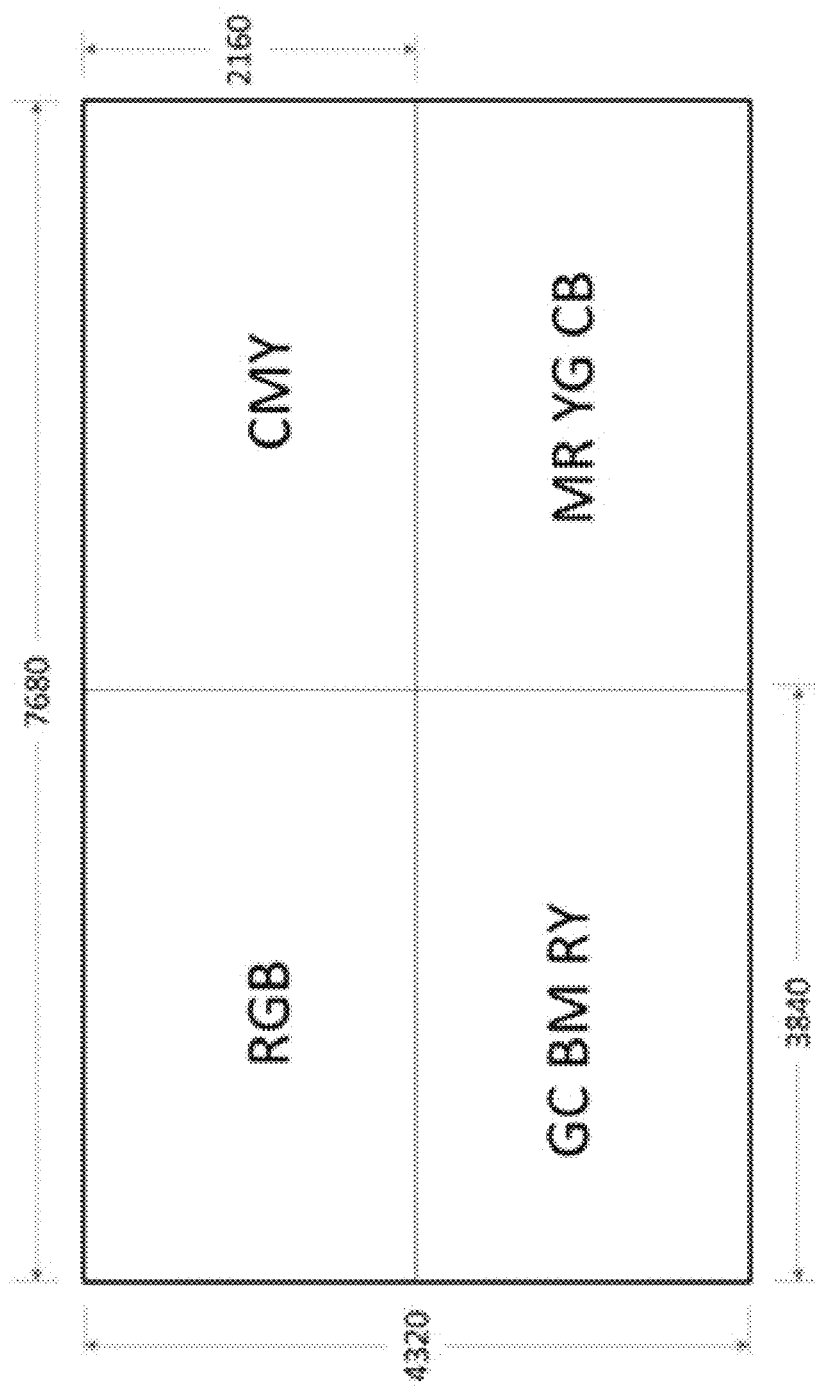
FIG. 8B illustrates another embodiment of a quadrature method ("System 2A").

FIG. 8B illustrates another embodiment of a quadrature method ("System 2A"). In the example shown in FIG. 8B, a first set of three primaries (e.g., RGB) is displayed in the upper left quadrant, a second set of three primaries (e.g., CMY) is displayed in the upper right quadrant, a third set of three primaries (e.g., GC, BM, and RY) is displayed in the lower left quadrant, and a fourth set of three primaries (e.g., MR, YG, and CB) is displayed in the lower right quadrant. Although the example shown in FIG. 8B illustrates a backwards compatible 12P system, this is merely for illustrative purposes. The present invention is not limited to the twelve primaries shown in FIG. 8B. Additionally, alternative pixel arrangements are compatible with the present invention.

Figure 8C:
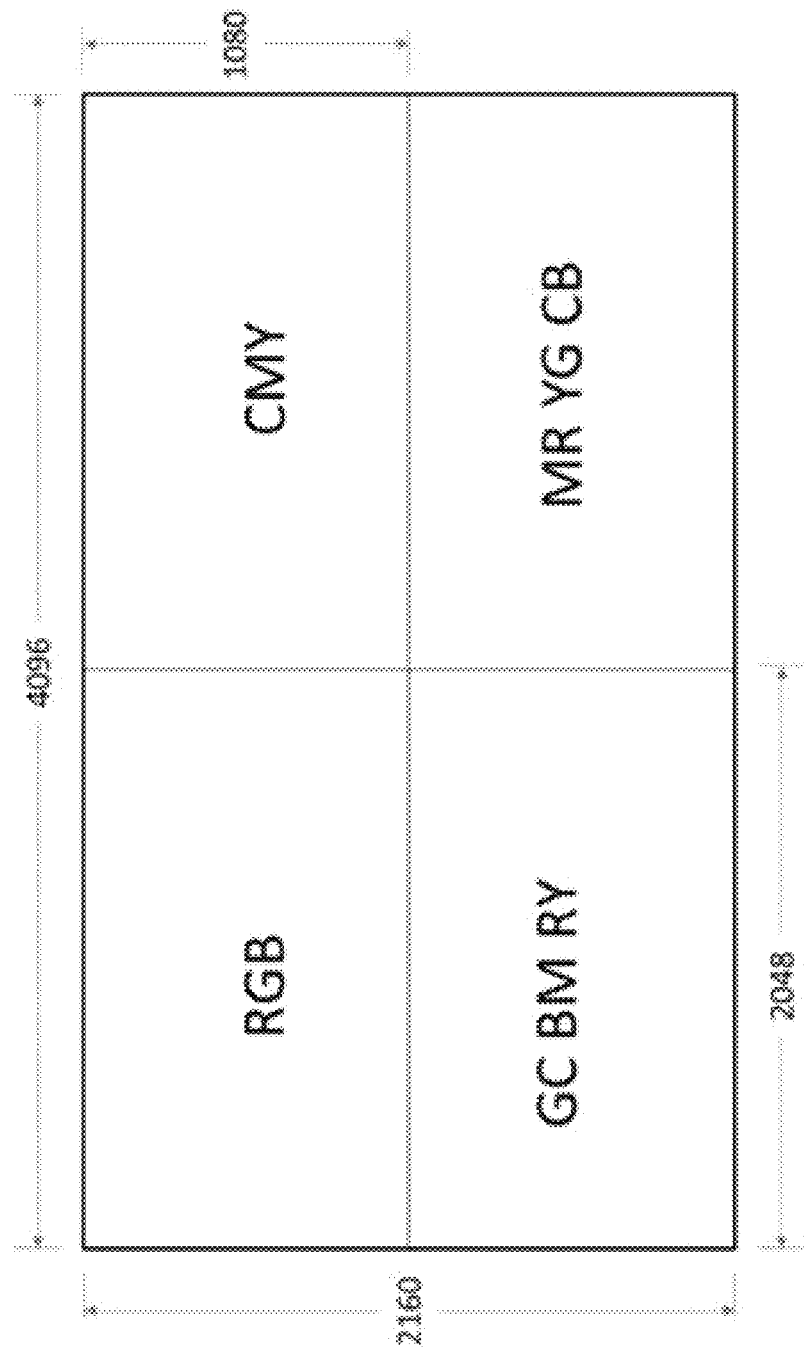
FIG. 8C illustrates yet another embodiment of a quadrature method ("System 2A").

FIG. 8C illustrates yet another embodiment of a quadrature method ("System 2A"). In the example shown in FIG. 8C, a first set of three primaries (e.g., RGB) is displayed in the upper left quadrant, a second set of three primaries (e.g., CMY) is displayed in the upper right quadrant, a third set of three primaries (e.g., GC, BM, and RY) is displayed in the lower left quadrant, and a fourth set of three primaries (e.g., MR, YG, and CB) is displayed in the lower right quadrant. Although the example shown in FIG. 8C illustrates a backwards compatible 12P system, this is merely for illustrative purposes. The present invention is not limited to the twelve primaries shown in FIG. 8C. Additionally, alternative pixel arrangements are compatible with the present invention.

Figure 9A:
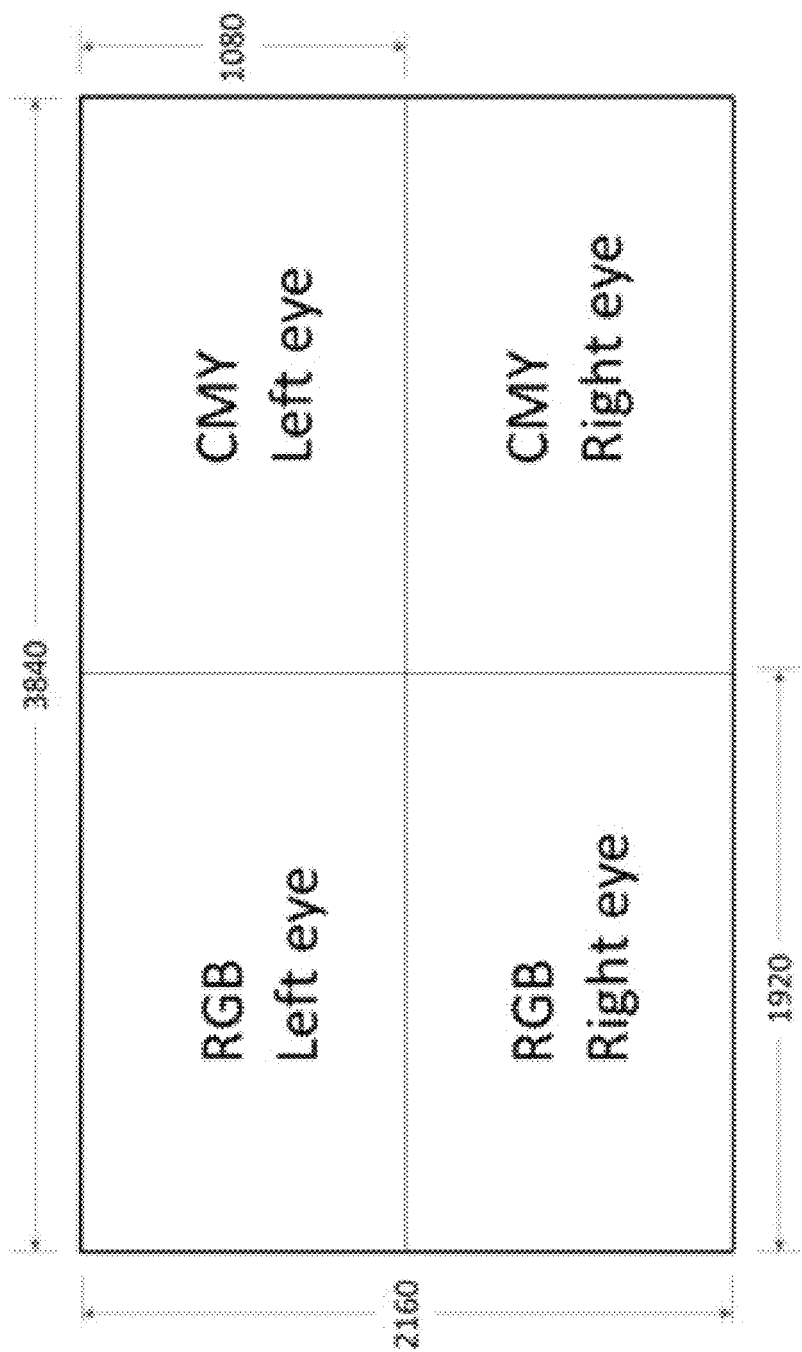
FIG. 9A illustrates an embodiment of a stereo quadrature method ("System 2A").

FIG. 9A illustrates an embodiment of a quadrature method ("System 2A") in stereo. In the example shown in FIG. 9A, a first set of three primaries (e.g., RGB) is displayed in the upper left quadrant, a second set of three primaries (e.g., CMY) is displayed in the upper right quadrant, a third set of three primaries (e.g., RGB) is displayed in the lower left quadrant, and a fourth set of three primaries (e.g., CMY) is displayed in the lower right quadrant. This embodiment allows for separation of the left eye with the first set of three primaries and the second set of three primaries and the right eye with the third set of three primaries and the fourth set of three primaries. Alternatively, a first set of three primaries (e.g., RGB) is displayed in the upper left quadrant, a second set of three primaries (e.g., RGB) is displayed in the upper right quadrant, a third set of three primaries (e.g., CMY) is displayed in the lower left quadrant, and a fourth set of three primaries (e.g., CMY) is displayed in the lower right quadrant. Alternative pixel arrangements are compatible with the present invention.

Figure 9B:
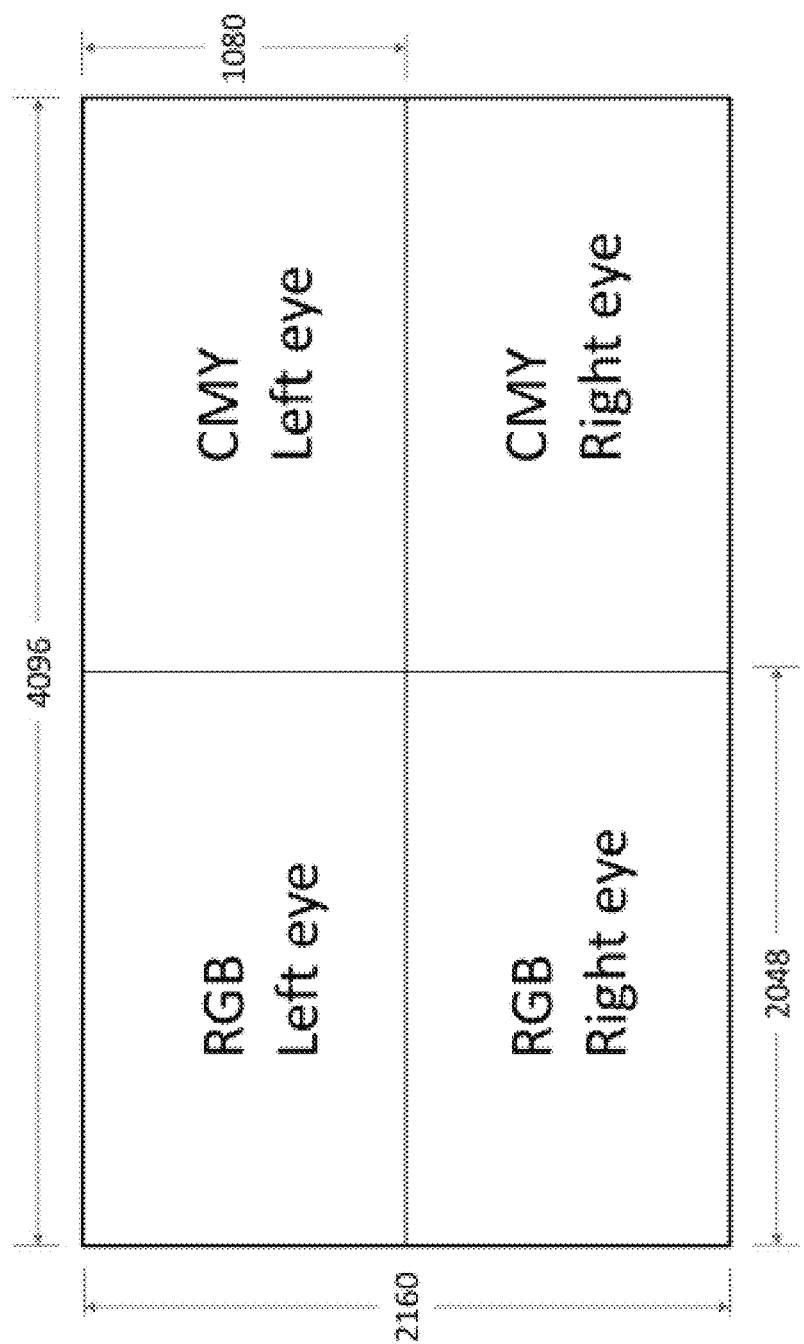
FIG. 9B illustrates another embodiment of a stereo quadrature method ("System 2A").

FIG. 9B illustrates another embodiment of a quadrature method ("System 2A") in stereo. Alternative pixel arrangements are compatible with the present invention.

Figure 9C:
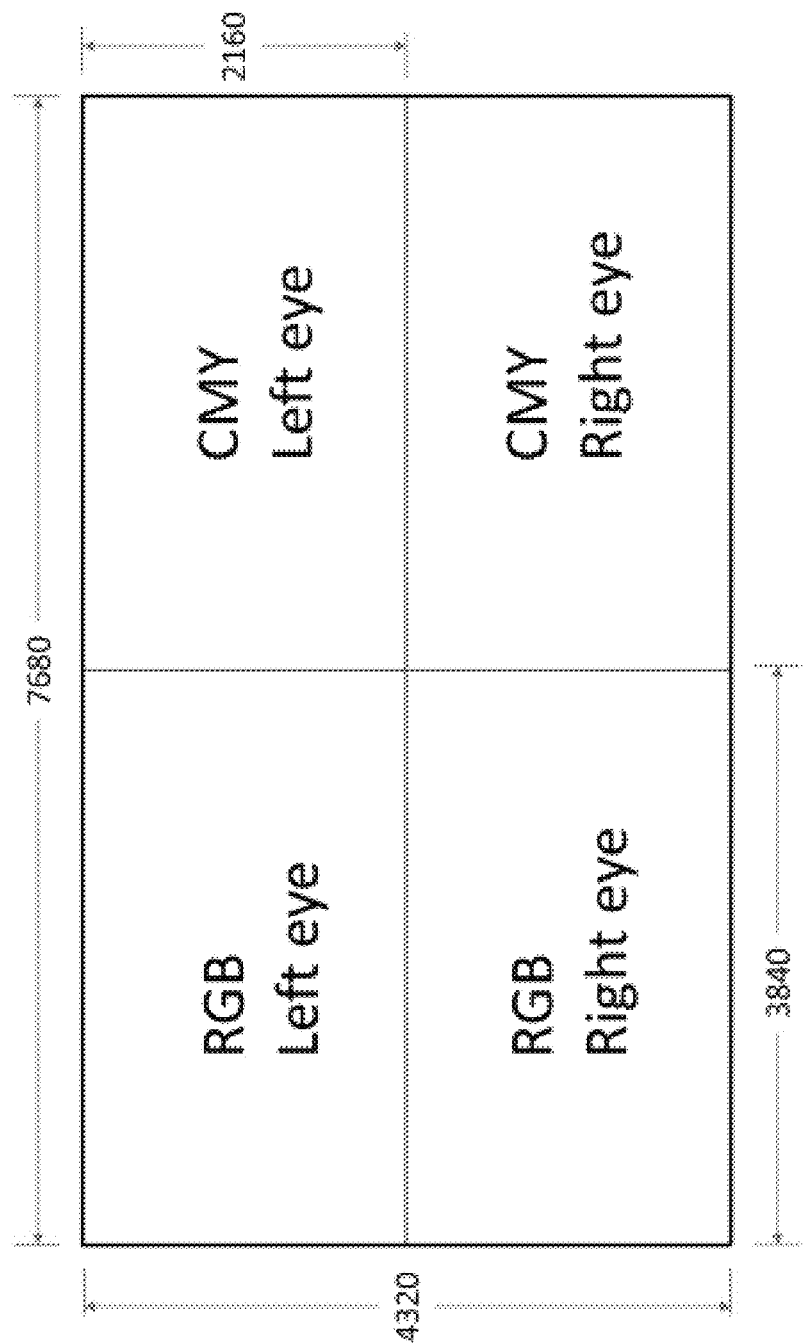
FIG. 9C illustrates yet another embodiment of a stereo quadrature method ("System 2A").

FIG. 9C illustrates yet another embodiment of a quadrature method ("System 2A") in stereo. Alternative pixel arrangements are compatible with the present invention.

Advantageously, System 2A allows for the ability to display multiple primaries (e.g., 12P and 6P) on a conventional monitor. Additionally, System 2A allows for a simplistic viewing of false color, which is useful in the production process and allows for visualizing relationships between colors. It also allows for display of multiple projectors (e.g., a first projector, a second projector, a third projector, and a fourth projector).

System 3

Figure 10:
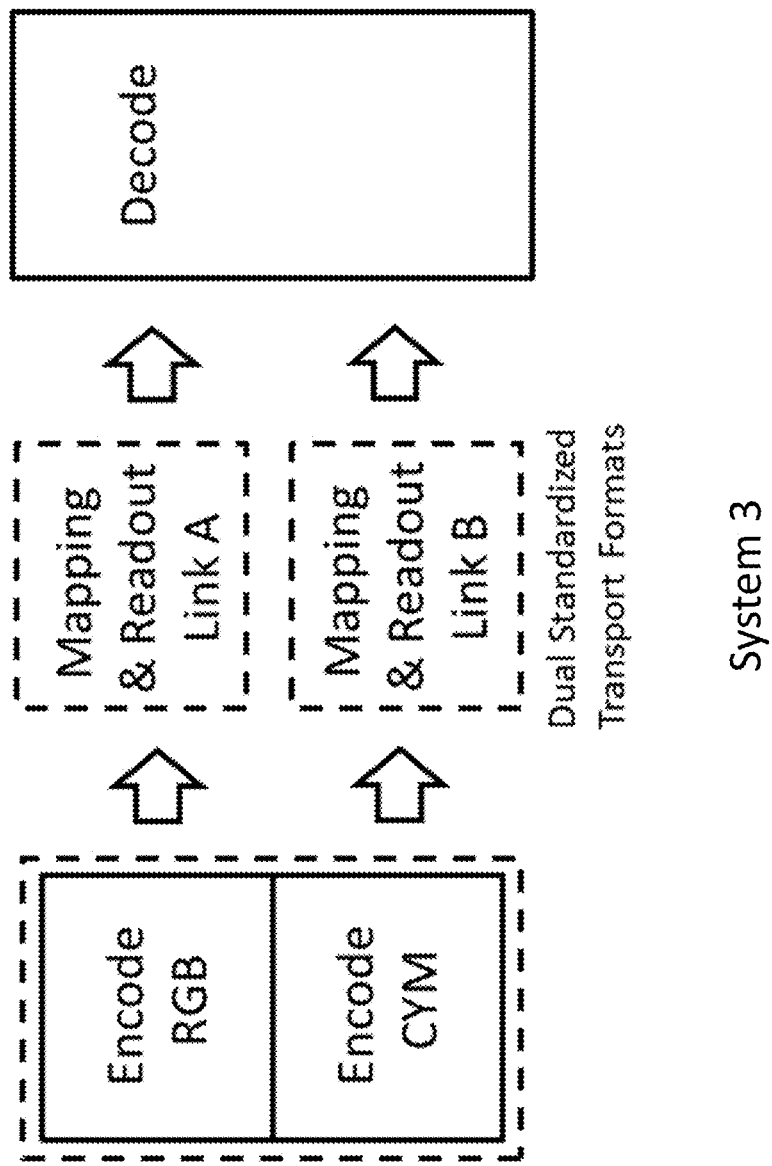
FIG. 10 illustrates one embodiment of a system encode and decode process using a dual link method ("System 3").

FIG. 10 illustrates one embodiment of a system encode and decode process using a dual link method ("System 3"). System 3 utilizes a dual link method where two wires are used. In one embodiment, RGB is sent to link A and CYM is sent to link B. After arriving at the image destination, the two links are recombined.

System 3 is simpler and more straight forward than Systems 1 and 2. The advantage with this system is that adoption is simply to format non-RGB primaries (e.g., CYM) on a second link. So, in one example, for an SDI design, RGB is sent on a standard SDI stream just as it is currently done. There is no modification to the transport and this link is operable to be sent to any RGB display requiring only the compensation for the luminance difference because the CYM components are not included. CYM data is transported in the same manner as RGB data. This data is then combined in the display to make up a 6P image. The downside is that the system requires two wires to move one image. This system is operable to work with most any format including SMPTE ST292, 424, 2082, and 2110. It also is operable to work with dual HDMI/CTA connections. In one embodiment, the system includes at least one transfer function (e.g., OETF, EOTF).

Figure 11:
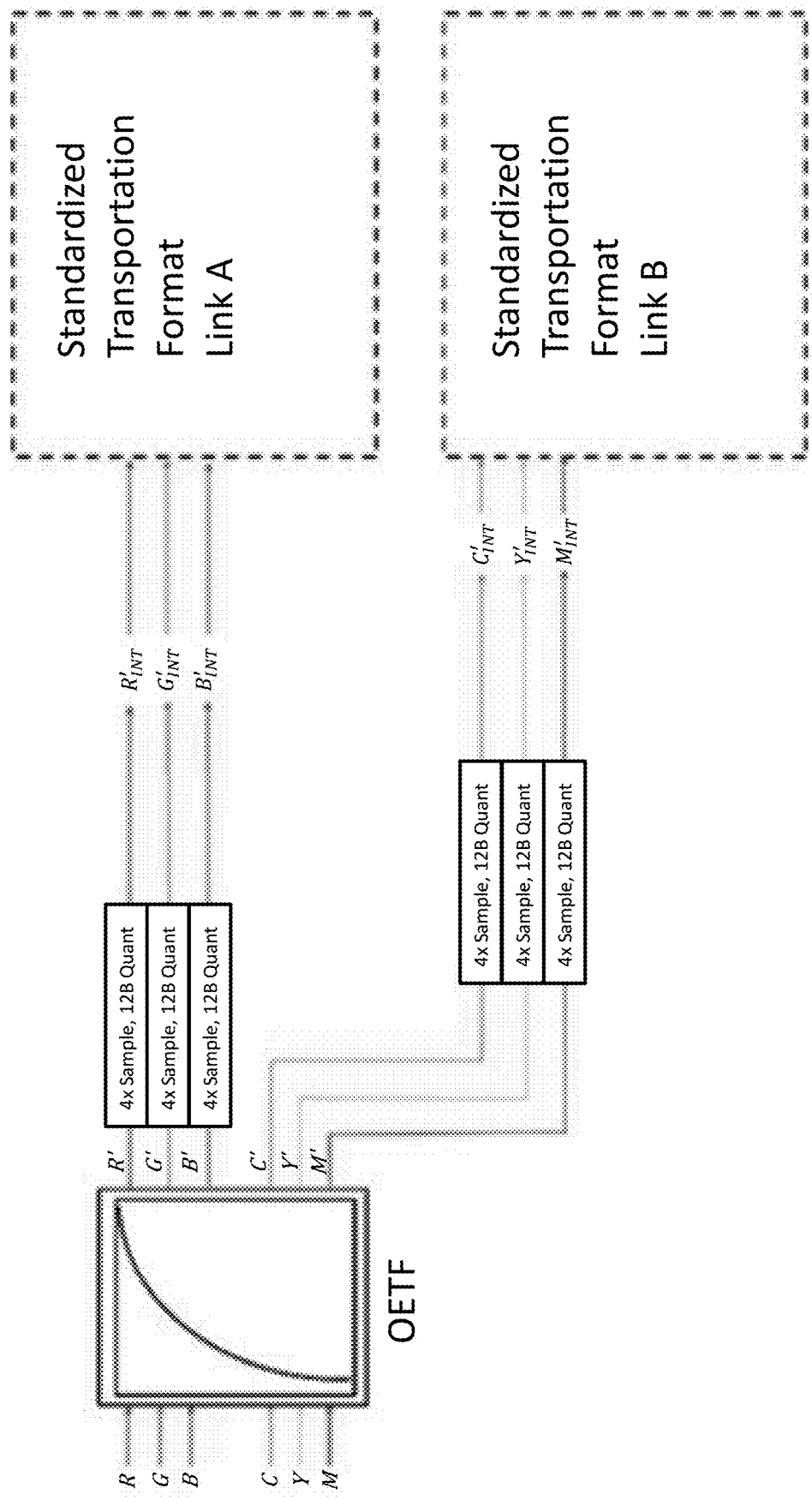
FIG. 11 illustrates one embodiment of an encoding process using a dual link method.

FIG. 11 illustrates one embodiment of an encoding process using a dual link method.

Figure 12:
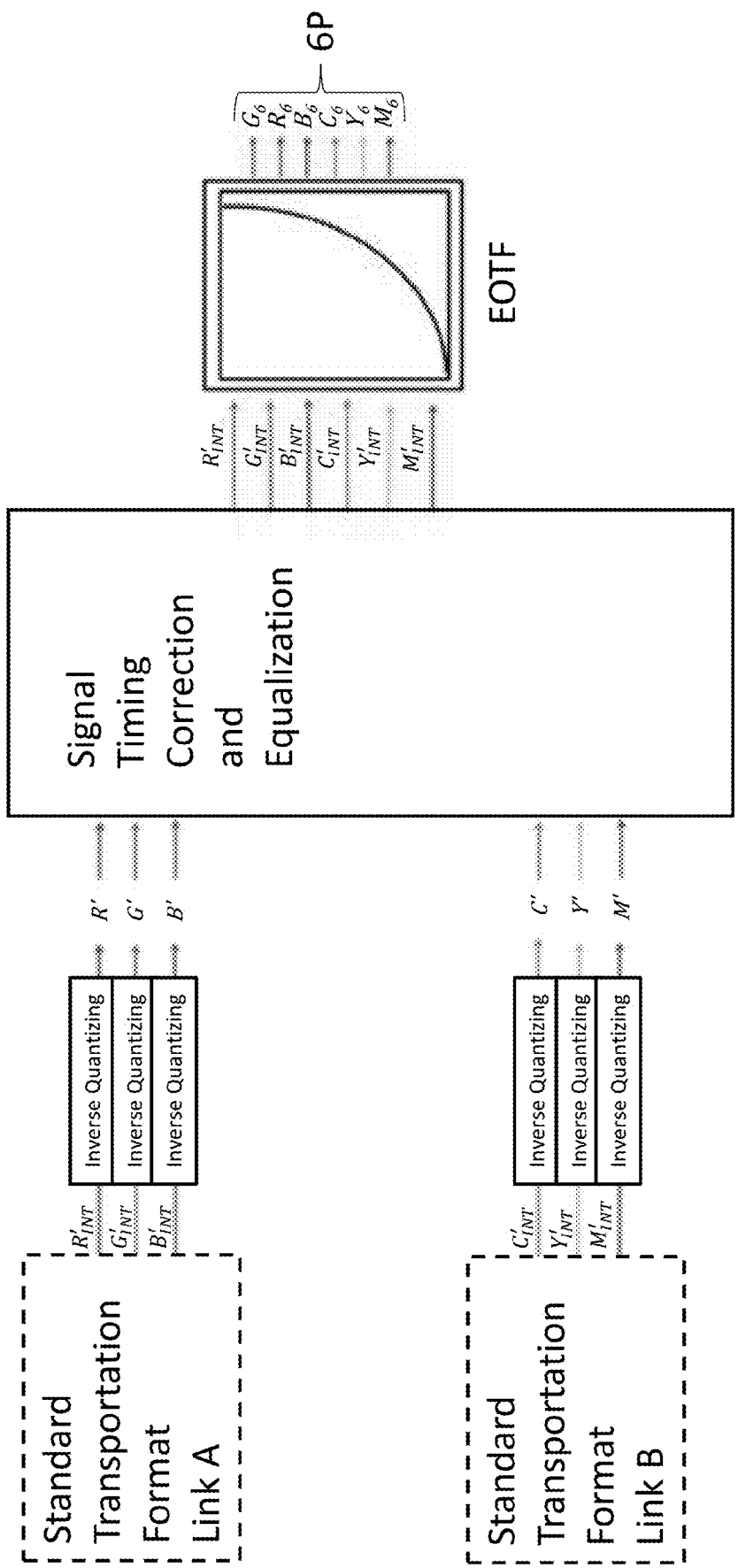
FIG. 12 illustrates one embodiment of a decoding process using a dual link method.

FIG. 12 illustrates one embodiment of a decoding process using a dual link method.

System 4

Color is generally defined by three component data levels (e.g., RGB, YCbCr). A serial data stream must accommodate a word for each color contributor (e.g., R, G, B). Use of more than three primaries requires accommodations to fit this data based on an RGB concept. This is why System 1, System 2, and System 3 use stacking, sequencing, and/or dual links. Multiple words are required to define a single pixel, which is inefficient because not all values are needed.

In a preferred embodiment, color is defined as a colorimetric coordinate. Thus, every color is defined by three words. Serial systems are already based on three color contributors (e.g., RGB). System 4 preferably uses XYZ or Yxy as the three color contributors.

The Digital Cinema Initiative (DCI) defined the file format for distribution to theaters using an XYZ format. The reason for adopting XYZ was specifically to allow adaptation of new display technologies of the future. By including every color possible within a 3D space, legacy content would be compatible with any new display methods. This system has been in place since 2005.

While XYZ works very well within the closed infrastructure of digital cinema, it has drawbacks once it is used in other applications (e.g., broadcast, streaming). The reason for this is that many applications have limits on signal bandwidth. Both RGB and XYZ contain luminance in all three channels, which requires a system where each subpixel uses discrete image information. To get around this, a technology is employed to spread color information over several pixel areas. The logic behind this is that (1) image detail is held in the luminance component of the image and (2) resolution of the color areas is operable to be be much lower without an objectionable loss of picture quality. Therefore, methods such as $YP_BP_R$, $YC_BC_R$, and $IC_TC_P$ are used to move images. Using color difference encoding with image subsampling allows quality images to be moved at lower signal bandwidths. Thus, RGB or XYZ only utilize a 4:4:4 sampling system, while $YC_BC_R$ is operable be implemented as a 4:4:4, 4:2:2, 4:1:1, or a 4:2:0 sampled system.

There is a long-standing, unmet need for a system operable to describe more than an RGB image. In a preferred embodiment, the present invention advantageously uses Yxy or Yu'v' to describe images outside of an RGB gamut. Further, the Yxy or Yu'v' system is operable to transmit data using more than three primaries (e.g., more than RGB). The Yxy or Yu'v' system advantageously provides for all color possibilities to be presented to the display. Further, the Yxy or Yu'v' system bridges the problems between scene referred and display referred imaging. In an end-to-end system, with a defined white point and EOTF, image data from a camera or graphics generator must conform to the defined display. With the advent of new displays and the use of High Dynamic Range displays, this often requires that the source image data (e.g., scene referred) be re-authored for the particular display (e.g., display referred). A scene-referred workflow refers to manipulating an image prior to its transformation from camera color space to display color space. The ease with which XYZ or ACES 0 are operable to be used to color time, then move to Yxy or Yu'v' to meet the display requirements, allows for a smoother approach to the display not losing any of the color values and keeping the color values as positive values. This is an advantage of Yxy or Yu'v', even if an image is only manipulated after it has been transformed from camera color space to display color space as displayed referred imaging. The Yxy or Yu'v' system is agnostic to both the camera data and the display characteristics, thus simplifying the distribution of electronic images. The Yxy or Yu'v' system of the present invention additionally does not increase data payloads and is operable to be substituted into any RGB file or transport system. Additionally, xy or u'v' information is operable to be subsampled, allowing for 4:2:2, 4:1:1, and 4:2:0 packaging. The present invention also does not require specific media definitions to address limits in a display gamut. Displays with different color primaries (e.g., multi-primary display) are operable to display the same image if the color falls within the limits of that display using the Yxy or Yu'v' system of the present invention. The Yxy or Yu'v' system also allows for the addition of more primaries to fill the visual spectrum, reducing metameric errors. Color fidelity is operable to extend beyond the prior art R+G+B=W model. Displays with any number of color primaries and various white points are operable to benefit from the use of a Yxy or Yu'v' approach to define one media source encode for all displays. Conversion from wide gamut cameras to multi-primary displays is operable to be accomplished using a multiple triad conversion method, which is operable to reside in the display, thereby simplifying transmission of image data.

Out of gamut information is operable to be managed by the individual display, not by the media definitions. Luminance is described only in one channel (Y), and because xy or u'v' do not contain any luminance information, a change in Y is independent of hue or chroma, making conversions between SDR and HDR simpler. Any camera gamut is operable to be coded into a Yxy or Yu'v' encode, and only minor modifications are required to implement a Yxy or Yu'v' system. Conversion from Yxy or Yu'v' to RGB is simple, with minimal latency processing and is completely compatible with any legacy RGB system.

There is also a long-standing, unmet need for a system that replaces optically-based gamma functions with a code efficient non-linearity method (e.g., data range reduction (DRR)). DRR is operable to optimize data efficiency and simplify image display. Further, DRR is not media or display specific. By using a data efficient non-linearity instead of a representation of an optical gamma, larger data words (e.g., 16-bit float) are operable to be preserved as 12-bit, 10-bit, or 8-bit integer data words.

As previously described, the addition of primaries is simplified by the Yxy or Yu'v' process. Further, the brightness of the display is advantageously operable to be increased by adding more primaries. When brightness is delivered in a range from 0 to 1, the image brightness is operable to be scaled to any desired display brightness using DRR.

XYZ needs 16-bit float and 32-bit float encode or a minimum of 12 bits for gamma or log encoded images for better quality. Transport of XYZ must be accomplished using a 4:4:4 sample system. Less than a 4:4:4 sample system causes loss of image detail because Y is used as a coordinate along with X and Z and carries color information, not a value. Further, X and Z are not orthogonal to Y and, therefore, also include luminance information. Advantageously, converting to Yxy (or Yu'v') concentrates the luminance in Y only, leaving two independent and pure chromaticity values. In a preferred embodiment, X, Y, and Z are used to calculate x and y. Alternatively, X, Y, and Z are used to calculate u' and v'.

However, if Y is used as a luminance value with two independent colorimetric coordinates (e.g., x and y, u' and v', u and v, etc.) used to describe color, then a system using subsampling is possible. The system is operable to use any two independent colorimetric coordinates with similar properties to x and y, u' and v', and/or u and v. In a preferred embodiment, the two independent colorimetric coordinates are x and y and the system is an Yxy system. Advantageously, the two independent colorimetric coordinates are independent of a white point. In a preferred embodiment, the image data includes a reference to at least one white point.

Current technology uses components derived from the legacy NTSC television system. Encoding described in SMPTE, ITU, and CTA standards includes methods using subsampling as 4:2:2, 4:2:0, and 4:1:1. Advantageously, this allows for color transportation of more than three primaries, including, but not limited to, at least four primaries, at least five primaries, at least six primaries, at least seven primaries, at least eight primaries, at least nine primaries, at least ten primaries, at least eleven primaries, and/or at least twelve primaries (e.g., through a SMPTE 292 or an HDMI 1.2 transport).

System 1, System 2, and System 3 use a YCbCr expansion to transport six color primary data sets, and the same transport is operable to accommodate the image information as Yxy where Y is the luminance information and x,y describe CIE 1931 color coordinates in the half sample segments of the data stream (e.g., 4:2:2). Alternatively, x,y are fully sampled (e.g., 4:4:4). In yet another embodiment, the sampling rate is 4:2:0 or 4:1:1.

Advantageously, there is no need to add more channels, nor is there any need to separate the luminance information from the color components. Further, x,y have no reference to any primaries because x,y are explicit colorimetric data positions. In the Yxy space, x and y are chromaticity coordinates such that x and y are operable to be used to define a gamut of visible color. Another advantage is that an image is operable to be sent as linear (i.e., without a non-linear function applied) with an optical-optical transfer function (OOTF) added after the image is received, rather than requiring an OOTF applied to the signal prior to transmission. This allows for a much simpler encode and decode system.

Figure 13:
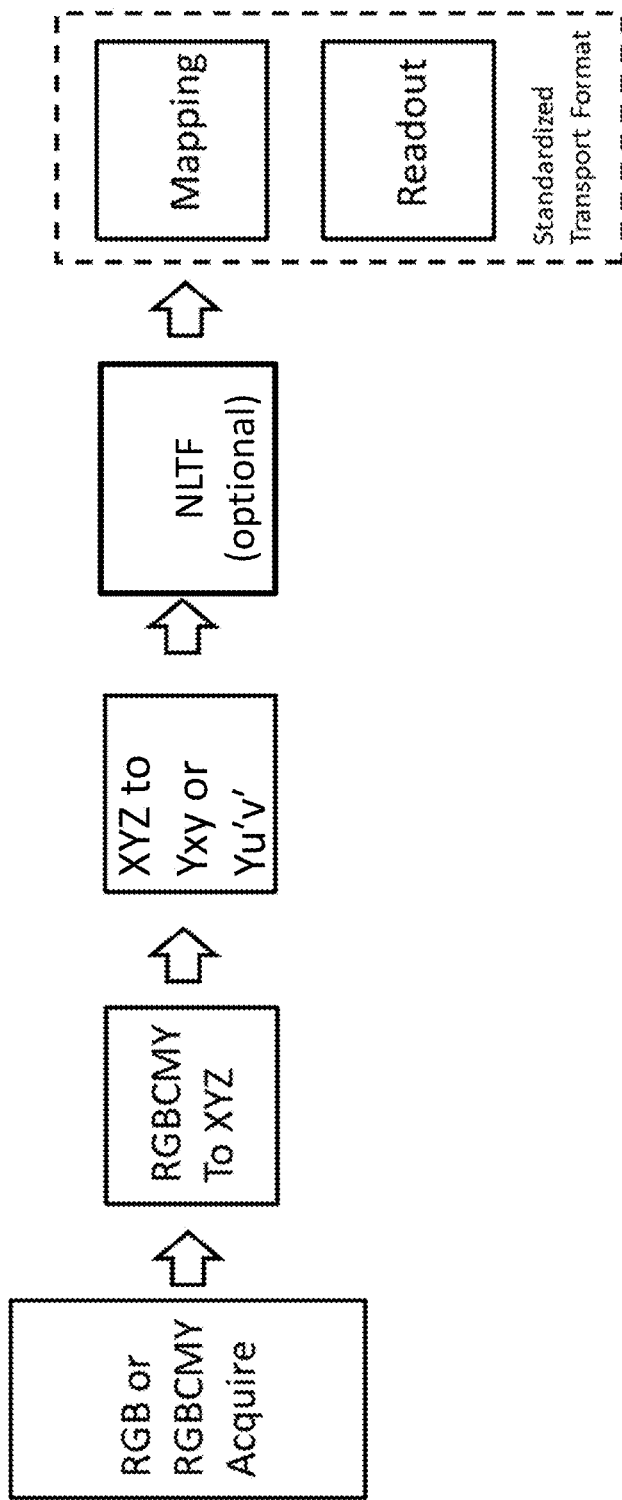
FIG. 13 illustrates one embodiment of an Yxy encode with a non-linear transfer function (NLTF).

FIG. 13 illustrates one embodiment of a Yxy or Yu'v' encode with a non-linear transfer function (NLTF). Image data is acquired in any format (e.g., RGB, RGBCMY, CMYK) operable to be converted to XYZ linear data. The XYZ data is then converted to Yxy or Yu'v' data, and the Yxy or Yu'v' data is processed through an NLTF. The processed Yxy or Yu'v' data is then converted to a standardized transportation format for mapping and readout. Advantageously, in one embodiment, x and y remain as independent colorimetric coordinates and the non-linear transfer function is only applied to Y, thus providing simpler decoding of x and y values. In one embodiment, u' and v' remain as independent colorimetric coordinates and the non-linear transfer function is only applied to Y, thus providing simpler decoding of u' and v' values. In another embodiment, advantageously, application of the NLTF to all three channels provides compression in the system. In one embodiment, the NLTF is described in ITU-R BT.2100 or ITU-R BT.1886. Advantageously, Y is orthogonal to x and y, and remains orthogonal to x and y even when a non-linear function is applied. Y is also orthogonal to u' and v', and remains orthogonal to u' and v' even when a non-linear function is applied. Although the example shown includes Yxy and Yu'v' data, System 4 is compatible with a plurality of data formats including data formats using one luminance coordinate and two colorimetric coordinates.

There are many different RGB sets so the matrix used to convert the image data from a set of RGB primaries to XYZ will involve a specific solution given the RGB values:

$$\begin{bmatrix} X \\ Y \\ Z \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix}$$

In an embodiment where the image data is 6P-B data, the following equation is used to convert to XYZ data:

$$\begin{bmatrix} X \\ Y \\ Z \end{bmatrix}_{D65} = \begin{bmatrix} 0.4124000 & 0.3576000 & 0.1805000 & 0.1574900 & 0.3427600 & 0.4502060 \\ 0.2126000 & 0.7152000 & 0.0721998 & 0.3132660 & 0.1347200 & 0.5520130 \\ 0.0193001 & 0.1192000 & 0.9505000 & 0.4814200 & 0.5866620 & 0.0209755 \end{bmatrix} \begin{bmatrix} R \\ G \\ B \\ C \\ M \\ Y \end{bmatrix}_{6P-B}$$

In an embodiment where the image data is 6P-C data with a D60 white point, the following equation is used to convert to XYZ data:

$$\begin{bmatrix} X \\ Y \\ Z \end{bmatrix}_{D60_{ACES}} = \begin{bmatrix} 0.50836664 & 0.26237069 & 0.18337670 & 0.15745217 & 0.36881328 & 0.42784843 \\ 0.23923145 & 0.68739938 & 0.07336917 & 0.33094114 & 0.14901541 & 0.52004327 \\ -0.0001363 & 0.04521596 & 0.96599714 & 0.47964602 & 0.52900498 & 0.00242485 \end{bmatrix} \begin{bmatrix} R \\ G \\ B \\ C \\ M \\ Y \end{bmatrix}_{6P-C_{refD60}}$$

In an embodiment where the image data is 6P-C data with a D65 white point, the following equation is used to convert to XYZ data:

$$\begin{bmatrix} X \\ Y \\ Z \end{bmatrix}_{D65} = \begin{bmatrix} 0.48657095 & 0.26566769 & 0.19821729 & 0.32295962 & -0.54969800 & 1.177199435 \\ 0.22897456 & 0.69173852 & 0.07928691 & 0.67867175 & -0.22203240 & 0.543360700 \\ 0.00000000 & 0.04511338 & 1.04394437 & 0.98336936 & -0.78858190 & 0.894270250 \end{bmatrix} \begin{bmatrix} R \\ G \\ B \\ C \\ M \\ Y \end{bmatrix}_{6P-C_{refD65}}$$

To convert the XYZ data to Yxy data, the following equations are used:

$$Y = Y$$
$$x = \frac{X}{(X+Y+Z)}$$
$$y = \frac{Y}{(X+Y+Z)}$$

Figure 14:
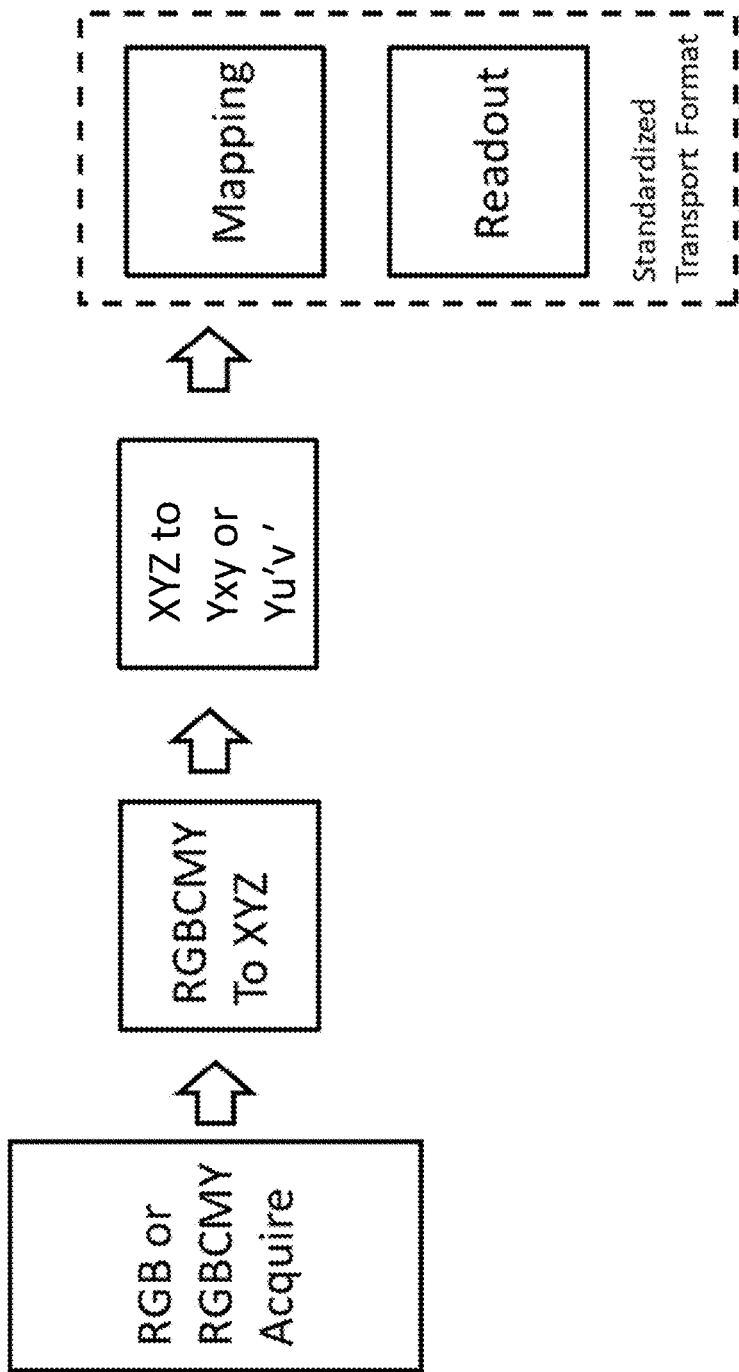
FIG. 14 illustrates one embodiment of an Yxy encode without an NLTF.

FIG. 14 illustrates one embodiment of a Yxy or Yu'v' encode without an NLTF. Image data is acquired in any format (e.g., RGB, RGBCMY, CMYK) operable to be converted to XYZ data. The XYZ data is then converted to Yxy or Yu'v' data, and then converted to a standardized transportation format for mapping and readout. Although the example in FIG. 14 shows a Yxy or Yu'v' encode, System 4 is operable to be used with a plurality of data formats.

Figure 15:
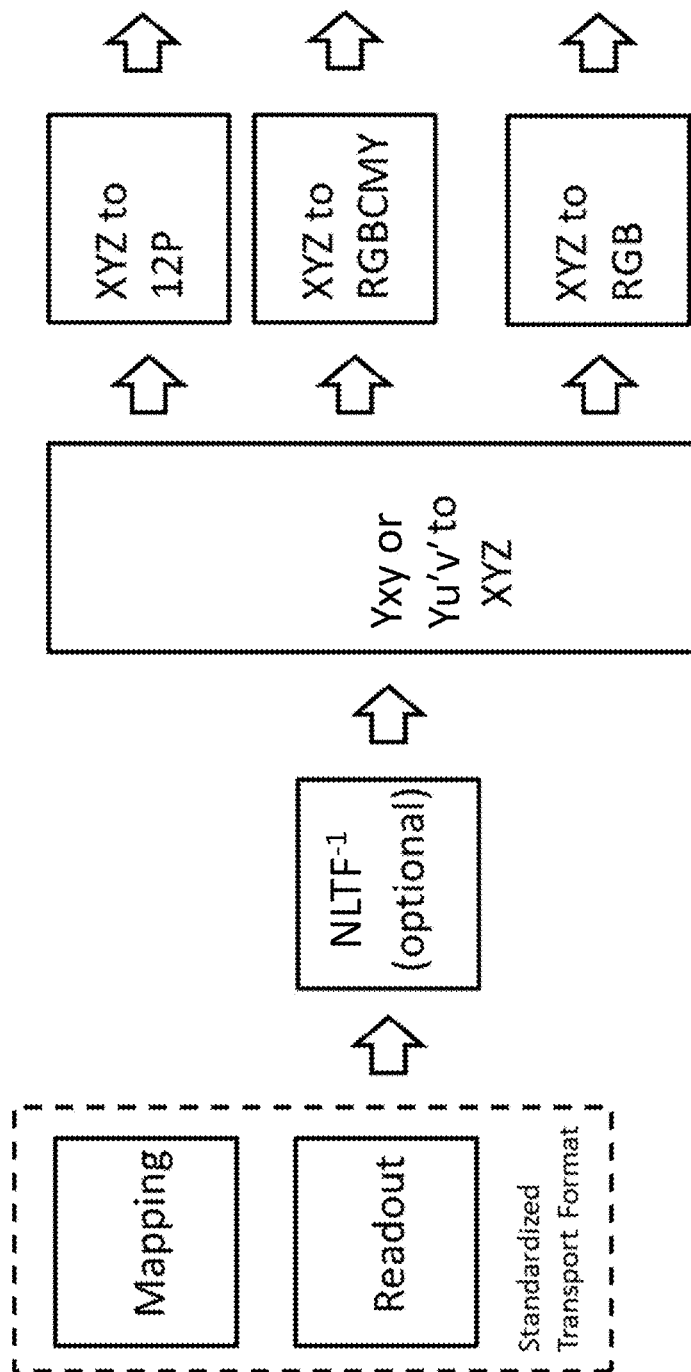
FIG. 15 illustrates one embodiment of an Yxy decode with an inverse non-linear transfer function ($NLTF^{-1}$).

FIG. 15 illustrates one embodiment of a Yxy or Yu'v' decode with an inverse non-linear transfer function (NLTF$^{-1}$). After mapping and readout, the data is processed through an NLTF$^{-1}$ to yield the Yxy or Yu'v' data. The Yxy or Yu'v' data is then converted back to the XYZ data. The XYZ data is operable to be converted to multiple data formats including, but not limited to, RGB, CMYK, 6P (e.g., 6P-B, 6P-C), and gamuts including at least four primaries through at least twelve primaries. Although the example in FIG. 15 shows a Yxy or Yu'v' decode, System 4 is operable to be used with a plurality of data formats.

To convert the Yxy data to the XYZ data, the following equations are used:

$$Y = Y$$
$$X = \left(\frac{x}{y}\right)Y$$
$$Z = \left(\frac{(1-x-y)}{y}\right)Y$$

Figure 16:
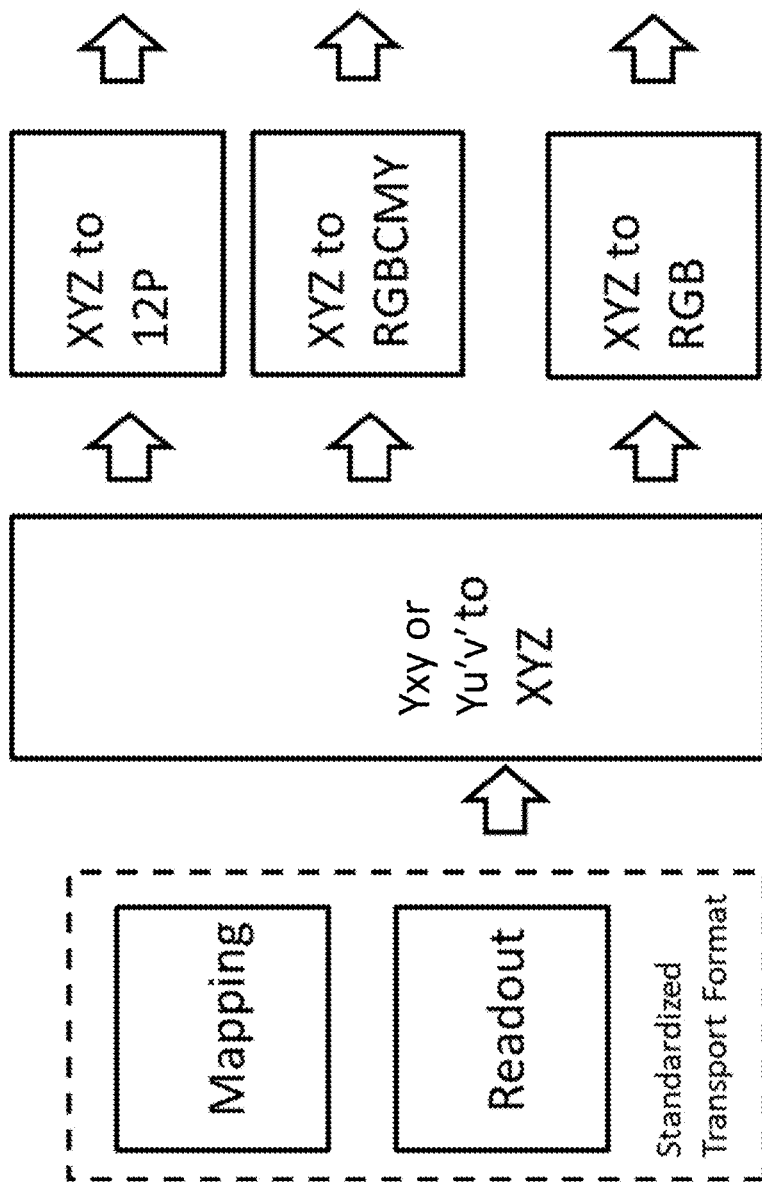
FIG. 16 illustrates one embodiment of an Yxy decode without an $NLTF^{-1}$.

FIG. 16 illustrates one embodiment of a Yxy or Yu'v' decode without an NLTF. After mapping and readout, the Yxy or Yu'v' data is then converted to the XYZ data. The XYZ data is operable to be converted to multiple data formats including, but not limited to, RGB, CMYK, 6P (e.g., 6P-B, 6P-C), and gamuts including at least four primaries through at least twelve primaries. Although the example in FIG. 16 shows a Yxy or Yu'v' encode, System 4 is operable to be used with a plurality of data formats.

FIG. 17 illustrates one embodiment of a 4:2:2 Yxy encode with an NLTF. A full bandwidth luminance channel (Y) is used to carry image detail and the remaining color coordinate components (e.g., x,y) are half sampled. In the example shown in FIG. 17, the Yxy data undergoes a 4:2:2 encode. Other encoding methods (e.g., 4:4:4, 4:2:0, 4:1:1) are compatible with the present invention. Other quantization methods and bit depths are also compatible with the present invention. In one embodiment, the bit depth is 8 bits, 10 bits, 12 bits, 14 bits, and/or 16 bits. In one embodiment, the Yxy values are sampled as floats (e.g., 16-bit floating point representation, 32-bit floating point representation). For example, and not limitation, the floats include IEEE 754 defined floats. Although the example in FIG. 17 shows a Yxy decode, System 4 is operable to be used with a plurality of data formats.

FIG. 18 illustrates one embodiment of a 4:2:2 Yxy encode without an NLTF. In the example shown in FIG. 18, the Yxy data undergoes a 4:2:2 encode. Other encoding methods (e.g., 4:4:4, 4:2:0, 4:1:1) are compatible with the present invention. Although the example in FIG. 18 shows a Yxy encode, System 4 is operable to be used with a plurality of data formats.

Figure 19:
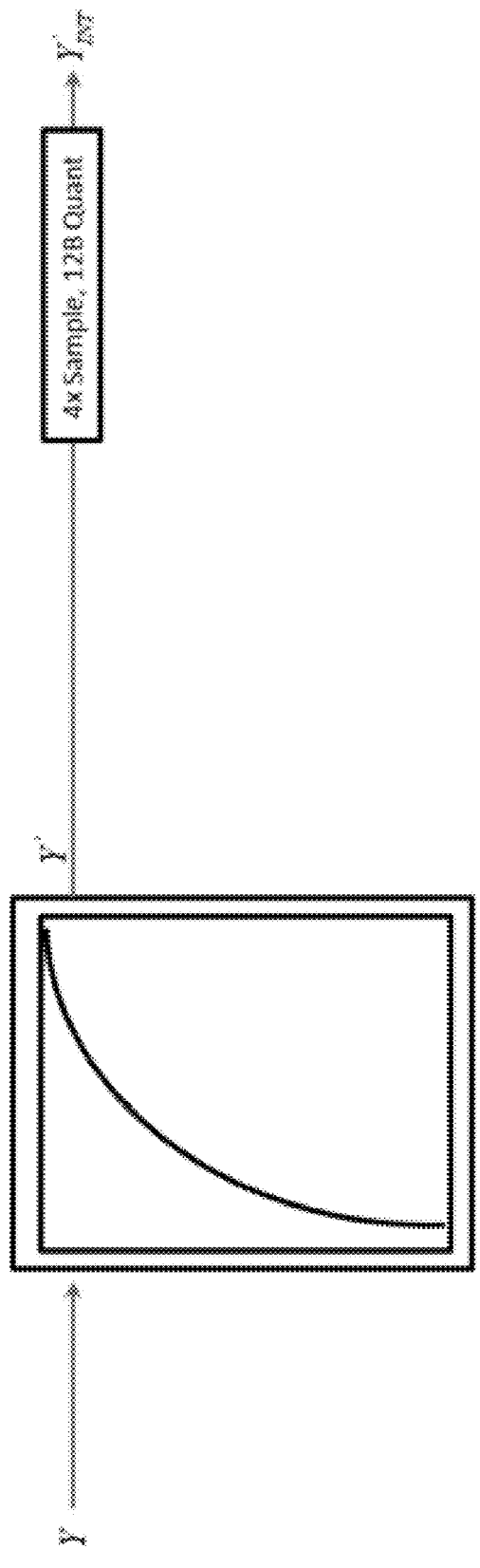
FIG. 19 illustrates one embodiment of a 4:4:4 Yxy encode with an NLTF.
Figure 19:
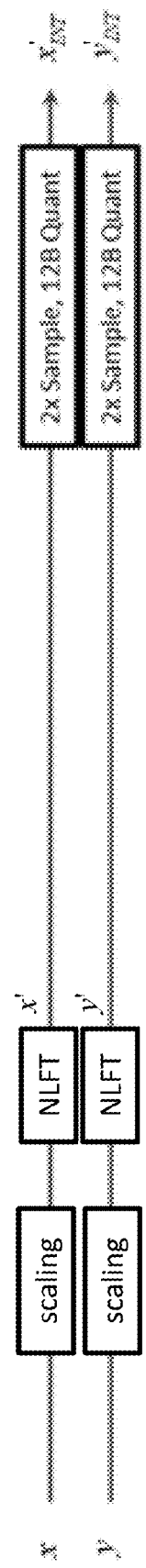

FIG. 19 illustrates one embodiment of a 4:2:2 Yxy encode with an NLTF applied to all three channels and linear scaling of x,y. A full bandwidth luminance channel (Y) is used to carry image detail and the remaining color coordinate components (e.g., x,y) are half sampled. In the example shown in FIG. 19, the Yxy data undergoes a 4:2:2 encode. Other encoding methods (e.g., 4:4:4, 4:2:0, 4:1:1) are compatible with the present invention. Other quantization methods and bit depths are also compatible with the present invention. In one embodiment, the bit depth is 8 bits, 10 bits, 12 bits, 14 bits, and/or 16 bits. In one embodiment, the Yxy values are sampled as floats (e.g., 16-bit floating point representation, 32-bit floating point representation). For example, and not limitation, the floats include IEEE 754 defined floats. Although the example in FIG. 19 shows a Yxy decode, System 4 is operable to be used with a plurality of data formats.

Figure 20:
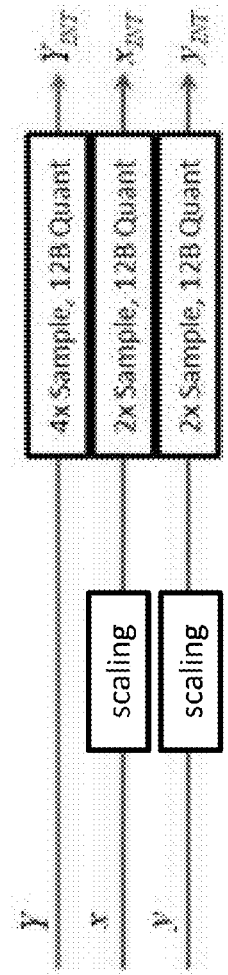
FIG. 20 illustrates one embodiment of a 4:4:4 Yxy encode without an NLTF.

FIG. 20 illustrates one embodiment of a 4:2:2 Yxy encode without an NLTF and with linear scaling of x,y. In the example shown in FIG. 20, the Yxy data undergoes a 4:2:2 encode. Other encoding methods (e.g., 4:4:4, 4:2:0, 4:1:1) are compatible with the present invention. Although the example in FIG. 20 shows a Yxy encode, System 4 is operable to be used with a plurality of data formats.

Figure 21:
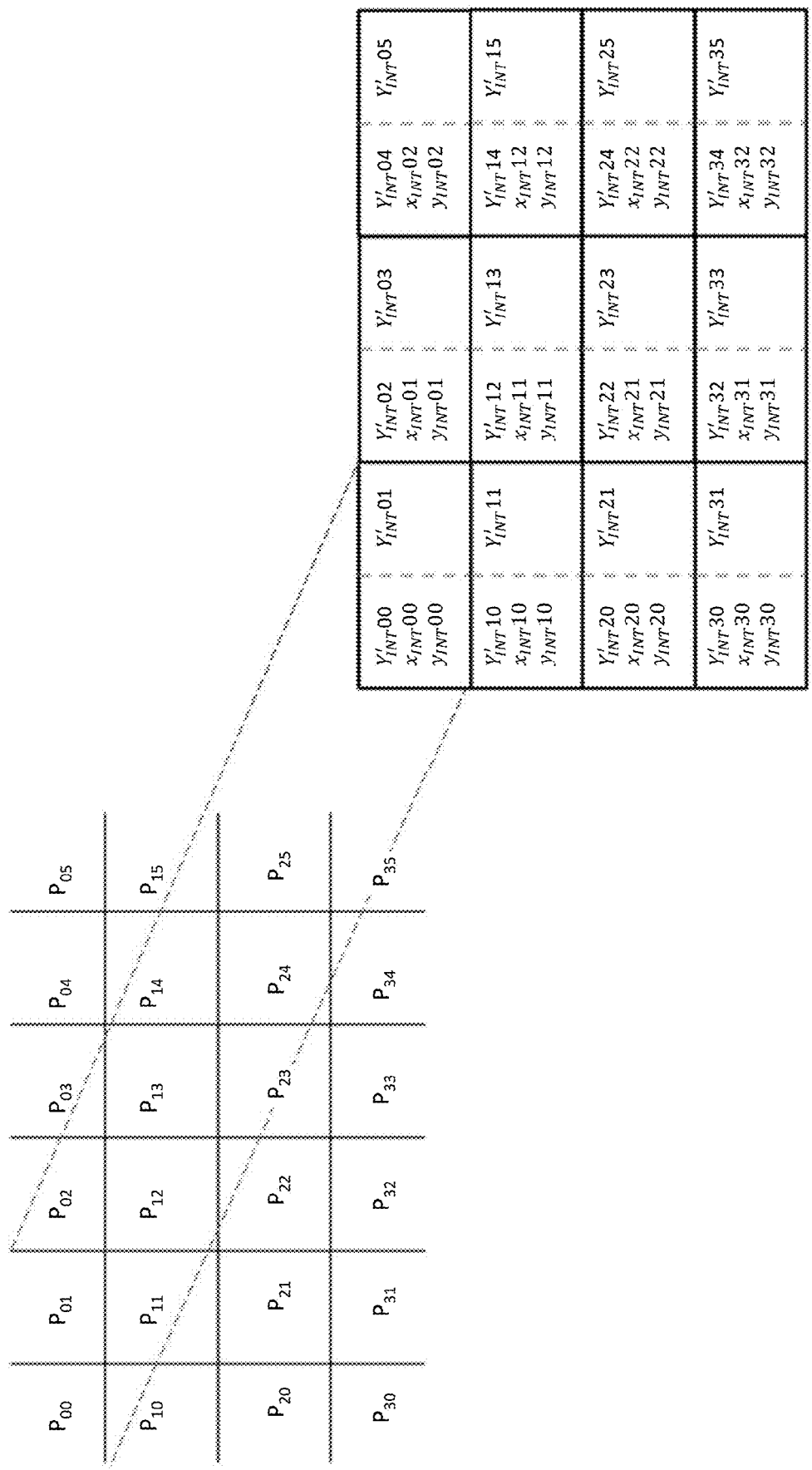
FIG. 21 illustrates sample placements of Yxy system components for a 4:2:2 pixel mapping.

FIG. 21 illustrates sample placements of Yxy system components for a 4:2:2 pixel mapping. A plurality of pixels (e.g., $P_{00}$-$P_{35}$) is shown in FIG. 21. The first subscript number refers to a row number and the second subscript number refers to a column number. For pixel $P_{00}$, $Y'_{INT00}$ is the luma and the color components are $x_{INT00}$ and $y_{INT00}$. For pixel $P_{01}$, $Y'_{INT01}$ is the luma. For pixel $P_{10}$, $Y'_{INT10}$ is the luma and the color components are $x_{INT10}$ and $y_{INT10}$. For pixel $P_{11}$, $Y'_{INT11}$ is the luma. In one embodiment, the luma and the color components (e.g., the set of image data) corresponding to a particular pixel (e.g., $P_{00}$) is used to calculate color and brightness of subpixels. Although the example shown in FIG. 21A includes luma, it is equally possible that the data is sent linearly as luminance (e.g., $Y_{INT00}$). Further, although the example in FIG. 21 includes Yxy system components, System 4 is operable to be used with a plurality of data formats. While prior art systems often use x,y coordinates to map a gamut, the present invention is operable to provide pixel mapping data as Yxy data and transport data as a Y channel, a first colorimetric coordinate channel (e.g., x), and a second colorimetric coordinate channel (e.g., y).

Figure 22:
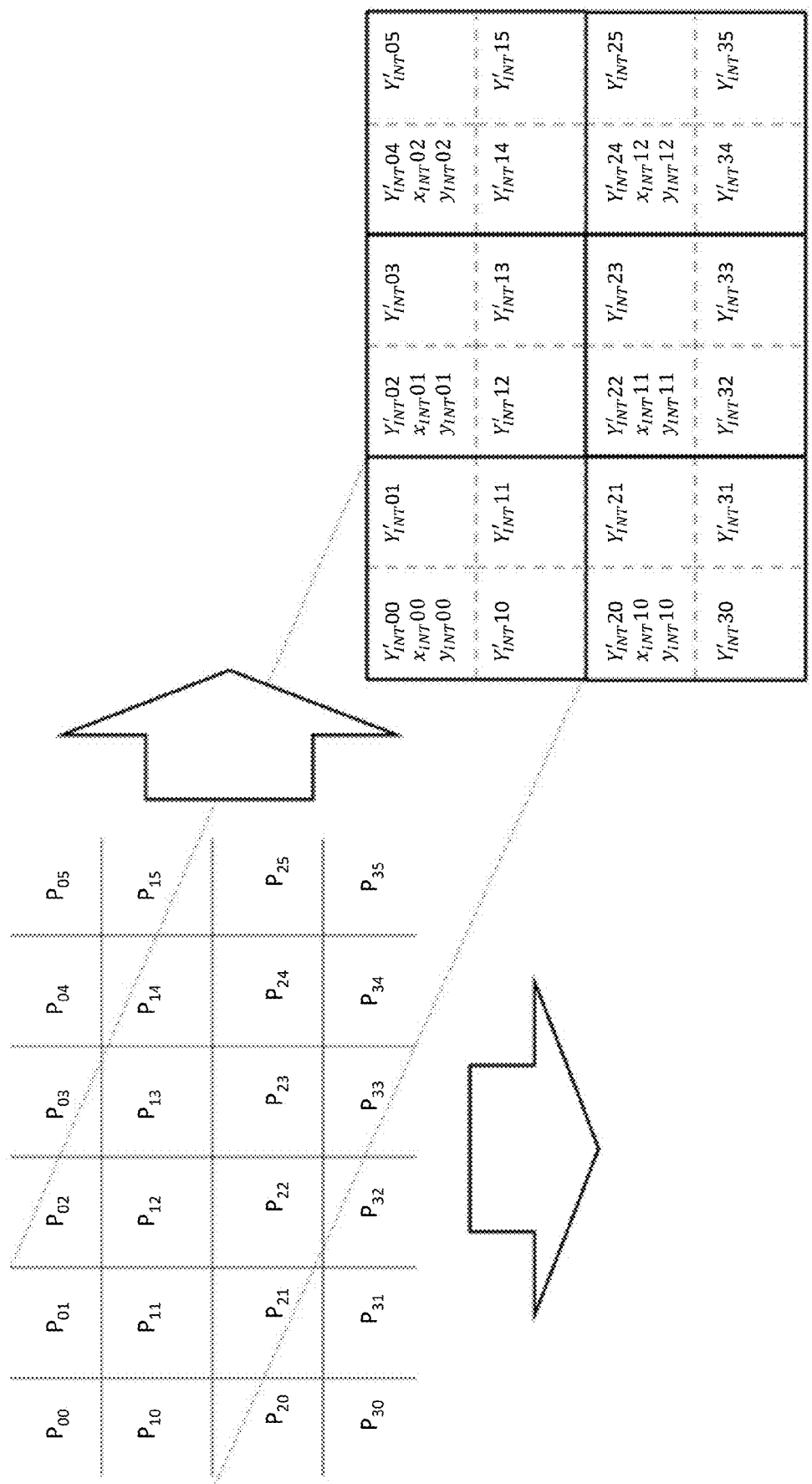
FIG. 22 illustrates sample placements of Yxy system components for a 4:2:0 pixel mapping.

FIG. 22 illustrates sample placements of Yxy system components for a 4:2:0 pixel mapping. A plurality of pixels (e.g., $P_{00}$-$P_{35}$) is shown in FIG. 22. The first subscript number refers to a row number and the second subscript number refers to a column number. For pixel $P_{00}$, $Y'_{INT00}$ is the luma and the color components are $x_{INT00}$ and $y_{INT00}$. For pixel $P_{01}$, $Y'_{INT01}$ is the luma. For pixel $P_{10}$, $Y'_{INT10}$ is the luma. For pixel $P_{11}$, $Y'_{INT11}$ is the luma. In one embodiment, the luma and the color components corresponding to a particular pixel (e.g., $P_{00}$) is used to calculate color and brightness of subpixels. Although the example shown in FIG. 22 includes luma, it is equally possible that the data is sent linearly as luminance (e.g., $Y_{INT00}$). Further, Although the example in FIG. 22 includes Yxy system components, System 4 is operable to be used with a plurality of data formats.

In one embodiment, the set of image data includes pixel mapping data. In one embodiment, the pixel mapping data includes a subsample of the set of values in Yxy color space (e.g., 4:2:2). In one embodiment, the pixel mapping data includes an alignment of the set of values in Yxy color space.

Table 6 illustrates mapping to SMPTE ST 2110 for 4:2:2 sampling. Table 7 illustrates mapping to SMPTE ST 2110 for 4:4:4 linear and non-linear sampling.

TABLE 6

| Sampling | Bit Depth | pgroup octets | pixels | Y PbPr Sample Order | Yxy |
|---|---|---|---|---|---|
| 4:2:2 | 8 | 8 | 2 | $C_B'$, Y0', $C_R'$, Y1' | y0, Y0', x0, y1, Y1', x1 |
|  | 10 | 10 | 2 | $C_B'$, Y0', $C_R'$, Y1' | y0, Y0', x0, y1, Y1', x1 |
|  | 12 | 12 | 2 | $C_B'$, Y0', $C_R'$, Y1' | y0, Y0', x0, y1, Y1', x1 |
|  | 16, 16f | 16 | 2 | $C'_B$, Y0', $C'_R$, Y'1 | y0, Y0', x0, y1, Y1', x1 |

TABLE 7

| Sampling | Bit Depth | pgroup octets | pixels | RGB/XYZ Sample Order | Yxy |
|---|---|---|---|---|---|
| 4:4:4 Linear | 8 | 3 | 1 | R, G, B | x, Y, y |
|  | 10 | 15 | 4 | R0, G0, B0, R1, G1, B1, R2, G2, B2 | x, Y0, y, x, Y1, y, x, Y2, y |
|  | 12 | 9 | 2 | R0, G0, B0, R1, G1, B1 | x, Y0, y, x, Y1, y |
|  | 16, 16f | 6 | 1 | R, G, B | x, Y, y |
| 4:4:4 Non-Linear | 8 | 3 | 1 | R', G', B' | x, Y', y |
|  | 10 | 15 | 4 | R0', G0', B0', R1', G1', B1', R2', G2', B2' | x, Y0', y, x, Y1', y, x, Y2', y |
|  | 12 | 9 | 2 | R0', G0', B0', R1', G1', B1' | x, Y0', y, x, Y1', y |
|  | 16, 16f | 6 | 1 | R', G', B' | x, Y', y |

Figure 23:
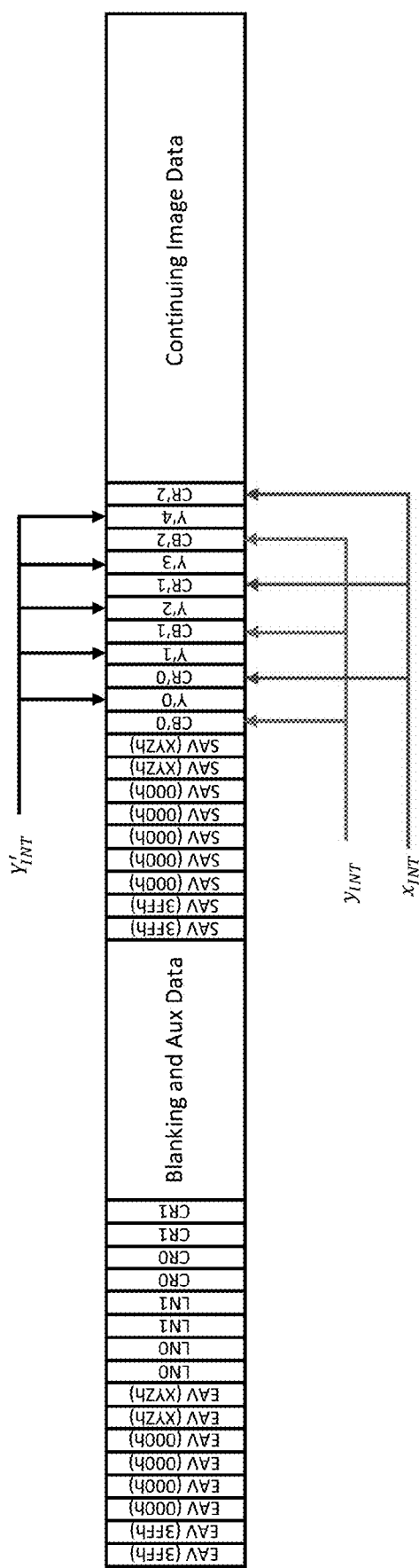
FIG. 23 illustrates one embodiment of a SMPTE ST292 Yxy system mapping.

FIG. 23 illustrates one embodiment of a SMPTE ST292 Yxy system mapping. To fit a Yxy system into a SMPTE ST292 stream involves the following substitutions: $Y'_{INT}$ is placed in the Y data segments, $x_{INT}$ is placed in the Cr data segments, and $y_{INT}$ is placed in the Cb data segments. In a preferred embodiment, luminance or luma is placed in the Y data segments, a first colorimetric coordinate is placed in the Cr data segments, and a second colorimetric coordinate is placed in the Cb data segments. Although the example in FIG. 23 shows a Yxy system mapping, System 4 is operable to be used with a plurality of data formats.

Figure 24:
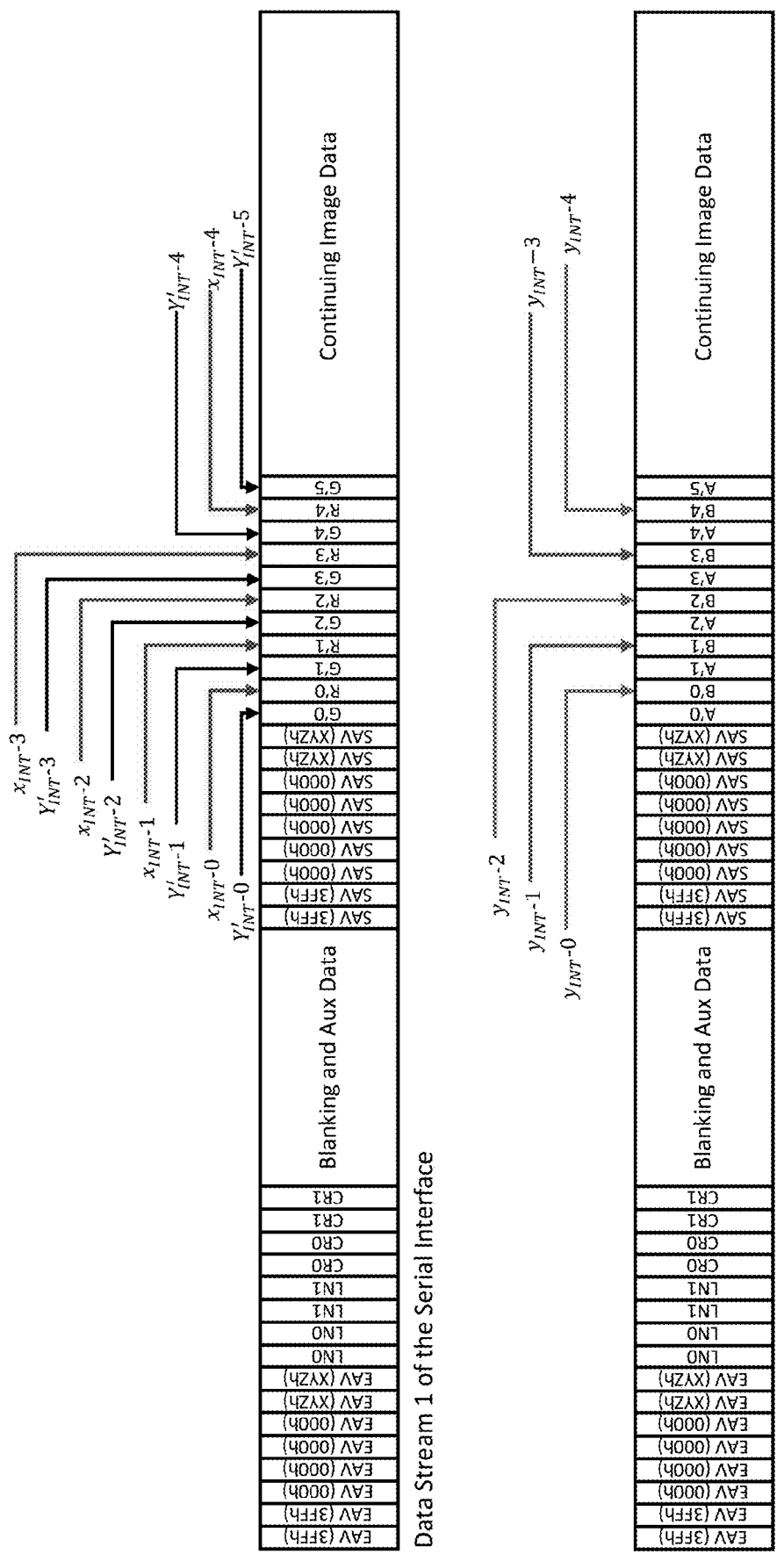
FIG. 24 illustrates one embodiment of a SMPTE ST2082 Yxy system mapping.

FIG. 24 illustrates one embodiment of a SMPTE ST2082 Yxy system mapping. To fit a Yxy system into a SMPTE ST292 stream involves the following substitutions: $Y'_{INT}$ is placed in the G data segments, $x_{INT}$ is placed in the R data segments, and $y_{INT}$ is placed in the B data segments. In a preferred embodiment, luminance or luma is placed in the G data segments, a first colorimetric coordinate is placed in the R data segments, and a second colorimetric coordinate is placed in the B data segments. Although the example in FIG. 24 shows a Yxy system mapping, System 4 is operable to be used with a plurality of data formats.

Figure 25:
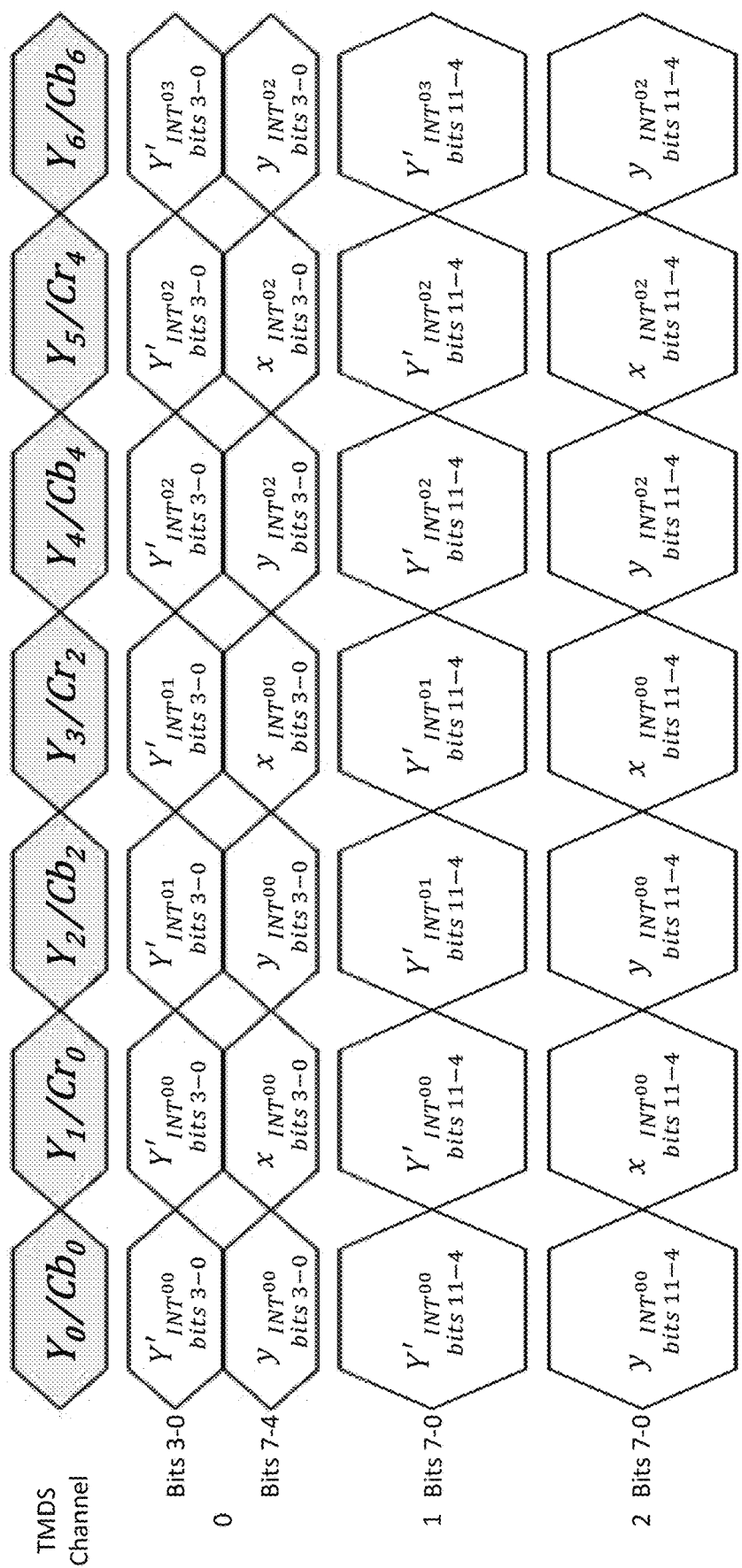
FIG. 25 illustrates one embodiment of Yxy inserted into a CTA 861 stream.

FIG. 25 illustrates one embodiment of Yxy inserted into a CTA 861 data stream. Although the example in FIG. 25 shows a Yxy system mapping, System 4 is operable to be used with a plurality of data formats.

FIG. 26A illustrates one embodiment of a Yxy decode with an $NLTF^{-1}$ applied only to the Y channel. In one embodiment, a non-linear function (e.g., $NLTF^{-1}$) is applied to the luma. The non-linear function is not applied to the two colorimetric coordinates. Although the example in FIG. 26A shows a Yxy decode, System 4 is operable to be used with a plurality of data formats.

In one embodiment, the NLTF$^{-1}$ is an inverse DRR function with a value between about 1.1 and about 4. In one embodiment, the NLTF$^{-1}$ is an inverse DRR function with a value between about 1.4 and about 4. In one embodiment, the NLTF$^{-1}$ is an inverse DRR function with a value between about 1.4 and about 2.4. In one embodiment, the NLTF$^{-1}$ is an inverse DRR function with a value between about 2 and about 4.

FIG. 26B illustrates one embodiment of a Yxy decode without an NLTF$^{-1}$ applied to any of the channels. In one embodiment, data is sent linearly as luminance. A non-linear function (e.g., an NLTF$^{-1}$) is not applied to the luminance or the two colorimetric coordinates. Although the example in FIG. 26B shows a Yxy decode, System 4 is operable to be used with a plurality of data formats.

Figure 27A:
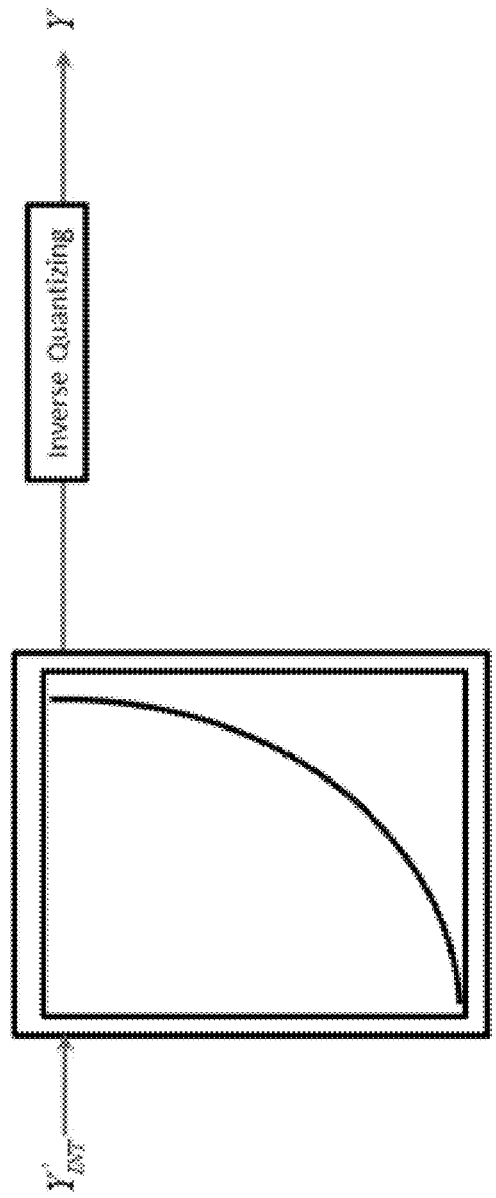
FIG. 27A illustrates one embodiment of a Yxy decode with an $NLTF^{-1}$ applied to all three channels and rescaling of x and y.
Figure 27A:
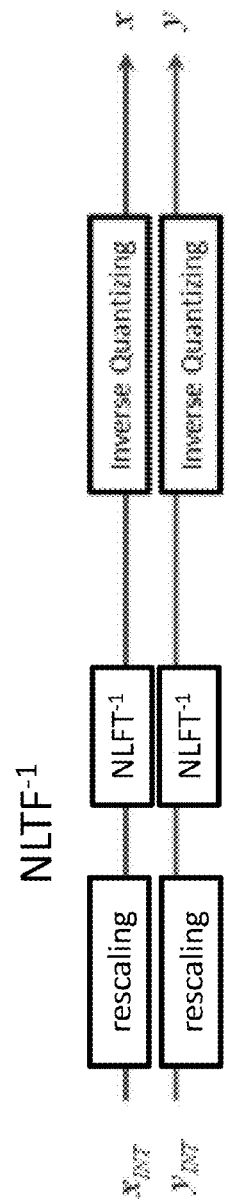

FIG. 27A illustrates one embodiment of a Yxy decode with an NLTF$^{-1}$ applied to all three channels and rescaling of x and y. In one embodiment, a non-linear function (e.g., an NLTF$^{-1}$) is applied to the luma and to the two colorimetric coordinates. Although the example in FIG. 27A shows a Yxy decode, System 4 is operable to be used with a plurality of data formats.

Figure 27B:
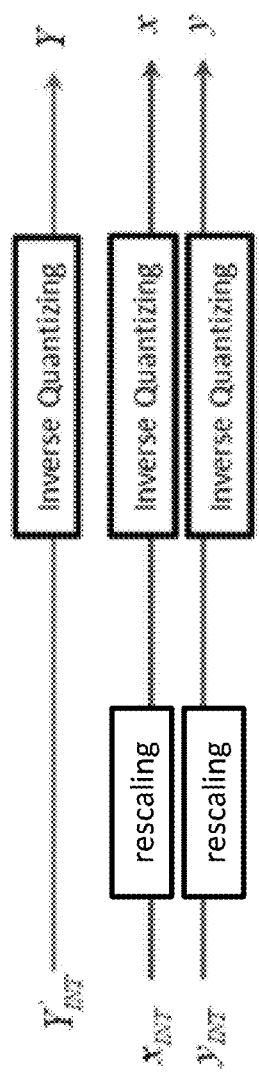
FIG. 27B illustrates one embodiment of a Yxy decode without an $NLTF^{-1}$ applied to any of the channels and with rescaling applied to the x and y channels.

FIG. 27B illustrates one embodiment of a Yxy decode without an NLTF$^{-1}$ applied to any of the channels and with rescaling applied to the x,y channels. In one embodiment, data is sent linearly as luminance. A non-linear function (e.g., an NLTF$^{-1}$) is not applied to the luminance or the two colorimetric coordinates. Although the example in FIG. 27B shows a Yxy decode, System 4 is operable to be used with a plurality of data formats (e.g., Yu'v').

Advantageously, XYZ is used as the basis of ACES for cinematographers and allows for the use of colors outside of the ITU-R BT.709 and/or the P3 color spaces. Further, XYZ is used for other standards (e.g., JPEG 2000, Digital Cinema Initiatives (DCI)), which could be easily adapted for System 4.

In one embodiment, the image data converter includes at least one lookup table (LUT). In one embodiment, the at least one lookup table maps out of gamut colors to zero. In one embodiment, the at least one lookup table maps out of gamut colors to a periphery of visible colors.

Transfer Functions

The system design minimizes limitations to use standard transfer functions for both encode and/or decode processes. Current practices used in standards include, but are not limited to, ITU-R BT.1886, ITU-R BT.2020, SMPTE ST274, SMPTE ST296, SMPTE ST2084, and ITU-R BT.2100. These standards are compatible with this system and require no modification.

Encoding and decoding multi-primary (e.g., 6P, RGBC) images is formatted into several different configurations to adapt to image transport frequency limitations. The highest quality transport is obtained by keeping all components as multi-primary (e.g., RGBCMY) components. This uses the highest sampling frequencies and requires the most signal bandwidth. An alternate method is to sum the image details in a luminance channel at full bandwidth and then send the color difference signals at half or quarter sampling (e.g., Y Cr Cb Cc Cy). This allows a similar image to pass through lower bandwidth transports.

An IPT system is a similar idea to the Yxy system with several exceptions. An IPT system or an $IC_TC_P$ system is still an extension of XYZ and is operable to be derived from RGB and multiprimary (e.g., RGBCMY, RGBC) color coordinates. An IPT color description is operable to be substituted within a 4:4:4 sampling structure, but XYZ has already been established and does not require the same level of calculations. For an $IC_TC_P$ transport system, similar substitutions are operable to be made. However, both substitution systems are limited in that a non-linear function (e.g., OOTF) is contained in all three components. Although the non-linear function is operable to be removed for IPT or $IC_TC_P$, the derivation would still be based on a set of RGB primaries with a white point reference. Removing the non-linear function may also alter the bit depth noise and compressibility.

For transport, simple substitutions are operable to be made using the foundation of what is described with transport of XYZ for the use of IPT in current systems as well as the current standards used for $IC_TC_P$.

Figure 28A:
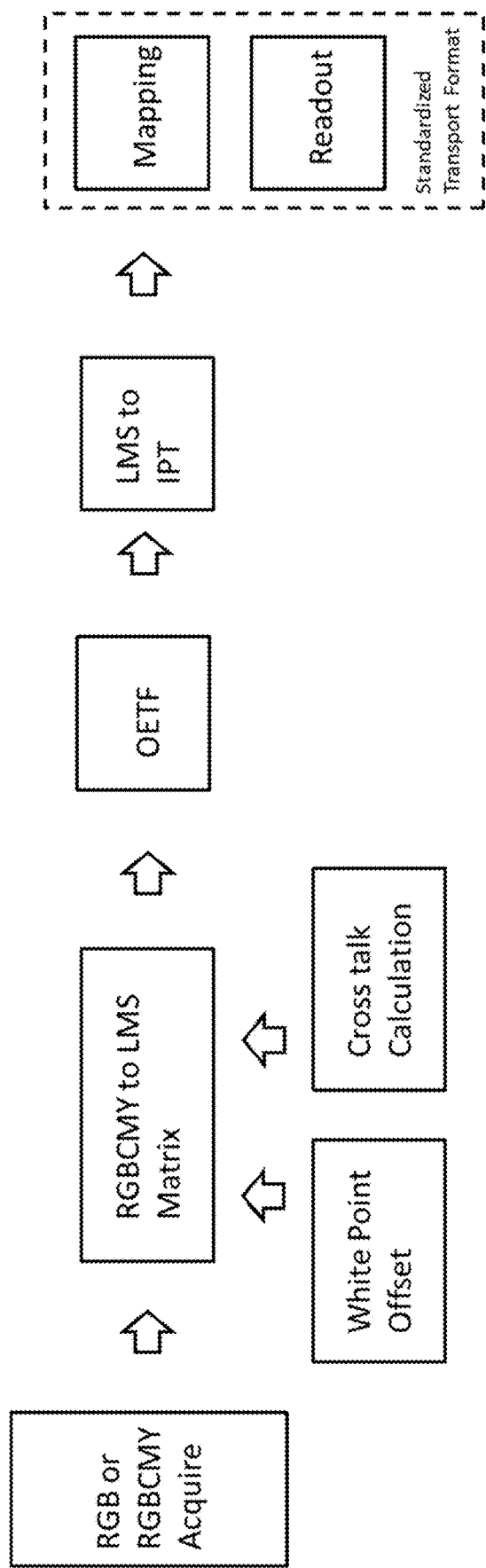
FIG. 28A illustrates one embodiment of an IPT 4:4:4 encode.

FIG. 28A illustrates one embodiment of an IPT 4:4:4 encode.

Figure 28B:
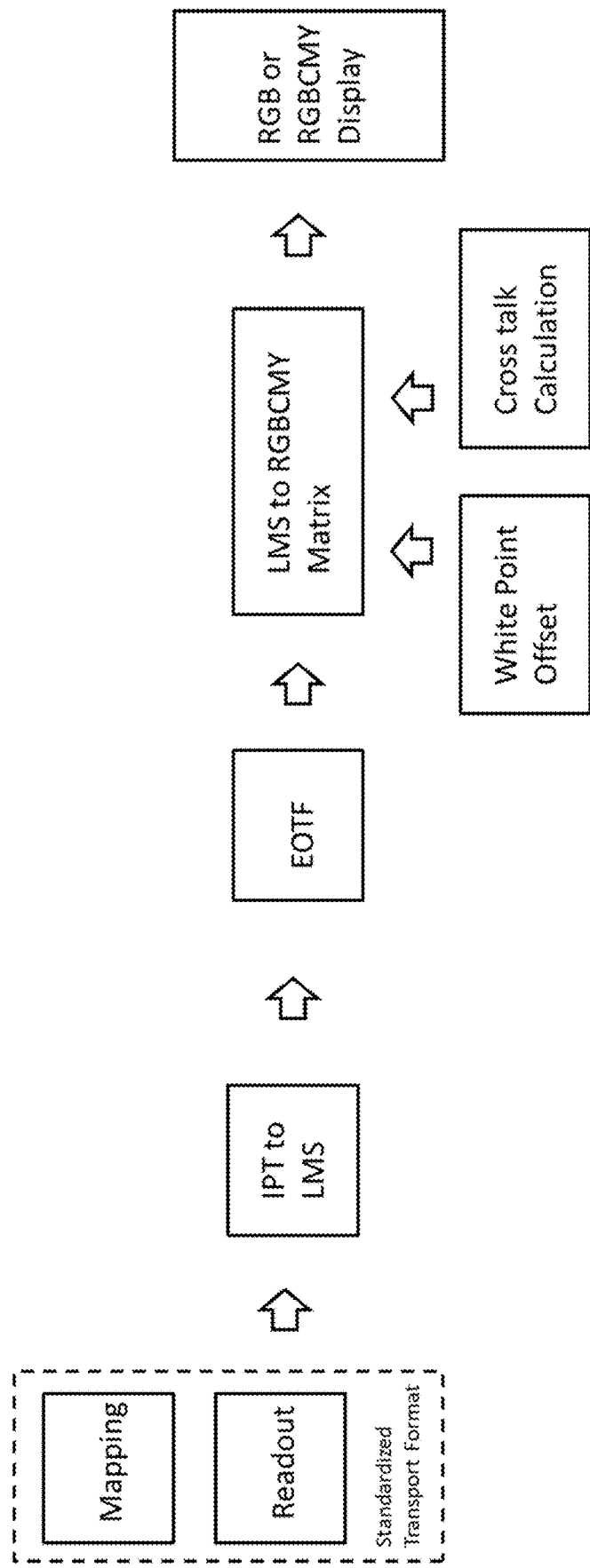
FIG. 28B illustrates one embodiment of an IPT 4:4:4 decode.

FIG. 28B illustrates one embodiment of an IPT 4:4:4 decode.

Figure 29A:
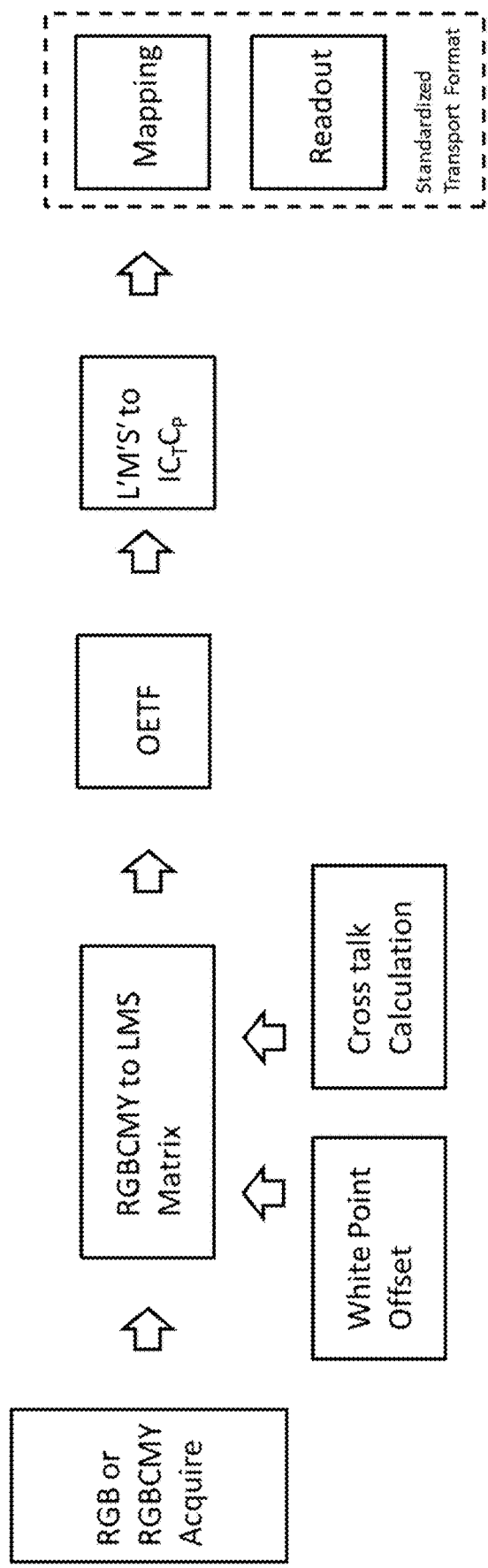
FIG. 29A illustrates one embodiment of an $IC_TC_P$ 4:2:2 encode.

FIG. 29A illustrates one embodiment of an $IC_TC_P$ 4:2:2 encode.

Figure 29B:
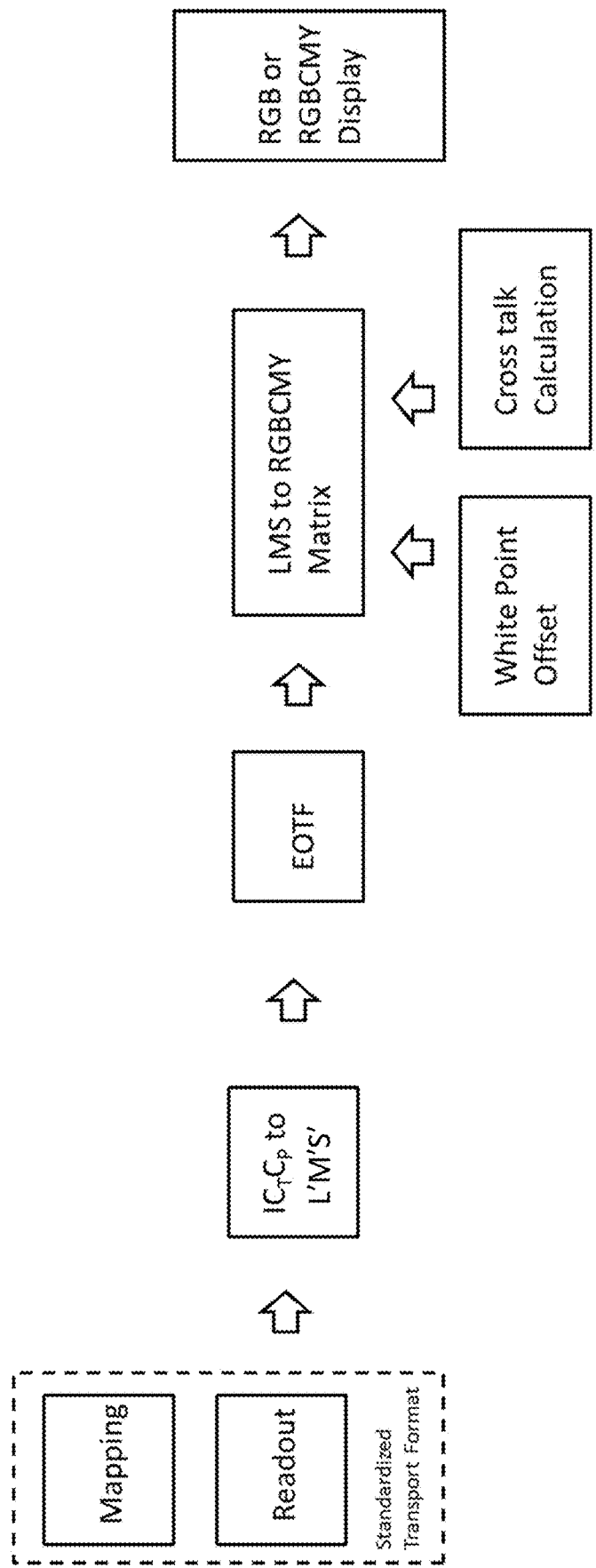
FIG. 29B illustrates one embodiment of an $IC_TC_P$ 4:2:2 decode.

FIG. 29B illustrates one embodiment of an $IC_TC_P$ 4:2:2 decode.

Transfer functions used in systems 1, 2, and 3 are generally framed around two basic implementations. For images displaying using a standard dynamic range, the transfer functions are defined within two standards. The OETF is defined in ITU-R BT.709-6, table 1, row 1.2. The inverse function, the EOTF, is defined in ITU-R BT.1886. For high dynamic range imaging, the perceptual quantizer (PQ) and hybrid log-gamma (HLG) curves are described in ITU-R BT.2100-2: 2018, table 4.

Prior art involves the inclusion of a non-linearity based on a chosen optical performance. As imaging technology has progressed, different methods have evolved. At one time, computer displays were using a simple 1.8 gamma, while television assumed an inverse of a 0.45 gamma. When digital cinema was established, a 2.6 gamma was used, and complex HDR solutions have recently been introduced. However, because these are embedded within the RGB structure, conversion between formats is operable to be very complicated and requires vast amounts of processing. Advantageously, a Yxy or Yu'v' system does not require complicated conversion or large amounts of processing.

Reexamination of the use of gamma and optical based transfer curves for data compression led to the development of the Data Range Reduction (DRR) technique. While the form of DRR is similar to the use of gamma, the purpose of DRR is to maximize the efficiency of the number of bits available to the display. The advantage is that DRR is operable to transfer to and/or from any OOTF system using a simple conversion method, such that any input transform is operable to be displayed using any output transform with minimal processing.

By using the DRR process, the image is operable to be encoded within the source device. The use of a common non-linearity allows faster and more accurate conversion. The design of this non-linearity is for data transmission efficiency, not as an optical transform function. This only works if certain parameters are set for the encode. Any pre-process is acceptable, but it must ensure an accurate 16-bit linear result.

Two methods are available for decode: (1) applying the inverse DRR to the input data and converting to a linear data format or (2) a difference between the DRR value and the desired display gamma is operable to be used to directly map the input data to the display for simple display gammas.

Another requirement is that the calculation be simple. By using DRR, processing is kept to a minimum, which reduces signal latency. The non-linearity (e.g., DRR) is applied based on bit levels, not image intensity.

System 4 is operable to use any of the transfer functions, which are operable to be applied to the Y component. However, to improve compatibility and to simplify conversion between standard transfer functions, a new method has been developed: a ½ DRR function. Advantageously, the ½ DRR function allows for a single calculation from the luminance (e.g., Y) component of the signal (e.g., Yxy signal, Yu'v' signal) to the display. Advantageously, the ½ DRR function is designed for data efficiency, not as an optical transform function. In one embodiment, the ½ DRR function is used instead of a non-linear function (e.g., OETF or EOTF). In one embodiment, signal input to the ½ DRR function is assumed to be linear and constrained between values of 0 and 1. In one embodiment, the ½ DRR function is optimized for 10-bit transport and/or 12-bit transport. Alternatively, the ½ DRR function is optimized for 14-bit transport and/or 16-bit transport. In an alternative embodiment, the ½ DRR function is optimized for 8-bit transport. A typical implementation applies an inverse of the ½ DRR function, which linearizes the signal. A conversion to a display gamut is then applied.

Figure 30A:
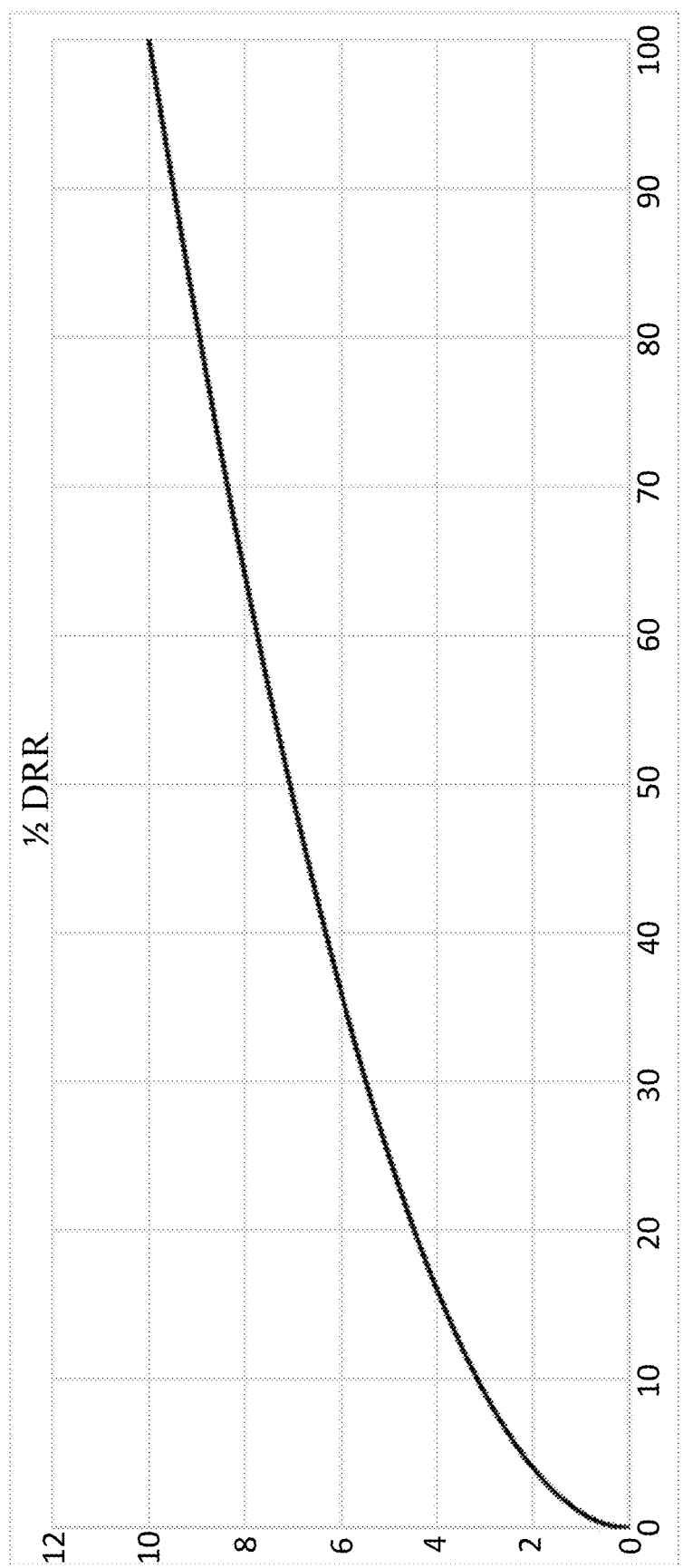
FIG. 30A illustrates one embodiment of a ½ data range reduction (DRR) function.

FIG. 30A illustrates one embodiment of a ½ DRR function.

In one embodiment, a DRR is applied to source media as $n=L^\tau$ and an inverse DRR (DRR$^{-1}$) is applied to a display (or sink) as $L=n^{1/\tau}$, where $\tau$ represents the exponent of the inverse non-linearity. In one embodiment, the system incorporates both the source gamma (e.g., OETF) and the display gamma (e.g., EOTF). For example, the following equation for a DRR is used:

$$L = n^{OETF*EOTF/DRR\ value}$$

where the DRR value in this equation is the conversion factor from linear to non-linear. An inverse DRR (DRR$^{-1}$) is the re-expansion coefficient from the non-linear to the linear.

Advantageously, using the 1/2 DRR function with the OOTF gamma combines the functions into a single step rather than utilizing a two-step conversion process. In one embodiment, at least one tone curve is applied after the ½ DRR function. The ½ DRR function advantageously provides ease to convert to and from linear values. Given that all color and tone mapping has to be done in the linear domain, having a simple to implement conversion is desirable and makes the conversion to and from linear values easier and simpler.

Figure 30B:
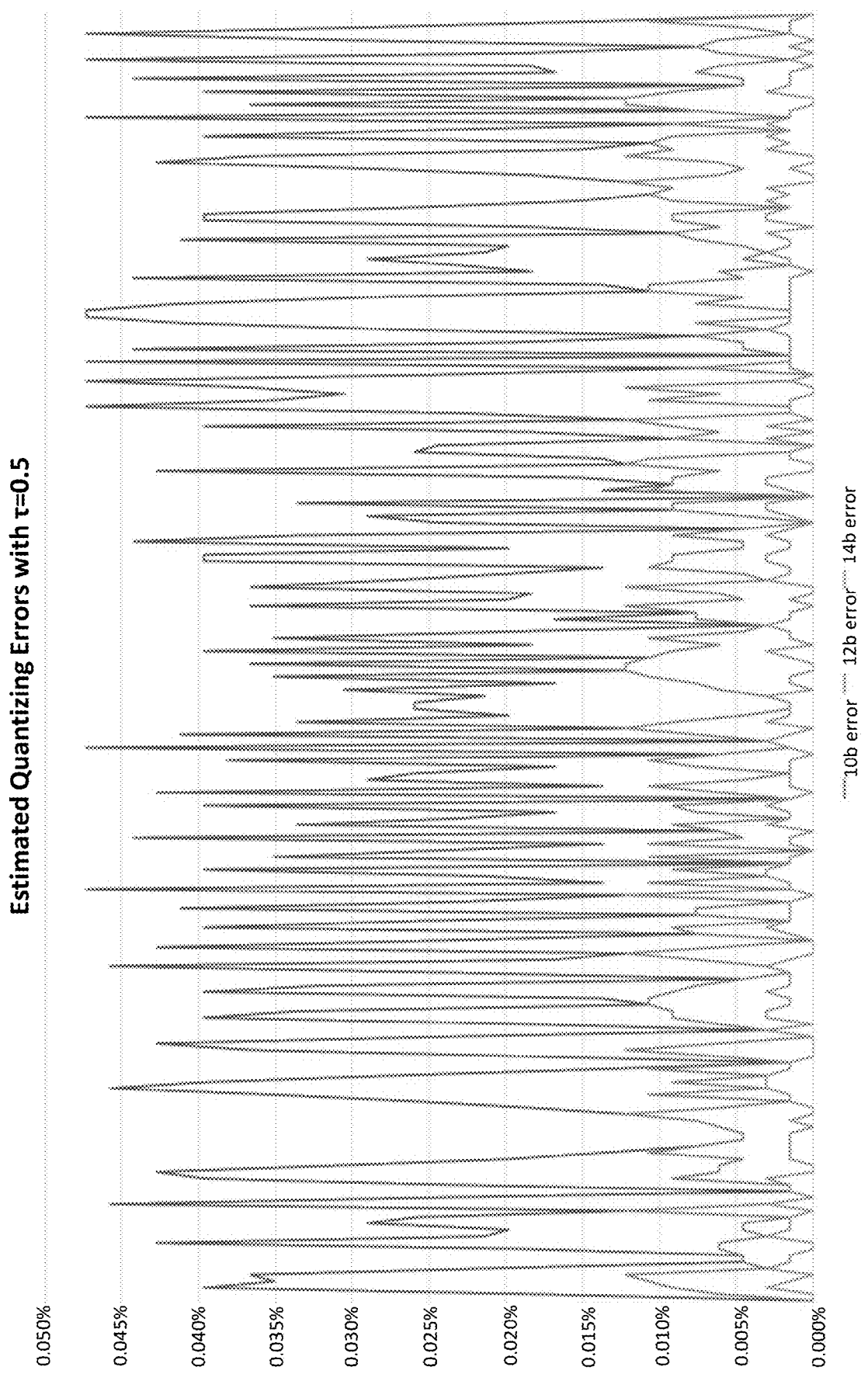
FIG. 30B illustrates a graph of maximum quantizing error using the ½ data range reduction (DRR) function.

FIG. 30B illustrates a graph of maximum quantizing error using the ½ DRR function. The maximum quantizing error from an original 16-bit image to a 10-bit (blue trace) signal is shown in the graph. In the embodiment shown in the graph, the maximum quantizing error is less than 0.05% (e.g., 0.047%) for 16-bit to 10-bit conversion using the ½ DRR function. The graph also shows the maximum quantizing error from the original 16-bit image to a 12-bit (orange trace) signal and a 14-bit (gray trace) signal.

While a ½ DRR is ideal for converting images with 16-bit (e.g., 16-bit float) values to 12-bit (e.g., 12-bit integer) values, for other data sets a ⅓ DRR provides equivalent performance in terms of peak signal-to-noise ratio (PSNR). For HDR content, which has a wider luminance dynamic range (e.g., up to 1000 cd/m$^2$), the ⅓ DRR conversion from 16-bit float maintains the same performance as ½ DRR. In one embodiment, an equation for finding an optimum value of tau is:

$$\tau = \frac{-\log_2(\text{Minimum Float Value})}{\text{Integer Bit Depth}}$$

In one embodiment, the Minimum Float Value is based on the IEEE Standard for Floating-Point Arithmetic (IEEE 754) (July 2019), which is incorporated herein by reference in its entirety. In one embodiment, the range of image values is normalized to between 0 and 1. The range of image values is preferably normalized to between 0 and 1 and then the DRR function is applied.

For example, for an HDR system (e.g., with a luminance dynamic range of 1000-4000 cd/m$^2$), the above equation becomes:

$$\tau = \frac{-\{\log_2(\text{Minimum Float Value}) - \log_2(\text{Peak } HDR \text{ value})\}}{\text{Integer Bit Depth}}$$

Figure 31:
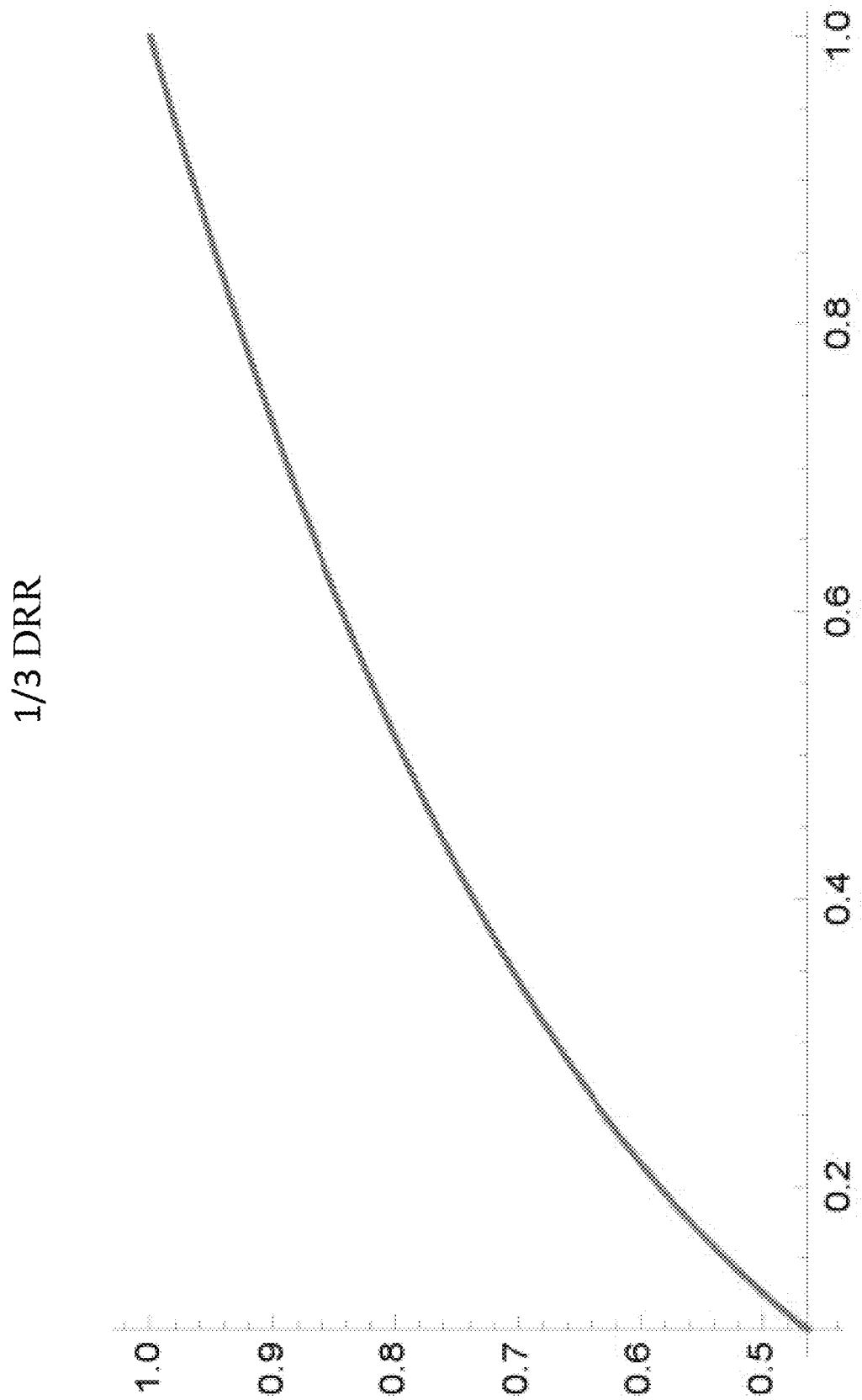
FIG. 31 illustrates one embodiment of a ⅓ data range reduction (DRR) function.

FIG. 31 illustrates one embodiment of a ⅓ DRR function.

In one embodiment, the DRR value is preferably between 0.25 and 0.9. Table 8 illustrates one embodiment of an evaluation of DRR vs. bit depth vs. full 16-bit float (equivalent to 24 f-stops). Table 9 illustrates one embodiment of a recommended application of DRR. Table 10 illustrates one embodiment of DRR functions optimized for 8 bits, 10 bits, and 12 bits, based on the desired dynamic range as indicted in f-stops. Each f-stop represents a doubling of light values. The f-stops provide a range of tones over which the noise, measured in f-stops (e.g., the inverse of the perceived signal-to-noise ratio, PSNR) remains under a specified maximum value. The lower the maximum noise, or the higher the PSNR, the better the image quality. In one embodiment, no DRR is applied to Yxy or Yu'v' 16-bit data. In one embodiment, the Yxy or Yu'v' 16-bit data covers 24 f-stops. In one embodiment, a 0.6 DRR is applied to Yxy or Yu'v' 12-bit data, a 0.5 DRR is applied to Yxy or Yu'v' 10-bit data, and/or a 0.4 DRR is applied to Yxy or Yu'v' 8-bit data. In one embodiment, the Yxy or Yu'v' 12-bit data, the Yxy or Yu'v' 10-bit data, and/or the Yxy or Yu'v' 8-bit data cover 20 f-stops.

TABLE 8

Evaluation of DRR vs bit depth vs. full 16 bit float (equiv to 24 f-stops)

| Bit Depth | DRR | PSNR |
|---|---|---|
| 12 | 0.5 | 76 |
| 10 | 0.417 | 63.7 |
| 8 | 0.333 | 49.7 |

TABLE 9

Recommended Application of DRR (equivalent to 20 f-stops)

| Bit Depth | f-stop | DRR | PSNR (test image) | PSNR (linear gradient) |
|---|---|---|---|---|
| 12 | 20 | 0.6 | 68.8 | 80.3 |
| 10 | 20 | 0.5 | 51.5 | 73.6 |
| 8 | 20 | 0.4 | 43.6 | 56.2 |

TABLE 10

Evaluation of DRR vs bit depth vs dynamic range in f-stops

| Bit Depth | f-stop | DRR | PSNR |
| --- | --- | --- | --- |
| 12 | 14 | 0.8571 | 63.3 |
| 12 | 16 | 0.75 | 67.4 |
| 12 | 20 | 0.6 | 68.8 |
| 10 | 14 | 0.7143 | 53.8 |
| 10 | 16 | 0.625 | 51.5 |
| 10 | 20 | 0.5 | 51.5 |
| 8 | 14 | 0.5714 | 40 |
| 8 | 16 | 0.5 | 39.8 |
| 8 | 20 | 0.4 | 43.6 |

Encoder and Decoder

In one embodiment, the multi-primary system includes an encoder operable to accept image data input (e.g., RAW, SDI, HDMI, DisplayPort, ethernet). In one embodiment, the image data input is from a camera, a computer, a processor, a flash memory card, a network (e.g., local area network (LAN)), or any other file storage or transfer medium operable to provide image data input. The encoder is operable to send processed image data (e.g., Yxy, XYZ, Yu'v') to a decoder (e.g., via wired or wireless communication). The decoder is operable to send formatted image data (e.g., SDI, HDMI, Ethernet, DisplayPort, Yxy, XYZ, Yu'v', legacy RGB, multi-primary data (e.g., RGBC, RGBCMY, etc.)) to at least one viewing device (e.g., display, monitor, projector) for display (e.g., via wired or wireless communication). In one embodiment, the decoder is operable to send formatted image data to at least two viewing devices simultaneously. In one embodiment, two or more of the at least two viewing devices use different color spaces and/or formats. In one example, the decoder sends formatted image data to a first viewing device in HDMI and a second viewing device in SDI. In another example, the decoder sends formatted image data as multi-primary (e.g., RGBCMY, RGBC) to a first viewing device and as legacy RGB (e.g., Rec. 709) to a second viewing device. In one embodiment, the Ethernet formatted image data is compatible with SMPTE ST2022. Additionally or alternatively, the Ethernet formatted image data is compatible with SMPTE ST2110 and/or any internet protocol (IP)-based transport protocol for image data.

The encoder and the decoder preferably include at least one processor. By way of example, and not limitation, the at least one processor may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that is operable to perform calculations, process instructions for execution, and/or other manipulations of information. In one embodiment, one or more of the at least one processor is operable to run predefined programs stored in at least one memory of the encoder and/or the decoder.

The encoder and/or the decoder include hardware, firmware, and/or software. In one embodiment, the encoder and/or the decoder is operable to be inserted into third party software (e.g., via a dynamic-link library (DLL)). In one embodiment, functionality and/or features of the encoder and/or the decoder are combined for efficiency.

Figure 32:
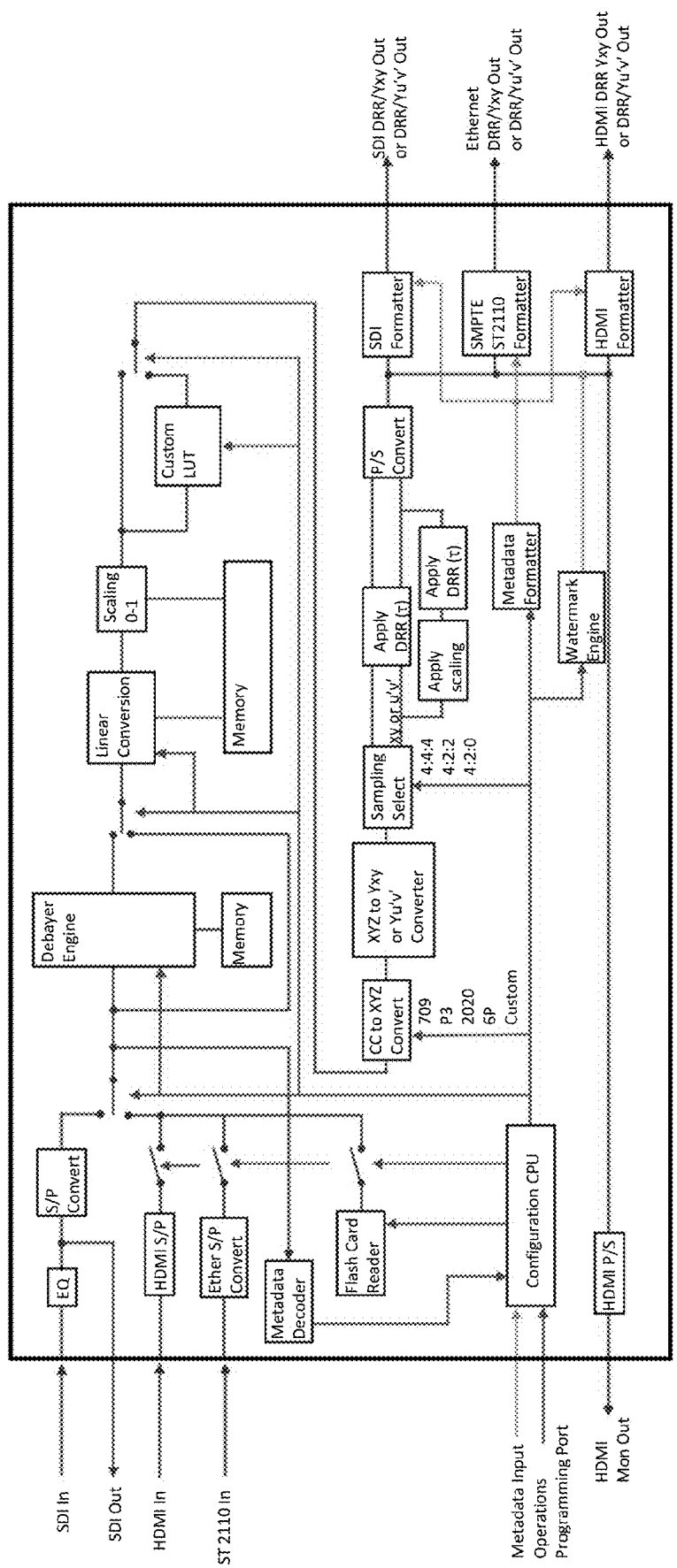
FIG. 32 illustrates one embodiment of an encoder.

FIG. 32 illustrates one embodiment of an encoder. The encoder includes at least one encoder input (e.g., SDI, HDMI, SMPTE ST2110, SMPTE ST2022, DisplayPort, fiber, ethernet) and at least one encoder output (e.g., SDI, HDMI, SMPTE ST2110, SMPTE ST2022, Yxy SDI, Yxy HDMI, Yu'v' SDI, Yu'v' HDMI, DisplayPort, fiber, ethernet). The encoder preferably includes an encoder operations programming port operable to provide updates to firmware and/or software on the encoder. For example, the encoder operations programming port is operable to update library functions, internal formatting, camera demosaicing (e.g., DeBayer) pattern algorithms, and/or lookup tables in the encoder. In one embodiment, the encoder includes a metadata input. In one embodiment, the encoder includes an encoder configuration central processing unit (CPU) operable to interface with at least one encoder memory. The encoder further includes an encoder equalizer, at least one encoder serial to parallel (S/P) converter (e.g., SDI S/P converter, HDMI S/P, Ethernet S/P converter), at least one encoder flash card reader, at least one Ethernet port, a demosaicing (e.g., DeBayer) engine, a linear converter, a scaler (e.g., 0-1), at least one custom encoder LUT, a color channel-to-XYZ converter (e.g., RGB in Rec. 709, P3, Rec. 2020; 6P; multi-primary; ACES; custom), an XYZ-to-Yxy converter, an XYZ-to-Yu'v' converter, a DRR function (e.g., ½ DRR), an xy scaler, a u'v' scaler, a sampling selector (e.g., 4:4:4, 4:2:2, 4:2:0), a metadata decoder, an encoder metadata formatter, at least one encoder parallel to serial (P/S) converter (e.g., SDI P/S converter, HDMI P/S converter, Ethernet P/S converter), at least one encoder formatter (e.g., SDI formatter, HDMI formatter, Ethernet formatter), and/or a watermark engine. In one embodiment, the input data is operable to bypass any combination of processing stages and/or components in the encoder.

The at least one encoder input includes, but is not limited to, an SDI input, an HDMI input, a DisplayPort input, an ethernet input, and/or a SMPTE ST2110 input. The SDI input preferably follows a modified version of SMPTE ST352 payload ID standard. In one embodiment, the SDI input is SMPTE ST292, SMPTE ST425, and/or SMPTE ST2082. In one embodiment, a video signal from the SDI input is then sent to the encoder equalizer to compensate for cable type and length. In one embodiment, the HDMI input is decoded with a standard HDMI receiver circuit. In one embodiment, the HDMI input is converted to a parallel format. In one embodiment, the HDMI input is defined within the CTA 861 standard. In another embodiment, the at least one encoder input includes image data (e.g., RAW data) from a flash device. The configuration CPU identifies a format on the flash card and/or a file type, and has software operable to read the image data and make it available to the encoder.

In one embodiment, the encoder operations port is operable to connect to an encoder control system (e.g., via a micro universal serial bus (USB) or equivalent). In one embodiment, the encoder control system is operable to control the at least one encoder memory that holds tables for the demosaicing (e.g., DeBayer) engine, load modifications to the linear converter and/or scaler, select the at least one input, loads a table for the at least one custom encoder LUT, bypass one or more of the at least one custom encoder LUT, bypass the demosaicing (e.g., DeBayer) engine, add or modify conversion tables for the RGB to XYZ converter, modify the DRR function (e.g., a ½ DRR function), turn the watermark engine on or off, modify a digital watermark for the watermark engine, and/or perform functions for the flash memory player (e.g., play, stop, forward, fast forward, rewind, fast rewind, frame selection).

In one embodiment, the metadata decoder is operable to decode Extended Display Identification Data (EDID) (e.g., for HDMI inputs), SDP parameters (SMPTE ST 2110), payload ID, and/or ancillary information (e.g., vertical ancillary data (VANC)). The encoder configuration CPU is operable to process data from the metadata decoder. Further, the encoder configuration CPU is operable to select particular settings and/or deliver selected data to the encoder metadata formatter. The metadata input is operable to insert additional data and/or different data values, which are also operable to be sent to the encoder metadata formatter. The encoder metadata formatter is operable to take information from the encoder configuration CPU and arrange the information to be reinserted into the output of the process. In one embodiment, each encoder output formatter then takes this formatted data and times it to be used in the serial stream.

In one embodiment, the at least one S/P converter is up to n bit for improved processing efficiency. The at least one S/P converter preferably formats the processed image data so that the encoder and/or the decoder is operable to use parallel processing. Advantageously, parallel processing keeps processing fast and minimizes latency.

The at least one encoder formatter is operable to organize the serial stream as a proper format. In a preferred embodiment, the encoder includes a corresponding encoder formatter for each of the at least one encoder output. For example, if the encoder includes at least one HDMI output in the at least one encoder output, the encoder also includes at least one HDMI formatter in the at least one encoder formatter; if the encoder includes at least one SDI output in the at least one encoder output, the encoder also includes at least one SDI formatter in the at least one encoder formatter; if the encoder includes at least one Ethernet output in the at least one encoder output, the encoder also includes at least one Ethernet formatter in the at least one encoder formatter; and so forth.

There is an advantage of inputting a RAW camera image to take advantage of the extended dynamic range and wider color gamut versus using a standard video input. In one embodiment, the demosaicing (e.g., DeBayer) engine is operable to convert RAW image data into a raster image. In one embodiment, the raster image is a 3-channel image (e.g., RGB). In one embodiment, the demosaicing (e.g., DeBayer) engine is bypassed for data that is not in a RAW image format. In one embodiment, the demosaicing (e.g., DeBayer) engine is configured to accommodate at least three primaries (e.g., 3, 4, 5, 6, 7, 8, etc.) in the Bayer or stripe pattern. To handle all of the different demosaicing (e.g., DeBayer) options, the operations programming port is operable to load a file with code required to adapt a specific pattern (e.g., Bayer). For images that are not RAW, a bypass path is provided and switched to and from using the encoder configuration CPU. In one embodiment, the encoder is operable to recognize the image data format and select the correct path automatically. Alternatively, the image data format is included in metadata.

The encoder configuration CPU is operable to recognize an input non-linearity value and provide an inverse value to the linear converter to linearize the image data. The scaler is operable to map out of gamut values into in gamut values.

In one embodiment, the at least one custom encoder LUT is operable to transform an input (e.g., a standard from a manufacturer) to XYZ, Yxy, or Yu'v'. Examples of the input include, but are not limited to, RED Log3G10, ARRI log C, ACEScc, ACEScct, SONY S-Log, CANON Log, PANA-SONIC V Log, PANAVISION Panalog, and/or BLACK MAGIC CinemaDNG. In one embodiment, the at least one custom encoder LUT is operable to transform the input to an output according to artistic needs. In one embodiment, the encoder does not include the color channel-to-XYZ converter or the XYZ-to-Yxy converter, as this functionality is incorporated into the at least one custom encoder LUT. In one embodiment, the at least one custom encoder LUT is a 65-cube lookup table. The at least one custom encoder LUT is preferably compatible with ACES Common LUT Format (CLF)—A Common File Format for Lookup Tables S-2014-006, which was published Jul. 22, 2021 and which is incorporated herein by reference in its entirety. In one embodiment, the at least one custom encoder LUT is a multi-column LUT. The at least one custom encoder LUT is preferably operable to be loaded through the operations programming port. If no LUT is required, the encoder configuration CPU is operable to bypass the at least one custom encoder LUT.

In one embodiment, RGB or multi-primary (e.g., RGBCMY, RGBC) data is converted into XYZ data using the color channel-to-XYZ converter. In a preferred embodiment, a white point value for the original video data (e.g., RGB, RGBCMY) is stored in one or more of the at least one encoder memory. The encoder configuration CPU is operable to provide an adaption calculation using the white point value. The XYZ-to-Yxy converter is operable to convert XYZ data to Yxy data. Advantageously, the Yxy image data is segmented into a luminance value and a set of colorimetric values, the relationship between Y and x,y is operable to be manipulated to use lower data rates. Similarly, the XYZ-to-Yu'v' converter is operable to convert XYZ data to Yu'v' data, and the conversion is operable to be manipulated to use lower data rates. Any system with a luminance value and a set of colorimetric values is compatible with the present invention. The configuration CPU is operable to set the sample selector to fit one or more of the at least one encoder output. In one embodiment, the sampling selector sets a sampling structure (e.g., 4:4:4, 4:2:2, 4:2:0, 4:1:1). The sampling selector is preferably controlled by the encoder configuration CPU. In a preferred embodiment, the sampling selector also places each component in the correct serial data position as shown in Table 11.

TABLE 11

|  | 4:4:4 | 4:2:2, 4:2:0, or 4:1:1 |
|---|---|---|
| Y | Y, G, I | Y, I |
| x or u' | $C_B$, R, X, $C_T$ | $C_B$, $C_T$ |
| y or v' | $C_R$, B, Z, $C_P$ | $C_R$, $C_P$ |

The encoder is operable to apply a DRR function (e.g., ½ DRR, ½ DRR) to the Y channel and the xy or u'v' channels. The encoder is also operable to apply scaling to the xy or u'v' channels.

The watermark engine is operable to modify an image from an original image to include a digital watermark. In one embodiment, the digital watermark is outside of the ITU-R BT.2020 color gamut. In one embodiment, the digital watermark is compressed, collapsed, and/or mapped to an edge of the smaller color gamut such that it is not visible and/or not detectable when displayed on a viewing device with a smaller color gamut than ITU-R BT.2020. In another embodiment, the digital watermark is not visible and/or not detectable when displayed on a viewing device with an ITU-R BT.2020 color gamut. In one embodiment, the digital watermark is a watermark image (e.g., logo), alphanumeric text (e.g., unique identification code), and/or a modification of pixels. In one embodiment, the digital watermark is invisible to the naked eye. In a preferred embodiment, the digital watermark is perceptible when decoded by an algorithm. In one embodiment, the algorithm uses an encryption key to decode the digital watermark. In another embodiment, the digital watermark is visible in a non-obtrusive manner (e.g., at the bottom right of the screen). The digital watermark is preferably detectable after size compression, scaling, cropping, and/or screenshots. In yet another embodiment, the digital watermark is an imperceptible change in sound and/or video. In one embodiment, the digital watermark is a pattern (e.g., a random pattern, a fixed pattern) using a luminance difference (e.g., 1 bit luminance difference). In one embodiment, the pattern is operable to change at each frame. The digital watermark is a dynamic digital watermark and/or a static digital watermark. In one embodiment, the dynamic digital watermark works as a full frame rate or a partial frame rate (e.g., half frame rate). The watermark engine is operable to accept commands from the encoder configuration CPU.

In an alternative embodiment, the at least one encoder input already includes a digital watermark when input to the encoder. In one embodiment, a camera includes the digital watermark on an image signal that is input to the encoder as the at least one encoder input.

The at least one encoder output includes, but is not limited to SDI, HDMI, DisplayPort, and/or ethernet. In one embodiment, at least one encoder formatter formats the image data to produce the at least one encoder output. The at least one encoder formatter includes, but is not limited to, an SDI formatter, an SMPTE ST2110, and/or an HDMI formatter. In one embodiment, the SDI formatter formats the serial video data into an SDI package as a Yxy or Yu'v' output. The SMPTE ST2110 formatter formats the serial video data into an ethernet package as a Yxy or Yu'v' output. The HDMI formatter formats the serial video data into an HDMI package as a Yxy or Yu'v' output.

Figure 33:
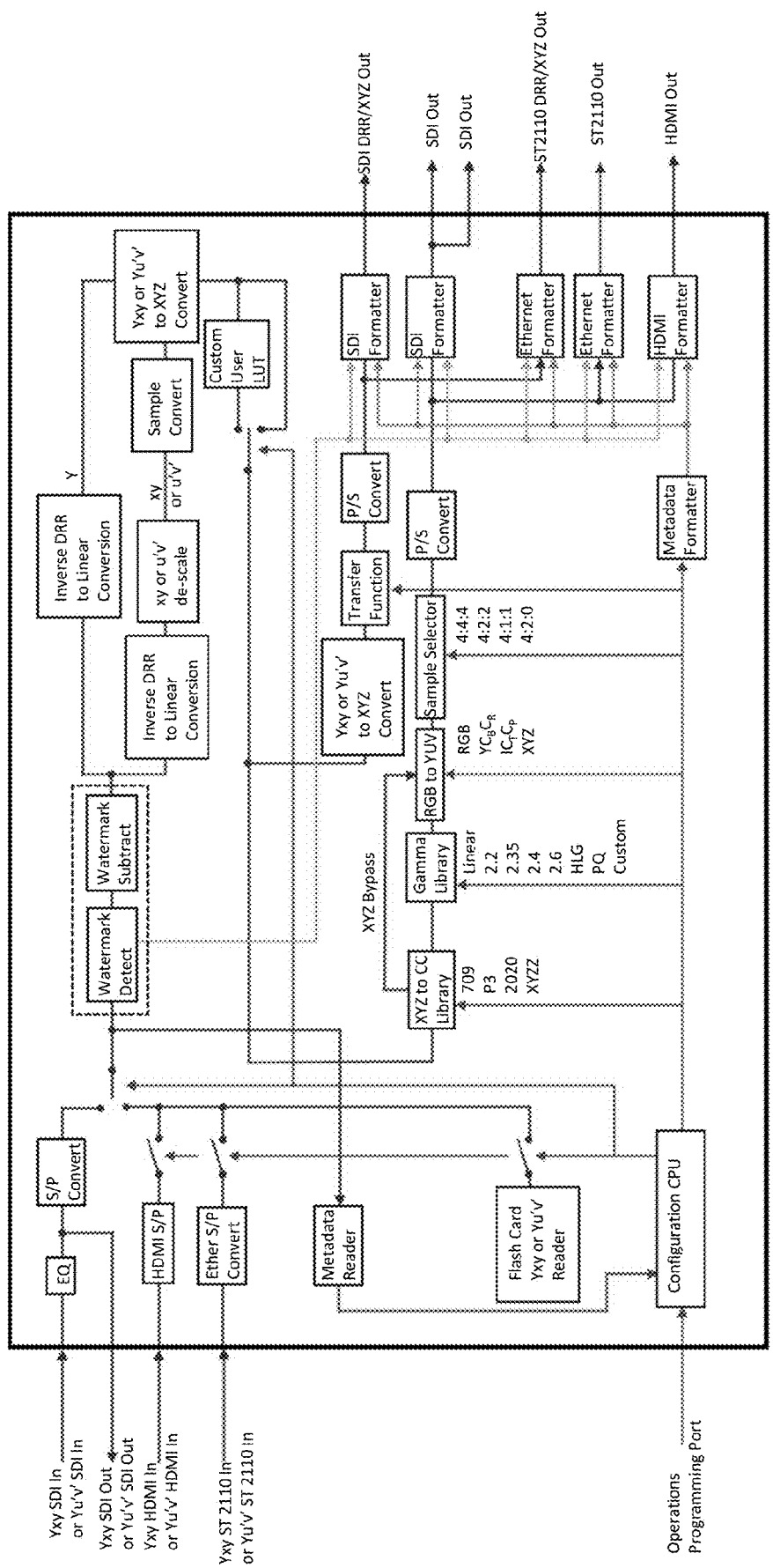
FIG. 33 illustrates one embodiment of a decoder.

FIG. 33 illustrates one embodiment of a decoder. The decoder includes at least one decoder input (e.g., SDI, HDMI, Ethernet, Yxy SDI, Yxy HDMI, Yxy Ethernet, Yu'v' SDI, Yu'v' HDMI Yu'v' Ethernet, DisplayPort, fiber) and at least one decoder output (e.g., Yxy SDI, Yu'v' SDI, at least one SDI, X'Y'Z', HDMI, Ethernet, DisplayPort, fiber). In one embodiment, the decoder includes a decoder configuration central processing unit (CPU) operable to interface with at least one decoder memory. The decoder preferably includes a decoder operations programming port operable to provide updates to firmware and/or software on the decoder. The decoder further includes a decoder equalizer, at least one decoder serial to parallel (S/P) converter (e.g., SDI S/P converter, HDMI S/P converter, Ethernet S/P converter), a watermark detection engine, a watermark subtraction engine, a DRR-to-linear converter (e.g., ½ DRR-to-linear converter), an xy de-scaler, a u'v' de-scaler, at least one sampling converter (e.g., 4:2:2 or 4:2:0 to 4:4:4 converter), at least one Yxy-to-XYZ converter, at least one Yu'v'-to-XYZ converter, a gamma library (e.g., linear, 2.2, 2.35, 2.4, 2.6, HLG, PQ, custom), an XYZ-to-color channel library (e.g., RGB (e.g., Rec. 709, P3, Rec. 2020); multi-primary data), a color channel-to-YUV library (e.g., RGB (e.g., Rec. 709, P3, Rec. 2020); multi-primary data), at least one sample selector, at least one transfer function, at least one custom decoder LUT, a metadata reader, a decoder metadata formatter, at least one decoder parallel to serial (P/S) converter (e.g., SDI X'Y'Z', at least one SDI, HDMI), and/or at least one decoder formatter (e.g., SDI X'Y'Z' formatter, SDI RGB formatter, SDI CMY formatter, HDMI formatter). In one embodiment, X'Y'Z' output includes a non-linear function (e.g., gamma, PQ, HLG) applied to XYZ data. In one embodiment, the processed image data is operable to bypass any combination of processing stages and/or components in the decoder.

In one embodiment, the decoder operations port is operable to connect to a decoder control system (e.g., via a micro universal serial bus (USB) or equivalent). In one embodiment, the decoder control system is operable to select the at least one decoder input, perform functions for the flash memory player (e.g., play, stop, forward, fast forward, rewind, fast rewind, frame selection), turn watermark detection on or off, add or modify the gamma library and/or lookup table selection, add or modify the XYZ-to-RGB library and/or lookup table selection, load data to the at least one custom decoder LUT, select bypass of one or more of the custom decoder LUT, and/or modify the Ethernet SDP. The gamma library preferably takes linear data and applies at least one non-linear function to the linear data. The at least non-linear function includes, but is not limited to, at least one standard gamma (e.g., those used in standard dynamic range (SDR) and high definition range (HDR) formats) and/or at least one custom gamma. In one embodiment, the at least one standard gamma is defined in ITU BT.709 or ITU BT.2100.

In one embodiment, the output of the gamma library is fed to the XYZ-to-RGB library, where tables are included to map the XYZ data to a standard RGB or YCbCr output format. In another embodiment, the output of the gamma library bypasses the XYZ-to-RGB library. This bypass leaves an output of XYZ data with a gamma applied. The selection of the XYZ-to-RGB library or bypass is determined by the configuration CPU. If the output format selected is YCbCr, then the XYZ-to-RGB library flags which sampling method is desired and provides that selection to the sampling selector. The sampling selector then formats the YCbCr data to a 4:2:2, 4:2:0, or 4:1:1 sampling structure.

In one embodiment, an input to the decoder does not include full pixel sampling (e.g., 4:2:2, 4:2:0, 4:1:1). The at least one sampling converter is operable to take subsampled images and convert the subsampled images to full 4:4:4 sampling. In one embodiment, the 4:4:4 Yxy image data is then converted to XYZ using the at least one Yxy-to-XYZ converter. In another embodiment, the 4:4:4 Yu'v' image data is then converted to XYZ using the Yu'v' using the at least one Yu'v'-to-XYZ converter. Image data is then converted from a parallel form to a serial stream.

The metadata reader is operable to read Extended Display Identification Data (EDID) (e.g., for HDMI inputs), SDP parameters (SMPTE ST 2110), payload ID, and/or ancillary information (e.g., vertical ancillary data (VANC)). The decoder configuration CPU is operable to process data from the metadata reader. Further, the decoder configuration CPU is operable to select particular settings and/or deliver selected data to the decoder metadata formatter. The decoder metadata formatter is operable to take information from the decoder configuration CPU and arrange the information to be reinserted into the output of the process. In one embodiment, each decoder output formatter then takes this formatted data and times it to be used in the serial stream.

In one embodiment, the at least one SDI output includes more than one SDI output. Advantageously, this allows for output over multiple links (e.g., System 3). In one embodiment, the at least one SDI output includes a first SDI output and a second SDI output. In one embodiment, the first SDI output is used to transport a first set of color channel data (e.g., RGB) and the second SDI output is used to transport a second set of color channel data (e.g., CMY).

The watermark detection engine detects the digital watermark. In one embodiment, a pattern of the digital watermark is loaded to the decoder using the operations programming port. In one embodiment, the decoder configuration CPU is operable to turn the watermark detection engine on and off. The watermark subtraction engine removes the digital watermark from image data before formatting for display on the at least one viewing device. In one embodiment, the decoder configuration CPU is operable to allow bypass of the watermark subtraction engine, which will leave the digital watermark on an output image. In a preferred embodiment, the decoder requires the digital watermark in the processed image data sent from the encoder to provide the at least one decoder output. Thus, the decoder does not send color channel data to the at least one viewing device if the digital watermark is not present in the processed image data. In an alternate embodiment, the decoder is operable to provide the at least one decoder output without the digital watermark in the processed image data sent from the encoder. If the digital watermark is not present in the processed image data, an image displayed on the at least one viewing device preferably includes a visible watermark.

In one embodiment, output from the watermark subtraction process includes data including a non-linearity (e.g., ½ DRR). Non-linear data is converted back to linear data using an inverse non-linear transfer function (e.g., $NLTF^{-1}$) for the Y channel and the xy or u'v' channels. The xy or u'v' channels are rescaled and undergo sampling conversion.

In one embodiment, the at least one custom decoder LUT includes a 9-column LUT. In one embodiment, the 9-column LUT includes 3 columns for a legacy RGB output (e.g., Rec. 709, Rec. 2020, P3) and 6 columns for a 6P multi-primary display (e.g., RGBCMY). Other numbers of columns (e.g., 7 columns) and alternative multi-primary displays (e.g., RGBC) are compatible with the present invention. In one embodiment, the at least one custom decoder LUT (e.g., the 9-column LUT) is operable to produce output values using tetrahedral interpolation. Advantageously, tetrahedral interpolation uses a smaller volume of color space to determine the output values, resulting in more accurate color channel data. In one embodiment, each of the tetrahedrons used in the tetrahedral interpolation includes a neutral diagonal. Advantageously, this embodiment works even with having less than 6 color channels. For example, a 4P output (e.g., RGBC) or a 5P output (e.g., RGBCY) using an FPGA is operable to be produced using tetrahedral interpolation. Further, this embodiment allows for an encoder to produce legacy RGB output in addition to multi-primary output. In an alternative embodiment, the at least one custom decoder LUT is operable to produce output value using cubic interpolation. The at least one custom decoder LUT is preferably operable to accept linear XYZ data. In one embodiment, the at least one custom decoder LUT is a multi-column LUT. The at least one custom decoder LUT is preferably operable to be loaded through the operations programming port. If no LUT is required, the decoder configuration CPU is operable to bypass the at least one custom decoder LUT.

In one embodiment, the at least one custom decoder LUT is operable to be used for streamlined HDMI transport. In one embodiment, the at least one custom decoder LUT is a 3D LUT. In one embodiment, the at least one custom decoder LUT is operable to take in a 3-column input (e.g., RGB, XYZ) and produce an output of greater than three columns (e.g., RGBC, RGBCY, RGBCMY). Advantageously, this system only requires 3 channels of data as the input to the at least one custom decoder LUT. In one embodiment, the at least one custom decoder LUT applies a non-linear function (e.g., inverse gamma) and/or a curve to produce a linear output. In another embodiment, the at least one custom decoder LUT is a trimming LUT.

The at least one decoder formatter is operable to organize a serial stream as a proper format for the at least one output. In a preferred embodiment, the decoder includes a corresponding decoder formatter for each of the at least one decoder output. For example, if the decoder includes at least one HDMI output in the at least one decoder output, the decoder also includes at least one HDMI formatter in the at least one decoder formatter; if the decoder includes at least one SDI output in the at least one decoder output, the decoder also includes at least one SDI formatter in the at least one decoder formatter; if the decoder includes at least one Ethernet output in the at least one decoder output, the decoder also includes at least one Ethernet formatter in the at least one decoder formatter; and so forth.

The encoder and/or the decoder are operable to generate, insert, and/or recover metadata related to an image signal. The metadata includes, but is not limited to, a color space (e.g., 6P-B, 6P-C), an image transfer function (e.g., DRR, gamma, PQ, HLG, ½ DRR), a peak white value, a white point (e.g., D65, D60, DCI), an image signal range (e.g., narrow (SMPTE) or full), sampling structure (e.g., 4:4:4, 4:2:2, 4:2:0, 4:1:1), bit depth, (e.g., 8, 10, 12, 16), and/or a signal format (e.g., RGB, Yxy, Yu'v', multi-primary (e.g., RGBCMY, RGBC)). In one embodiment, the metadata is inserted into SDI or ST2110 using ancillary (ANC) data packets. In another embodiment, the metadata is inserted using Vendor Specific InfoFrame (VSIF) data as part of the CTA 861 standard. In one embodiment, the metadata is compatible with SMPTE ST 2110-10:2017, SMPTE ST 2110-20:2017, SMPTE ST 2110-40:2018, SMPTE ST 352: 2013, and/or SMPTE ST 352:2011, each of which is incorporated herein by reference in its entirety.

Additional details about the multi-primary system and the display are included in U.S. application Ser. No. 17/180,441 and Ser. No. 17/209,959, and U.S. Patent Publication Nos. 20210027693, 20210020094, 20210035487, and 20210043127, each of which is incorporated herein by reference in its entirety.

Display Engine

In one embodiment, the present invention provides a display engine operable to interact with a graphics processing unit (GPU) and provide Yxy, XYZ, YUV, Yu'v', RGB, YCbCr, and/or $IC_TC_P$ configured outputs. In one embodiment, the display engine and the GPU are on a video card. Alternatively, the display engine and the GPU are embedded on a motherboard or a central processing unit (CPU) die. The display engine and the GPU are preferably included in and/or connected to at least one viewing device (e.g., display, video game console, smartphone, etc.). Additional information related to GPUs are disclosed in U.S. Pat. Nos. 9,098,323; 9,235,512; 9,263,000; 9,318,073; 9,442,706; 9,477,437; 9,494,994; 9,535,815; 9,740,611; 9,779,473; 9,805,440; 9,880,851; 9,971,959; 9,978,343; 10,032,244; 10,043,232; 10,114,446; 10,185,386; 10,191,759; 10,229, 471; 10,324,693; 10,331,590; 10,460,417; 10,515,611; 10,521,874; 10,559,057; 10,580,105; 10,593,011; 10,600, 141; 10,628,909; 10,705,846; 10,713,059; 10,769,746; 10,839,476; 10,853,904; 10,867,362; 10,922,779; 10,923, 082; 10,963,299; and 10,970,805 and U.S. Patent Publication Nos. 20140270364, 20150145871, 20160180487, 20160350245, 20170178275, 20170371694, 20180121386, 20180314932, 20190034316, 20190213706, 20200098082, 20200183734, 20200279348, 20200294183, 20200301708, 20200310522, 20200379864, and 20210049030, each of which is incorporated herein by reference in its entirety.

In one embodiment, the GPU includes a render engine. In one embodiment, the render engine includes at least one render pipeline (RP), a programmable pixel shader, a programmable vector shader, a vector array processor, a curvature engine, and/or a memory cache. The render engine is operable to interact with a memory controller interface, a command CPU, a host bus (e.g., peripheral component interconnect (PCI), PCI Express (PCIe), accelerated graphics port (AGP)), and/or an adaptive full frame anti-aliasing. The memory controller interface is operable to interact with a display memory (e.g., double data rate (DDR) memory), a pixel cache, the command CPU, the host bus, and a display engine. The command CPU is operable to exchange data with the display engine.

Figure 34:
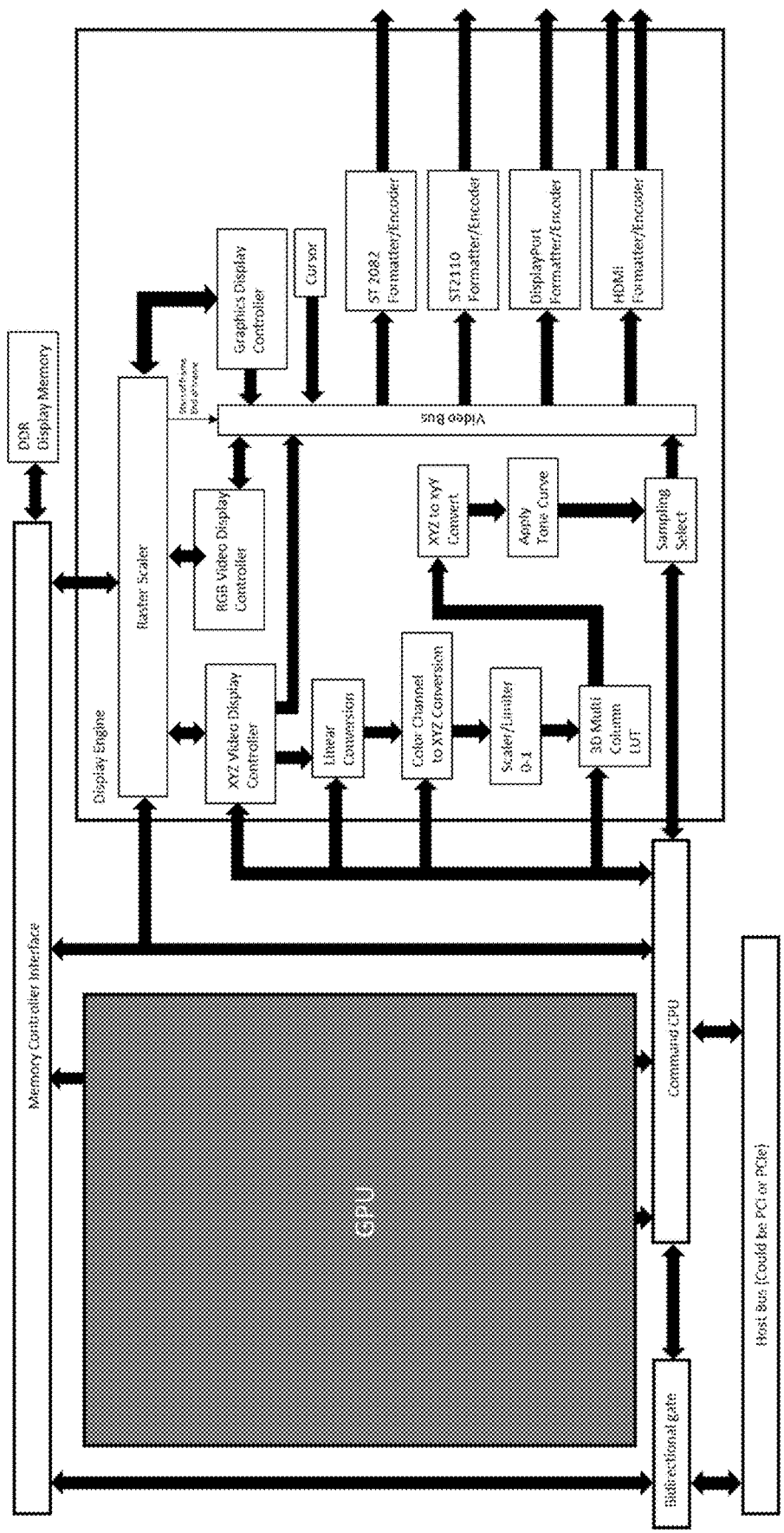
FIG. 34 illustrates one embodiment of a display engine operable to interact with a graphics processing unit (GPU) according to the present invention.

FIG. 34 illustrates one embodiment of a display engine operable to interact with a graphics processing unit (GPU) according to the present invention. In a preferred embodiment, the display engine operable to interact with the GPU is included on a video card. The video card is operable to interface with a computer. In a preferred embodiment, the video card is operable to be inserted into a connector (e.g., PCIe connector, PCI connector, accelerated graphics port (AGP) connector, etc.) located within a computer. The computer includes a command central processing unit (CPU). The command CPU is dedicated to communication between the video card and the computer core. The command CPU is preferably operable to input instructions from an application programming interface (API). The command CPU is further operable to distribute appropriate commands to components in the video card. The video card further includes a memory controller interface. The memory controller interface is preferably a bus including hardware operable to manage which data is allowed on the bus and where the data is routed.

In one embodiment, the video card includes a plurality of video cards linked together to allow scaling of graphics processing. In one embodiment, the plurality of video cards is linked with a PCIe connector. Other connectors are compatible with the plurality of video cards. In one embodiment, each of the plurality of video cards has the same technical specifications. In one embodiment, the API includes methods for scaling the graphics processing, and the command CPU is operable to distribute the graphics processing across the plurality of video cards. The command CPU is operable to scale up the graphics processing as well as scale down the graphics processing based on processing demands and/or power demands of the system.

The display engine is operable to take rendered data from the GPU and convert the rendered data to a format operable to be displayed on at least one viewing device. The display engine includes a raster scaler, at least one video display controller (e.g., XYZ video display controller, RGB video display controller, $IC_TC_P$ video display controller), a color channel-to-XYZ converter, a linear converter, a scaler and/or limiter, a multi-column LUT with at least three columns (e.g., three-dimensional (3D) LUT (e.g., $129^3$ LUT)), an XYZ-to-Yxy converter, an XYZ-to-Yu'v' converter, a non-linear function and/or tone curve applicator (e.g., ½ DRR), a sampling selector, a video bus, and/or at least one output formatter and/or encoder (e.g., ST 2082, ST 2110, DisplayPort, HDMI). In one embodiment, the color channel-to-XYZ converter includes an RGB-to-XYZ converter. Additionally or alternatively, the color channel-to-XYZ converter includes a Yu'v'-to-XYZ converter, an $IC_TC_P$-to-XYZ converter and/or an ACES-to-XYZ converter. The video bus is operable to receive input from a graphics display controller and/or at least one input device (e.g., a cursor, a mouse, a joystick, a keyboard, a videogame controller, etc.).

The video card is operable to connect through any number of lanes provided by hardware on the computer. The video card is operable to communicate through a communication interface including, but not limited to, a PCIe Physical Layer (PHY) interface. In one embodiment, the communication interface is an API supported by the computer (e.g., OpenGL, Direct3D, OpenCL, Vulkan). Image data in the form of vector data or bitmap data is output from the communication interface into the command CPU. The communication interface is operable to notify the command CPU when image data is available. The command CPU opens the bus bidirectional gate and instructs the memory controller interface to transmit the image data to a double data rate (DDR) memory. The memory controller interface is operable to open a path from the DDR memory to allow the image data to pass to the GPU for rendering. After rendering, the image data is channeled back to the DDR for storage pending output processing by the display engine.

After the image data is rendered and stored in the DDR memory, the command CPU instructs the memory controller interface to allow rendered image data to load into the raster scaler. The command CPU loads the raster scaler with framing information. The framing information includes, but is not limited to, a start of file (SOF) identifier, an end of file (EOF) identifier, a pixel count, a pixel order, multi-primary data (e.g., RGBCMY data), and/or a frame rate. In one embodiment, the framing information includes HDMI and/or DisplayPort (e.g., CTA 861 format) information. In one embodiment, Extended Display Identification Data (EDID) is operable to override specifications in the API. The raster scaler provides output as image data formatted as a raster in the same format as the file which being read (e.g., RGB, XYZ, Yxy, Yu'v'). In one embodiment, the output of the raster scaler is RGB data, XYZ data, or Yxy data. Alternatively, the output of the raster scaler is Yu'v' data, $IC_TC_P$ data, or ACES data.

In one embodiment, the output of the raster scaler is sent to a graphics display controller. In one embodiment, the graphics display controller is operable to provide display information for a graphical user interface (GUI). In one embodiment, the RGB video controller and the XYZ video controller block image data from entering the video bus. Raster data includes, but is not limited to, synchronization data, an SOF, an EOF, a frame rate, a pixel order, multi-primary data (e.g., RGBCMY data), and/or a pixel count. In one embodiment, the raster data is limited to an RGB output that is operable to be transmitted to the at least one output formatter and/or encoder.

For common video display, a separate path is included. The separate path is operable to provide outputs including, but not limited to, SIViPTE SDI, Ethernet, DisplayPort, and/or EIDMI to the at least one output formatter and/or encoder. The at least one video display controller (e.g., RGB video display controller) is operable to limit and/or optimize video data for streaming and/or compression. In one embodiment, the RGB video display controller and the XYZ video display controller block image data from entering the video bus.

In a preferred embodiment, image data is provided by the raster scaler in the format provided by the file being played (e.g., RGB, multi-primary (e.g., RGBCMY), XYZ, Yxy, Yu'v'). In one embodiment, the raster scaler presets the XYZ video display controller as the format provided and contained within the raster size to be displayed. In one embodiment, non-linear information (e.g., OOTF) sent from the API through the command CPU is sent to the linear converter. The linear converter is operable to use the non-linear information. For example, if the image data was authored using an OETF, then an inverse of the OETF is operable to be used by the linear converter, or, if the image information already has an EOTF applied, the inverse of the EOTF is operable to be used by the linear converter. In one embodiment, the linear converter develops an EOTF map to linearize input data (e.g., when EOTF data is available). In one embodiment, the linear converter uses an EOTF when already available. After linear data is loaded and a summation process is developed, the XYZ video display controller passes the image data in its native format (e.g., RGB, multi-primary data (e.g., RGBCMY), XYZ, Yxy, Yu'v'), but without a non-linearity applied to the luminance (e.g., Y) component. The color channel-to-XYZ converter is operable to accept a native format (e.g., RGB, multi-primary data (e.g., RGBCMY), XYZ, Yxy, Yu'v') and convert to an XYZ format. In one embodiment, the XYZ format includes at least one chromatic adaptation (e.g., D60 to D65). For RGB, the XYZ video display controller uses data supplied from the command CPU, which obtains color gamut and white point specifications from the API to convert to an XYZ output. For a multi-primary system, a corresponding matrix or a lookup table (LUT) is used to convert from the multi-primary system to XYZ. In one embodiment, the multi-primary system is RGBCMY (e.g., 6P-B, 6P-C, S6Pa, S6Pb). For a Yxy system, the color channel-to-XYZ converter formats the Yxy data back to XYZ data. For a Yu'v' system, the color channel-to-XYZ converter formats the Yu'v' data back to XYZ data. In another embodiment, the color channel-to-XYZ converter is bypassed. For example, the color channel-to-XYZ converter is bypassed if there is a requirement to stay within a multi-primary system. Additionally, the color channel-to-XYZ converter is bypassed for XYZ data.

In one embodiment, the input to the scaler and/or limiter is XYZ data or multi-primary data. In one embodiment, the multi-primary data includes, but is not limited to, RGBCMY (e.g., 6P-B, 6P-C, S6Pa, S6Pb), RGBC, $RG_1G_2B$, RGBCW, RGBCY, $RG_1G_2BW$, $RGBW_RW_GW_B$, or $R_1R_2G_1G_2B_1B_2$. Other multi-primary data formats are compatible with the present invention. The scaler and/or limiter is operable to map out of gamut values (e.g., negative values) to in gamut values (e.g., out of gamut values developed in the process to convert to XYZ). In one embodiment, the scaler and/or limiter uses a gamut mapping algorithm to map out of gamut values to in gamut values.

In one embodiment, the input to the scaler and/or limiter is multi-primary data and all channels are optimized to have values between 0 and 1. For example, if the input is RGBCMY data, all six channels are optimized to have values between 0 and 1. In one embodiment, the output of the scaler and/or limiter is operable to be placed into a three-dimensional (3-D) multi-column LUT. In one embodiment, the 3-D multi-column LUT includes one column for each channel. For example, if the output is RGBCMY data, the 3-D multi-column LUT includes six columns (i.e., one for each channel). Within the application feeding the API, each channel is operable to be selected to balance out the white point and/or shade the image toward one particular color channel. In one embodiment, the 3-D multi-column LUT is bypassed if the output of the scaler and/or limiter is XYZ data. The output of the 3-D multi-column LUT is sent to the XYZ-to-Yxy converter, where a simple summation process is used to make the conversion. Alternatively, the output of the 3-D multi-column LUT is sent to the XYZ-to-Yu'v' converter. In one embodiment, if the video data is RGBCMY, the XYZ-to-Yxy converter or XYZ-to-Yu'v' process is bypassed.

Because the image data is linear, any tone curve is operable to be added to the luminance (e.g., Y). The advantage to the present invention using, e.g., Yxy data or Yu'v' data, is that only the luminance needs a tone curve modification. L*a*b* has a ⅓ gamma applied to all three channels. IPT and $IC_TC_P$ operate with a gamma in all three channels. The tone curve is operable to be added to the luminance (e.g., Y) only, with the colorimetric coordinates (e.g., x and y channels, u' and v' channels) remaining linear. The tone curve is operable to be anything (e.g., a non-linear function), including standard values currently used. In one embodiment, the tone curve is an EOTF (e.g., those described for television and/or digital cinema). Additionally or alternatively, the tone curve includes HDR modifications. In another embodiment, a non-linear transfer function is added to all three channels (e.g., Yxy or Yu'v').

In one embodiment, the output is handled through this process as three to six individual components (e.g., three components for Yxy, Yu'v', or XYZ, six components for RGBCMY, etc.). Alternative number of primaries and components are compatible with the present invention. However, in some serial formats, this level of payload is too large. In one embodiment, the sampling selector sets a sampling structure (e.g., 4:4:4, 4:2:2, 4:2:0, 4:1:1). In one embodiment, the sampling selector is operable to subsample processed image data. The sampling selector is preferably controlled by the command CPU. In one embodiment, the command CPU gets its information from the API and/or the display EDID. In a preferred embodiment, the sampling selector also places each component in the correct serial data position as shown in Table 11 (supra).

The output of the sampling select is fed to the main video bus, which integrates SOF and EOF information into the image data. It then distributes this to the at least one output formatter and/or encoder. In one embodiment, the output is RGBCMY. In one embodiment, the RGBCMY output is configured as 4:4:4:4:4:4 data. The format to the at least one viewing device includes, but is not limited to, SMPTE ST2082 (e.g., 3, 6, and 12G serial data output), SMPTE ST2110 (e.g., to move through ethernet), and/or CTA 861 (e.g., DisplayPort, HDMI). The video card preferably has the appropriate connectors (e.g., DisplayPort, HDMI) for distribution through any external system (e.g., computer) and connection to at least one viewing device (e.g., monitor, television, etc.). The at least one viewing device includes, but is not limited to, a smartphone, a tablet, a laptop screen, a light emitting diode (LED) display, an organic light emitting diode (OLED) display, a miniLED display, a microLED display, a liquid crystal display (LCD), a quantum dot display, a quantum nano emitting diode (QNED) device, a laser-powered phosphor display (LPD), a personal gaming device, a virtual reality (VR) device and/or an augmented reality (AR) device, an LED wall, a wearable display, and at least one projector. In one embodiment, the at least one viewing device is a single viewing device.

Figure 42:
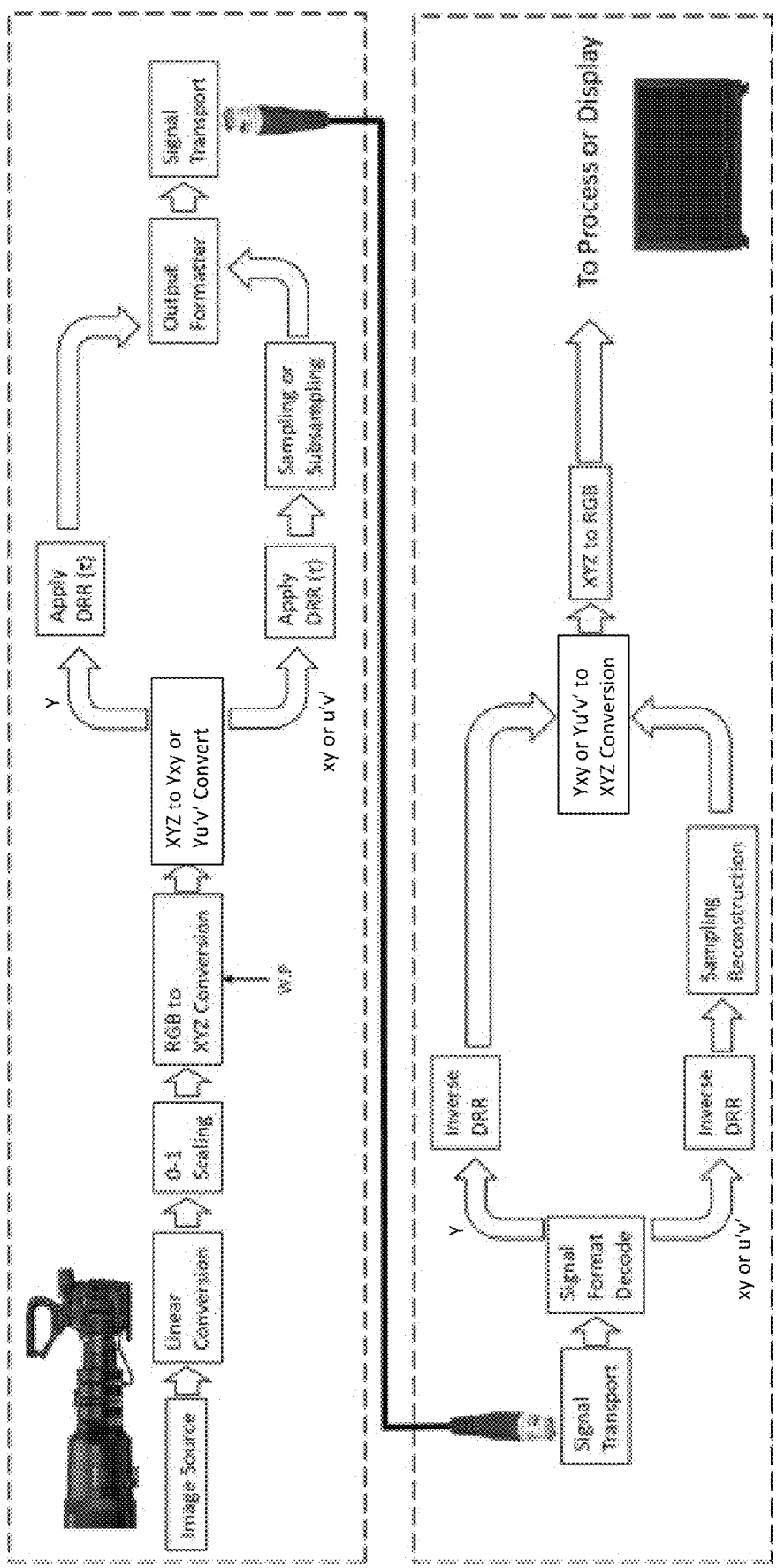
FIG. 42 illustrates one embodiment of a process flow diagram to convert an image for display.

FIG. 42 illustrates one embodiment of a process flow diagram to convert an image for display. An image from an image source undergoes linear conversion and/or scaling (e.g., 0 to 1 scaling) to produce a processed image. The processed image undergoes RGB to XYZ conversion and XYZ to Yxy conversion. Alternatively, the processed image undergoes XYZ to Yu'v' conversion. At least one non-linear transfer function (NLTF) (e.g., ½ DRR) is applied to the luminance (Y) to create a luma (Y'). In a preferred embodiment, the x and y colorimetric coordinates are scaled and then have the at least one NLTF applied. Alternatively, the u' and v' colorimetric coordinates are scaled and then have the at least one NLTF applied. The colorimetric coordinates (x and y, u' and v') are fully sampled or subsampled. The luma and the colorimetric coordinates (e.g., fully sampled, sub sampled) are formatted with an output formatter (e.g., ST 2082, ST 2110, DisplayPort, HDMI) before signal transport, thereby creating formatted luma and colorimetric coordinates. The formatted luma and colorimetric coordinates are decoded by using an inverse of the at least one function (e.g., inverse ½ DRR), rescaling of the colorimetric coordinates (x and y, u' and v'), and sampling reconstruction, thereby creating decoded image data. The decoded image data undergoes Yxy to XYZ conversion or Yu'v' to XYZ conversion and XYZ to gamut (e.g., RGB, ITU-R BT.709, SMPTE RP431, ITU-R BT.2020, ACES, custom, multi-primary) conversion before a gamma function is applied, thereby creating image data. The image data is operable to be sent to a display (e.g., operable to display the gamut). In one embodiment, the image data undergoes further processing in the display.

The top of the diagram shows the process that typically resides in the camera or image generator. The bottom of the diagram shows the decode process typically located in the display. The image is acquired from a camera or generated from an electronic source. Typically, a gamma has been applied and needs to be removed to provide a linear image. After the linear image is acquired, the linear image is scaled to values between 0 and 1. this allows scaling to a desired brightness on the display. The source is operable to detail information related to the image including, but not limited to, a color gamut of the device and/or a white point used in acquisition. Using adaptation methods (e.g., chromatic adaptation), an accurate XYZ conversion is possible. After the image is coded as XYZ, it is operable to be converted to Yxy. The components are operable to be split into a Y path and an xy path or a Y path and a u'v' path. A non-linearity (e.g., DRR) is applied to the Y component. In one embodiment, the non-linearity (e.g., DRR) is also applied to the scaled xy or u'v' components. The xy or u'v' components are operable to be subsampled, if required, e.g., to fit into the application without loss of luminance information. These are recombined and input to a format process that formats the signal for output to a transport (e.g., SDI, IP packet).

After the signal arrives at the receiver, it is decoded to output the separate Yxy or Yu'v' components. The Y channel preferably has an inverse non-linearity (e.g., inverse DRR) applied to restore the Y channel to linear space. If the xy or u'v' channels had a non-linearity applied, the xy or u'v' channels preferably have the inverse non-linearity (e.g., inverse DRR) applied to restore the image data (i.e., Yxy, Yu'v') to linear space and then re-scaled to their original values. The xy or u'v' channels are brought back to full sub-pixel sampling. These are then converted from Yxy to XYZ or Yu'v' to XYZ. XYZ is operable to converted to the display gamut (e.g., RGB). Because a linear image is used, any gamma is operable to be applied by the display. This advantageously puts the limit of the image not in the signal, but at the maximum performance of the display.

With this method, images are operable to match between displays with different gammas, gamuts, and/or primaries (e.g., multi-primary). Colorimetric information and luminance are presented as linear values. Any white point, gamma, and/or gamut is operable to be defined, e.g., as a scene referred set of values or as a display referred set. Furthermore, dissimilar displays are operable to be connected and set to match if the image parameters fall within the limitations of the display. Advantageously, this allows accurate comparison without conversion.

In any system, the settings of the camera and the capabilities of the display are known. Current methods take an acquired image and confirm it to an assumed display specification. Even with a sophisticated system (e.g., ACES), the final output is conformed to a known display specification. The design intent of a Yxy or Yu'v' system is to avoid these processes by using a method of image encoding that allows the display to maximize performance while maintaining creative intent.

The system is operable to be divided into simpler parts for explanation: (1) camera/acquisition, (2) files and storage, (3) transmission, and (4) display. Most professional cameras have documentation describing the color gamut that is possible, the OETF used by the camera, and/or a white point to which the camera was balanced. In an RGB system, these parameters must be tracked and modified throughout the workflow.

However, in a Yxy or Yu'v' system, in one embodiment, these conversions are enabled by the camera as part of the encode process because image parameters are known at the time of acquisition. Thus, the Yxy or Yu'v' system has the intrinsic colorimetric and luminance information without having to carry along additional image metadata. Alternatively, the conversions are operable to be accomplished outside the camera in a dedicated encoder (e.g., hardware) or image processing (e.g., software) in a post-production application.

Figure 43:
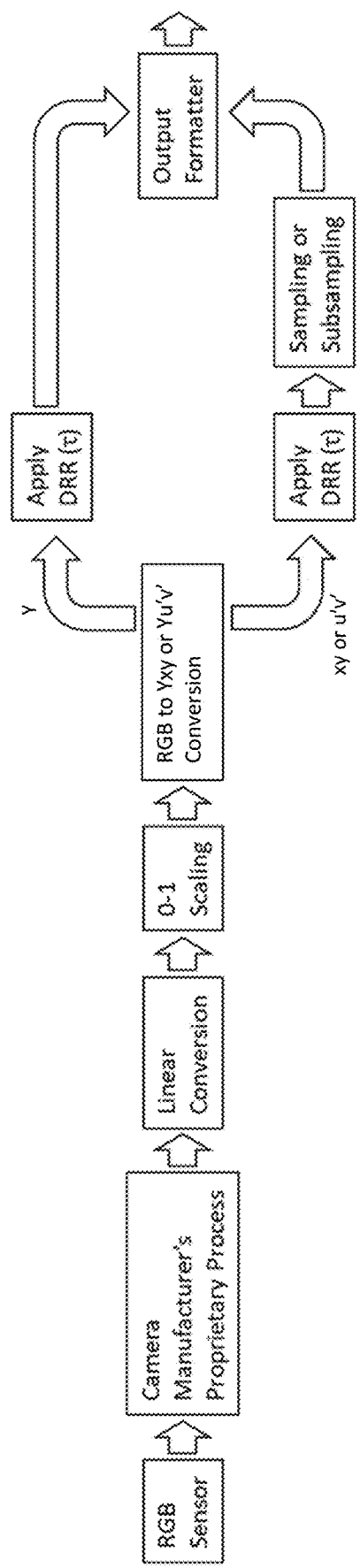
FIG. 43 illustrates one embodiment of a camera process flow.

FIG. 43 illustrates one embodiment of a camera process flow. An image sensor (e.g., RGB sensor) in a camera is operable to obtain image data. In one embodiment, the image data is processed by the camera (e.g., via a camera manufacturer's proprietary process), thereby creating processed camera data. The image data or the camera data undergoes linear conversion and/or scaling (e.g., 0 to 1 scaling) to produce a processed image. In one embodiment, the processed image undergoes conversion from an acquisition gamut (e.g., RGB) to Yxy or Yu'v'. In one embodiment, a non-linear transfer function (NLTF) (e.g., DRR) is applied to Y (e.g., to create luma) and xy. In another embodiment, an NLTF (e.g., DRR) is applied to Y (e.g., to create luma) and u'v'. The luma and the colorimetric coordinates (e.g., fully sampled, subsampled) are formatted with an output formatter (e.g., ST 2082, ST 2110, DisplayPort, HDMI) to provide output data. In one embodiment, the output data is transmitted to a display and/or a decoder. Although the example shown in FIG. 43 uses Yxy or Yu'v' data, the system is operable to be used with a plurality of formats.

Images are acquired in a specific process designed by a camera manufacturer. Instead of using RAW output format, the process starts with the conversion of the RGB channels to a linear (e.g., 16-bit) data format, wherein the RGB data is normalized to 1. In one embodiment, this linear image is then converted from RGB to XYZ (e.g., via a conversion matrix) and then processed to produce the Yxy or Yu'v' data stream. Y continues as a fully sampled value, but xy or u'v' are operable to be subsampled (e.g., 4:2:2, 4:2:0). A DRR value is applied to Yxy or Yu'v' and scaled x and y or u' and v' values prior to being sent as a serial data stream or is stored in a suitable file container.

The biggest advantage that the Yxy or Yu'v' system provides is the ability to send one signal format to any display and achieve an accurate image. The signal includes all image information, which allows for the display design to be optimized for best performance. Issues (e.g., panel, backlight accuracy) are operable to be adjusted to the conformed image gamut and luminance based on the Yxy or Yu'v' data.

Prior art displays use a specific gamut. Typically, the specific gamut is an RGB gamut (e.g., Rec. 2020, P3, Rec. 709). Comparing different displays using a Yxy or Yu'v' input offers a significant advantage. Images displayed on a BT.709 monitor matches a P3 monitor and a BT.2020 monitor for all colors that fall within a gamut of the BT.709 monitor. Colors outside that gamut are controlled by the individual monitor optimized for that device. Images with gamuts falling within the P3 color space will match on the P3 monitor and the BT.2020 monitor until the image gamut exceeds the capability of the P3 monitor.

The display input process is like an inverted camera process. However, the output of this process is operable to be adapted to any display parameters using the same image data.

Figure 44:
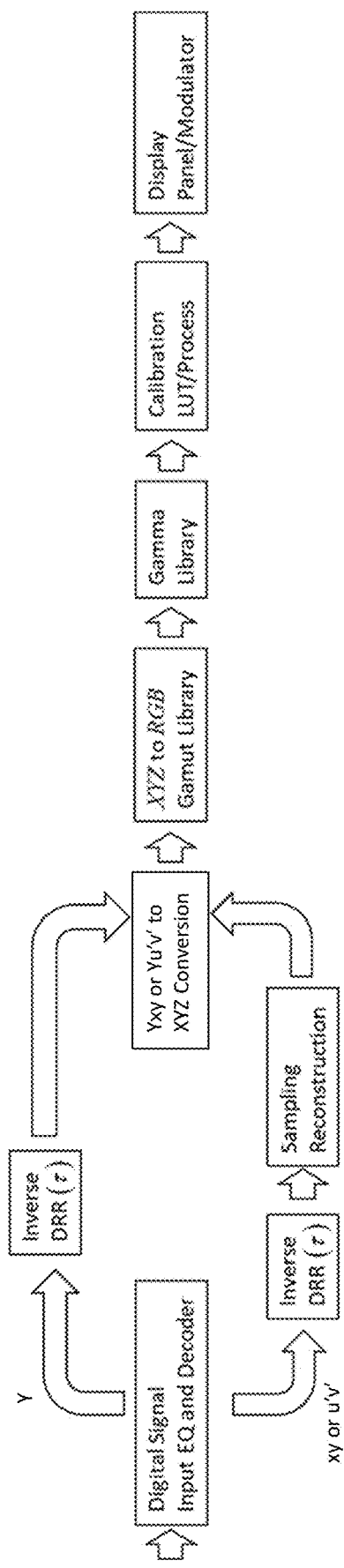
FIG. 44 illustrates one embodiment of a display process flow.

FIG. 44 illustrates one embodiment of a display process flow. In one embodiment, a Yxy or Yu'v' signal is input as a digital signal. In one embodiment, the digital signal undergoes equalization. The formatted luma and colorimetric coordinates are decoded by using an inverse of at least one non-linear function (e.g., inverse ½ DRR), thereby creating decoded image data. In one embodiment, the decoded image data undergoes Yxy to XYZ or Yu'v' or XYZ conversion to create XYZ data. The XYZ data is operable to converted to a gamut (e.g., RGB, ITU-R BT.709, SMPTE RP431, ITU-R BT.2020, ACES, custom, multi-primary) using an XYZ to gamut library, thereby creating gamut data. In one embodiment, a gamma library is operable to apply at least one function (e.g., linear, 2.2, 2.35, 2.4, 2.6 gamma functions, HLG, PQ, custom) to the gamut data. In one embodiment, the gamut data (e.g., with or without the at least one function applied) undergoes a calibration process (e.g., using a LUT) before being transmitted to a display panel and/or modulator. Although FIG. 44 illustrates a Yxy or Yu'v' signal, the system is compatible with a plurality of data formats.

Most image file formats are based on storing the RGB data, and typically only accommodate three sets of data. Advantageously, the Yxy or Yu'v' implementation only requires three sets of data, which simplifies substitutions into any file format.

The ability to move Yxy or Yu'v' coded image content in real time through transmission systems commonly used in production, broadcast, and streaming applications is essential. the requirements call for a simple system using minimal changes to current infrastructure. The Yxy or Yu'v' encoding of image data allows for a simple substitution with a modification to any payload data that is used to identify the type of encode.

The design of an RGB system uses information obtained from the camera and builds a replicating electrical representation formatted within signal. This means that each signal fed to a process or display must be formatted or reformatted to be viewed correctly. Yxy or Yu'v' redefine this and advantageously move the formatting into the acquiring device and the display, leaving a consistent signal available for differing devices. Connection in the system is simplified as connections and display setup are agnostic to the signal format.

Super Saturated Colors

A white point is a set of chromaticity values that define the color "white" in an image. Standard video processing is based on an RGB system where the maximum white is attained when all three primaries are near maximum, only varied slightly to produce the desired color point for the white. Convention dictates that white is the sum of the color primaries, so peak white in a red, green, and blue (RGB) system is defined as [1 1 1] and the individual red, green, and blue primaries are defined as [1 0 0], [0 1 0], and [0 0 1], respectively. However, this definition of the white point is a result of convention rather than a constraint.

In this type of system, the maximum luminance of individual colors (e.g., RGB) is tied to the white point. For example, a white of 100 nits (1 nit=1 $cd/m^2$) luminance has a component red channel whose characteristics has a luminance of 25 nits. In this case, the luminance limit of the red is 25 nits.

In a super saturated system of the present invention, image data for display on a display or viewing device with a potential white luminance in a standard system with a maximum luminance (e.g., of 125 nits) is processed such that colors near the white point are reduced to a limited luminance (e.g., 100 nits). As the chroma (color saturation) of the displayed color is increased, a luminance attenuation is decreased. At very high chroma, there is no restriction on the luminance and the luminance of the red from the previous example with a standard 25 nit maximum is now 25*125/100=31.25 nits with the white still at 100 nits.

The overall image neutral scale ranges from 0 to the limited luminance (e.g., 100 nits), but the color neutral scale ranges from 0 to standard color luminance*maximum luminance/limited luminance. For example, the color neutral scale ranges from 0 to 25*125/100. The 25, 125, and 100 are just arbitrary values for illustration, and the present invention is compatible with other values of standard color luminance, maximum luminance, and limited luminance. Therefore, the super saturated system of the present invention is operable to allow the color primaries to go beyond a limitation of a specific white brightness level. Advantageously, the super saturated system of the present invention is not limited to RGB. Maximum white brightness is maintained, but an extreme chroma result is obtained by allowing at least one primary (e.g., an individual primary or multiple color primaries) to exceed the white value. The super saturated system is operable to be used with System 4 (e.g., Yxy, Yu'v', $IC_TC_P$, LMS, or any XYZ derivative). In another example, a high-powered display capable of a 2000 nit white is processed such that the white is at 1000 nits. This is a reasonable High Dynamic Range (HDR) setup. In terms of the preceding example, this results in a high chroma red with a luminance of 0.25*2000=500 nits instead of the standard 0.25*1000=250 nits. The high chroma red would appear much brighter than expected in a standard system and look more like a fluorescent color. True fluorescent colors get their properties from their normal reflectance characteristics as well as the absorption, excitation, and emission of light that adds the emission to the reflection such that the resulting light to the eye is perceived as high chroma or "fluorescent." In the present invention, high chroma colors are operable to be displayed as fluorescent colors by scaling the luminance by the maximum luminance relative to the white point.

Relative luminance includes values normalized (e.g., to 1, to 100) to a white point. Relative luminance is defined as Y in color spaces, such as Yxy and XYZ. No separate calculation is necessary to determine relative luminance because it is explicitly defined as Y in those color spaces. However, other color spaces do require a calculation of relative luminance. For example, in ITU-R BT.709, relative luminance is calculated using the following equation:

$$Y_{709}=0.2126R+0.7152G+0.0722B$$

This formula reflects the fact that humans perceive green light as contributing most to luminance, and blue light as contributing least.

In some high dynamic range (HDR) systems (e.g., the perceptual quantizer (PQ) system), the RGB sum has a peak luminance of 10,000 cd/m². For example, if a viewing device has a brightness of 10,000 cd/m², a 100% white pixel is displayed as 10,000 cd/m² on the viewing device. However, if this level of white light is not required, then colors beyond the RGB sum are possible. If the neutral tone scale (e.g., from 0 to a maximum white Y value) selected has a neutral tone maximum white with Y below the maximum Y value of all primaries at maximum value, then the allowable individual color tone scales will range from 0 to the maximum Y of each color. Advantageously, this allows a higher achievable Y value for bright and high chroma colors relative to the white point Y value. The systems and methods described herein are operable to be used with other peak luminance values.

The workflow for this process is quite simple when combined with transport systems that separate luminance from chroma, such as System 4 (e.g., Yxy). In color spaces where luminance is a separate component, the luminance value (Y) of white (neutral colors) is limited to a lower value than the maximum Y value of the display or the viewing device. In one embodiment, a linear scaling method is used to limit Y to a lower value (e.g., 90%, 80%, 75%, 70%, 60%, 50%). For example, when Y is limited to 75%, this results in a maximum white brightness that is 25% lower than when maximum R, G, and B are summed. However, no limit is placed on the original R, G, and B values. This allows saturated colors to be increased relative to maximum white, resulting in colors within the gamut, but shown as far more saturated than in a system where white is the sum of the maximum primaries (e.g., RGB). Thus, if an RGB color of [1 0 0] is displayed on a viewing device, the red is increased by 33% relative to the luminance of a red from a system where white is defined as [1 1 1], and thereby the red is brighter and perceived as seemingly fluorescent when compared to a system with a traditional white point. Advantageously, this approach achieves the display of emulated fluorescent images without the use of fluorescent materials in the viewing device. A color specular, close to the [1 1 1] position on a viewing device, is operable to have a luminance increased by 33% relative to the maximum (reference) white, and thereby produces a specular color white that is perceived as "super white" relative to the white reference point.

In one embodiment, the luminance (Y value) of at least one color is reduced depending on a chroma of the at least one color. In one embodiment, low chroma leads to the highest reduction in Y value and a high chroma leaves the Y value unchanged. Typically, neutrals have zero or very low chroma. Chroma is operable to be defined in many ways. In one embodiment, the chroma is defined in an Yxy system. In an Yxy system, the chroma is preferably defined as a length of a vector in x,y space. Conventional vector length calculation in this case is as follows:

$$chroma=\sqrt{(x-x_{white})^2+(y-y_{white})^2}$$

This is a distance formula where $x_{white}$ and $y_{white}$ are the x and y of the white point selected. Therefore, if x is close to $x_{white}$ and y is close to $y_{white}$, then the chroma (i.e., distance) is near 0.0 and a greater Y reduction is applied. In the case of a maximum red in a conventional system, if the Y value of the white ($Y_{white}$) is reduced to 0.75 of the maximum potential Y value, the Y value of the red ($Y_{red}$) follows along and is reduced to 0.75 of the maximum potential. An image will be identical to the maximum position albeit less bright. In the process of the present invention, the Y value of the neutral scale will be reduced by 0.75, but the red would not be changed. So, in a typical RGB system where the $Y_{red}$=0.2126*R with R=1 results in $Y_{red}$=0.2126 and $Y_{white}$=1. In the super saturated colors process described in the present invention, the $Y_{white}$ is 0.75, but the $Y_{red}$ is unchanged at 0.2126. The ratio of $Y_{red}/Y_{white}$ increases from the conventional system of 0.2126 (i.e., 0.2126/1.00) to 0.2835 (i.e., 0.2126/0.75), which represents an increase in relative luminance of red by 33%.

The scaling of the reduction between the neutral scale and the color scale is operable to be a linear function (e.g., multiplication by 0.75) or any other function (e.g., a non-linear function). In one embodiment, the non-linear function is a gamma function with a gamma value. In one embodiment, the gamma value is greater than 1.0, which decelerates the Y reduction to higher chroma positions before achieving the point of no Y reduction. In another embodiment, the gamma value is less than 1.0, which results in a decrease in the Y value being accelerated in colors near the white point. Any other reduction curve is possible to achieve the desired perceptual effect.

In one embodiment, the transition from 0 to full attenuation is a non-linear function (e.g., gamma 2.0), where the attenuation is delayed near neutral and then speeds up as it approaches the highest chroma color position. This transition is operable to be tailored to an application and/or a desired look of the overall image.

The methodology is to process image data such that for each color point, a value of a chroma is determined. A luminance of the color point is decreased depending on a proximity to a neutral (zero chroma) scale. If the algorithm is just linear, then a simple linear attenuation is performed on the color point based on the value of the chroma. If near zero chroma, full attenuation to the chosen reduction level. If highest chroma, the luminance of the color point is unchanged.

Skin chroma is usually fairly close to the neutral scale and techniques such as a gamma transition curve (or others) that leave the color point of a skin sample unchanged or minorly changed may be desired to keep the skin color perception the same, but allow the high chroma colors to be exaggerated. Advantageously, a gamma value greater than 1.0 preserves flesh tones. Skin has relatively low chroma relative to individual red, green, and blue values. The gamma value greater than 1.0 compresses the low values and enhances the higher values. So, by adjusting the gamma of the scale, the look of the flesh is preserved by minimizing increase in Y, but any colors higher in chroma will be boosted in Y.

Figure 35A:
FIG. 35A illustrates an example image of a woman with a chip chart.
Figure 35B:
FIG. 35B illustrates a modified image of the woman with the chip chart.
Figure 35C:
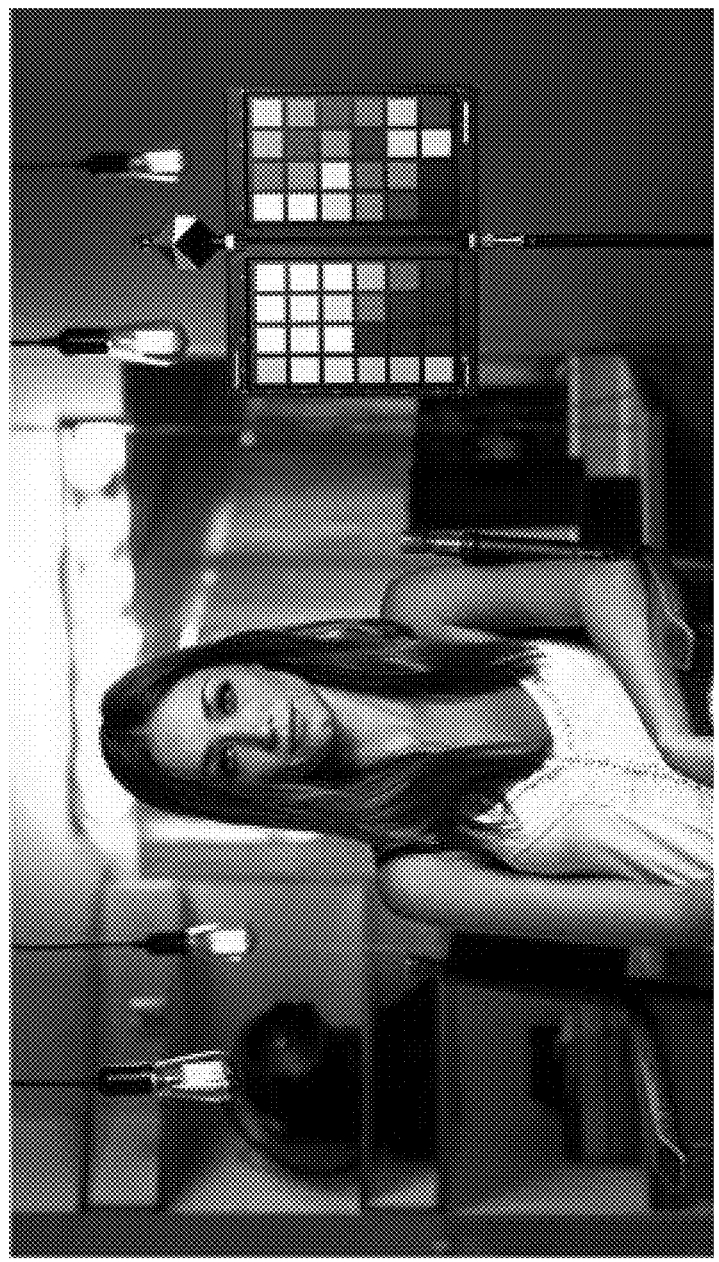
FIG. 35C illustrates another modified image of the woman with the chip chart.

FIG. 35A illustrates an example image of a woman with a chip chart. FIG. 35B illustrates a modified image of the woman with the chip chart. In the image shown in FIG. 35B, the image in FIG. 35A is processed with a gamma of 2.2 and then a luma factor of 80% is applied. FIG. 35C illustrates another modified image of the woman with the chip chart. In the image shown in FIG. 35C, the image in FIG. 35A is processed with a gamma of 2.2 and then a luma factor of 70% is applied. As is seen in the images in FIGS. 35B and 35C, the flesh color is maintained from FIG. 35A.

In another embodiment, the super saturated system does not modify colors within a hue angle range and a chroma range. In one example, if a color is in the hue angle range of flesh tones and the color has a specific chroma range, then the super saturated system keeps the higher reduced Y to leave the flesh unchanged. In one embodiment, the hue angle range and the specific chroma range are part of the tone curve.

The color metric used to determine the "chroma" is operable to be one of the current (or future) color specification metrics. Color metric type including, but not limited to, XYZ, Yxy, ACES, ITP (ICtCp), L*a*b*, CIECAM02, and/or RGB primary specific color spaces (e.g., Rec-2020, Rec-709, P3, etc). In these cases, the chroma and luminance is operable to be readily assessed. In one embodiment, chroma and luminance is determined by transformation into an HVC (Hue, Value, and Chroma) space. Advantageously, transformation into an HVC space facilitates chroma and luminance calculations.

In one embodiment, the calculation (i.e., the scaling of the reduction) is performed in-line with hardware, software, and/or at least one lookup table (LUT). The at least one LUT is operable to be implemented in hardware (e.g., in an FPGA) and/or in software. In one embodiment, the at least one LUT is a three-dimensional (3D) LUT. Advantageously, a LUT (e.g., 3D LUT) dramatically reduces the processing required to perform the calculation. In one embodiment, the calculation includes at least one linear equation and/or at least one non-linear equation. In one embodiment, the calculation is performed as follows:

$$Y_{SSC}=Y\times f(C)$$

where Y is the luminance, f(C) is a multiplier to Y, and C is a value proportional to chroma. In a preferred embodiment, f(C) is dependent on the magnitude of C.

In one embodiment, the calculation is performed in L*a*b*. In one embodiment, the value of C is calculated as follows:

$$C=(a^{*2}+b^{*2})^{1/2}$$

wherein C is the Euclidian distance from the origin (0,0).

In one embodiment, the calculation is performed in Yxy space. In one embodiment, the value of C is calculated as follows:

$$C=((x-x_{WP})^2+(y-y_{WP})^2)^{1/2}$$

where C is the Euclidian distance of the target point (x,y) to the white point ($x_{WP}, y_{WP}$).

One example of the calculation is as follows:

$$Y_{SSC}=a_1Y+a_2f(C)$$

Another example of the calculation is as follows:

$$Y_{SSC}=a_1Y+a_2(x-x_{WP})+a_3(y-y_{WP})$$

Still another example of the calculation is as follows:

$$Y_{SSC}=a_1Y+a_2(x-x_{WP})+a_3(y-y_{WP})+a_4(x-x_{WP})^2+a_5(y-y_{WP})^2$$

Other custom linear equations are possible where $a_1$-$a_n$ are obtained for a set of Yxy original to $Y_{SSC}$xy processed with particular parameters via a linear or non-linear regression. In one embodiment, the particular parameters are operable to minimize error in a perceptual color space.

In one embodiment, the calculation is performed in $YC_BC_R$, where $C_R$=R–G and $C_B$=B–G, neutral is approximately where R=G=B, R+G+B≤1.0, and R+G+B≥0.0. Thus, the $C_R$ range=[−1, 1] and $C_B$ range=[−1, 1]. In one embodiment, the value of $C_{RB}$ (chroma RB) is calculated as follows:

$$C_{RB}=((C_R)^2+(C_B)^2)^{1/2}$$

wherein C is the Euclidian distance from the origin (0,0).

In one embodiment, for $IC_TC_P$, the values are converted back to LMS or XYZ with a LMS-to-XYZ matrix. With LMS or XYZ, the values are converted to Mlm or Yxy, respectively, and these values are used to determine the attenuation of Y.

For simplicity, preferably, LMS is converted to XYZ and then Yxy for the determination of the C and, therefore, the magnitude of attenuation. For IPT, the process is similar once the LMS values are calculated from IPT.

For DCI XYZ, the following equation is used:

$$XYZ = (DCI^{2.6}) \times \frac{52.37}{48.00}$$

The Yxy is calculated for XYZ and processed as above.

For a data set expressed as a perceptual color space, this metric is reversed to obtain the original XYZ used to calculate the perceptual color metric and then is processed as stated above.

In one example, a 1000 cd/m² RGB system has a white point limited to about 300 cd/m². To achieve the white point, the luminance is driven down, limited, and/or reduced such that when R, G, and B are added together the result is 300 cd/m². In one embodiment, the white point is defined by using a lookup table (LUT). If the color space is envisioned as a 1000 cd/m² cube, every color in the cube is mapped such that chroma extends out from the white point depending on its chroma level. In one embodiment, the luminance of a color is decreased depending on how close it is to the white point. For example, the luminance is decreased for colors close to the white point. However, as colors extend away from the white point, the luminance is allowed to persist (e.g., to 300 cd/m²). Thus, there is a sliding scale for luminance. The systems and methods described herein are operable to be used with other peak luminance values and other reduction values.

Figure 36A:
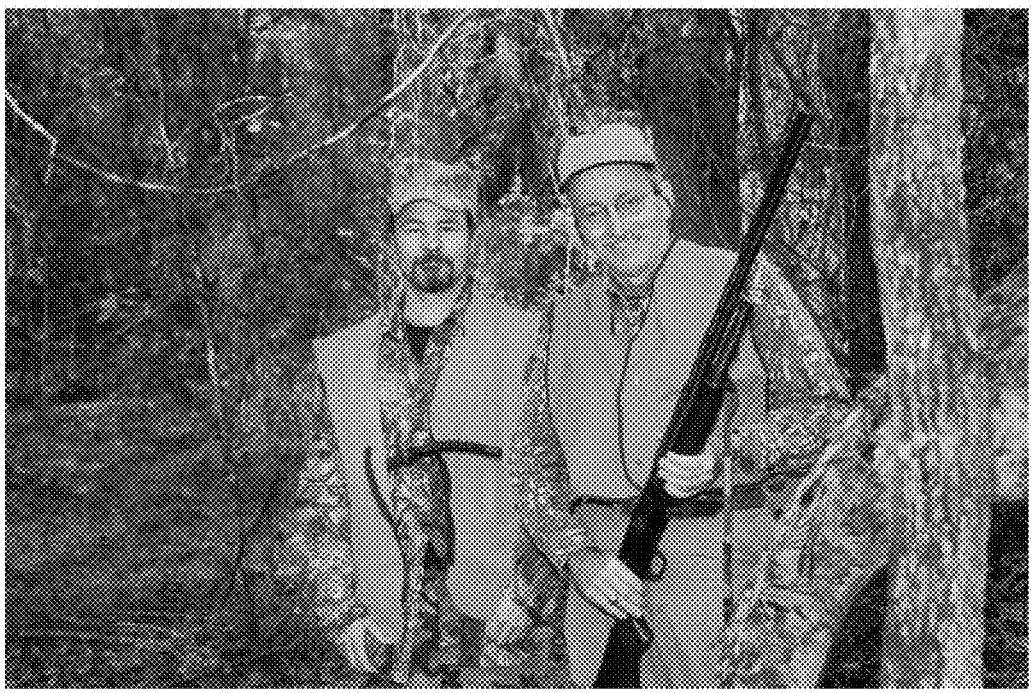
FIG. 36A is an example of an image using traditional processing.
Figure 36B:
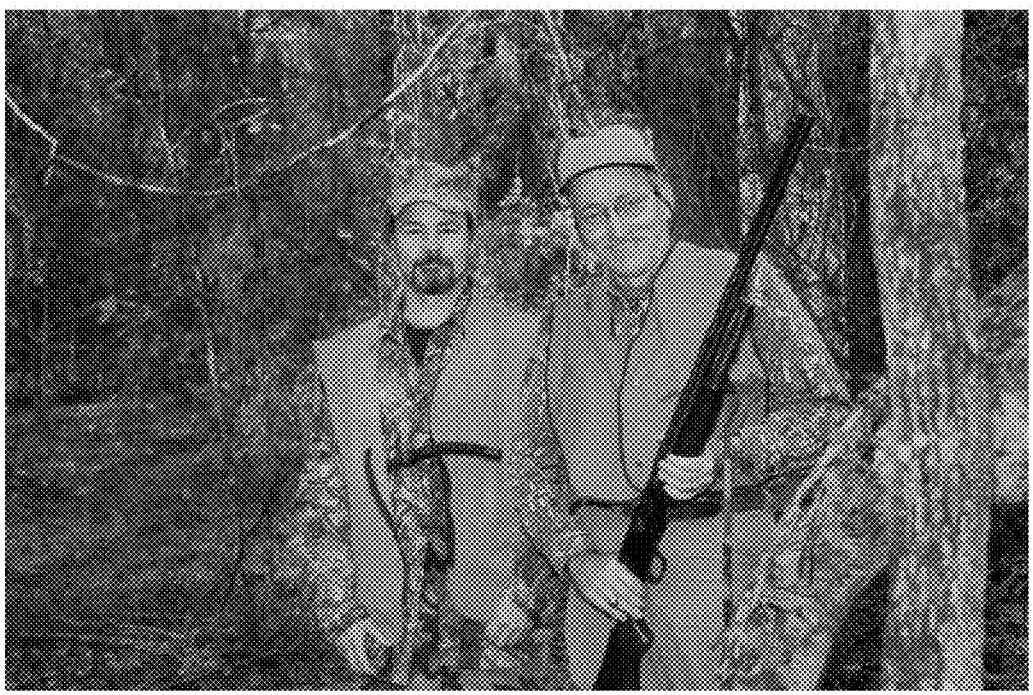
FIG. 36B is an example of an image using the modified color system with super saturated colors.

If the system is given a neutral image, it results in nothing displayed beyond a luminance of 300 cd/m². However, if a modified color system with super saturated colors is used, up to 1000 cd/m² in the example embodiment are operable to be displayed. For example, in an image of hunters in a field wearing fluorescent orange vests, the fluorescent orange vests would appear vibrant when compared to white. FIG. 36A is an example of an image using traditional processing. FIG. 36B is an example of an image using the modified color system with super saturated colors.

Figure 37A:
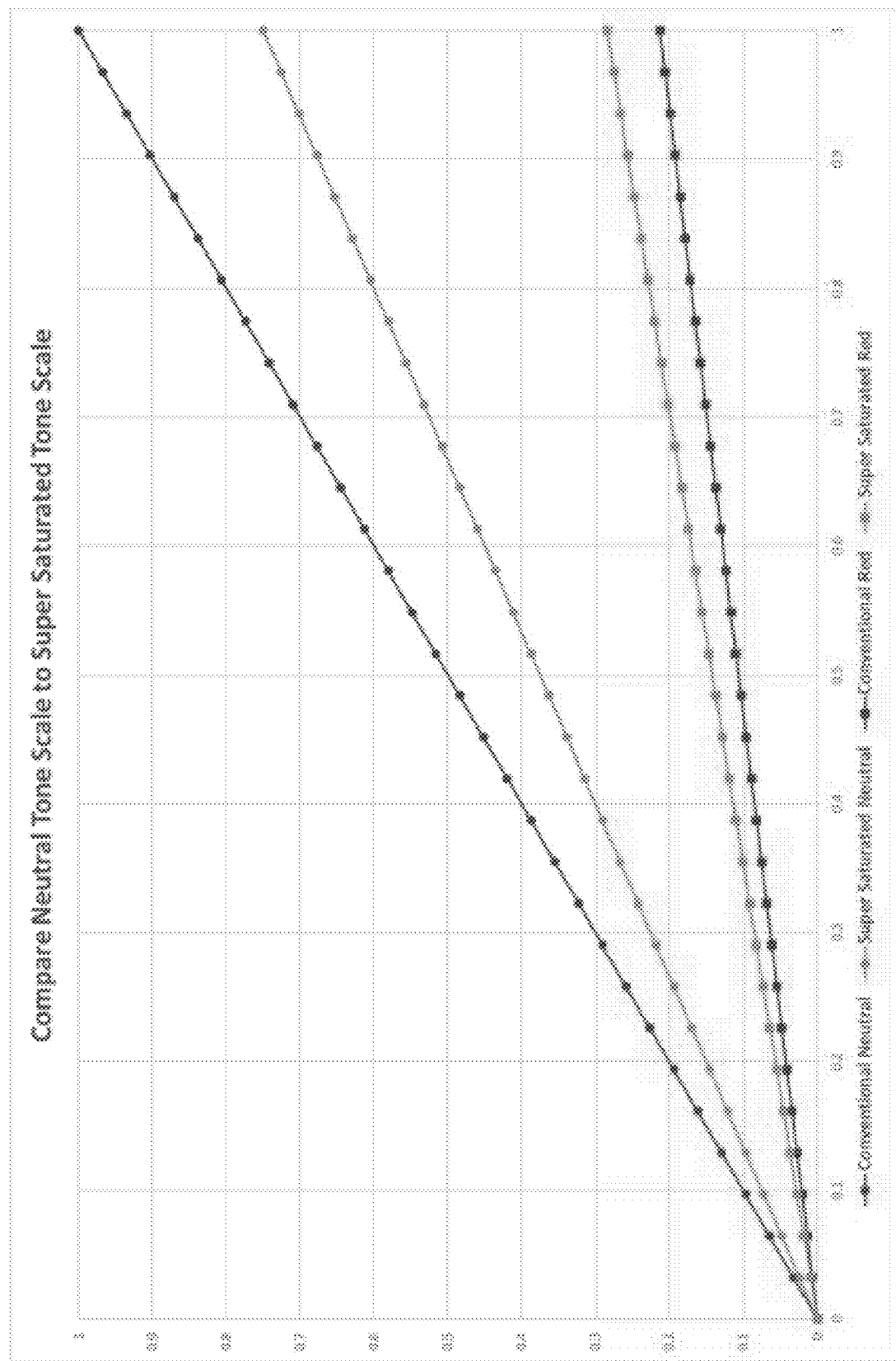
FIG. 37A is a graph comparing a neutral tone scale to a super saturated tone scale.

FIG. 37A is a graph comparing a neutral tone scale to a super saturated tone scale. Conventional neutral is shown with red circles, super saturated neutral is shown with green circles, conventional red is shown with red squares, and super saturated red is shown with green squares. The luminance of the conventional neutral (red circles) is higher than the luminance of the super saturated neutral (green circles). However, the luminance of the conventional red (red squares) is lower than the luminance of the super saturated red (green squares).

Figure 37B:
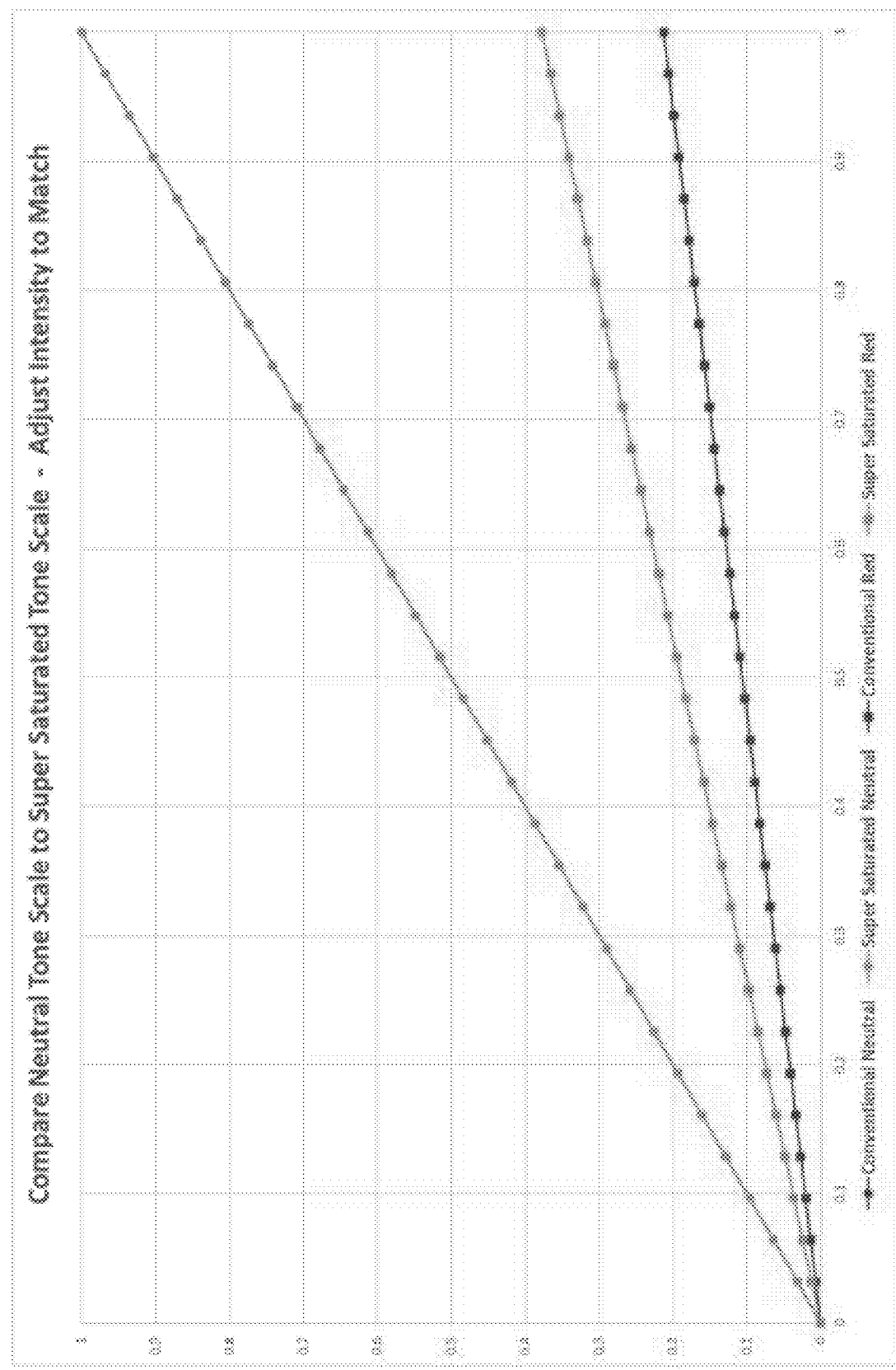
FIG. 37B is a graph comparing a neutral tone scale to a super saturated tone scale with matching intensities.

FIG. 37B is a graph comparing a neutral tone scale to a super saturated tone scale with matching intensities. Conventional neutral is shown with red circles and super saturated neutral is shown with green circles, resulting in an overlap of conventional and supersaturated neutral. Conventional red is shown with red squares and super saturated red is shown with green squares. The luminance of the conventional neutral (red circles) is adjusted to equal the luminance of the super saturated neutral (green circles). The luminance of the conventional red (red squares) is lower than the luminance of the super saturated red (green squares), and it is easier to visualize the increase in luminance of the super saturated red (green squares) relative to conventional red (red squares) in FIG. 37B.

In traditional color images, a person's perception of the color images is self-calibrated to a tone scale intensity range of a display or viewing device, and colors outside of this range are perceived as "super color" or "extra saturated colors". A person's perception of the overall tone scale sets up an anticipated color tone scale. Therefore, any enhancement from this will be perceived as expanded color.

Figure 38A:
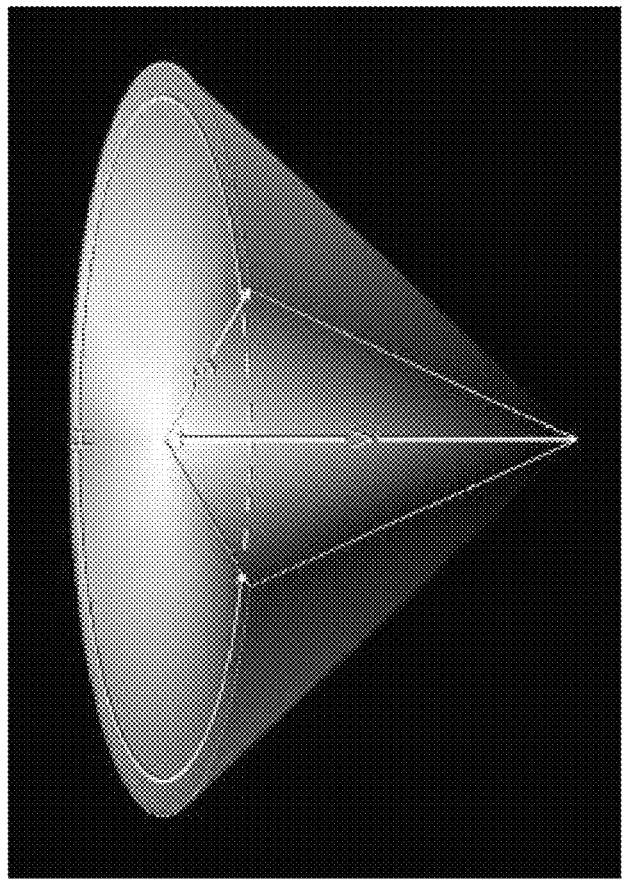
FIG. 38A is an example of a Hue, Saturation, Value (HSV) cone.
Figure 38B:
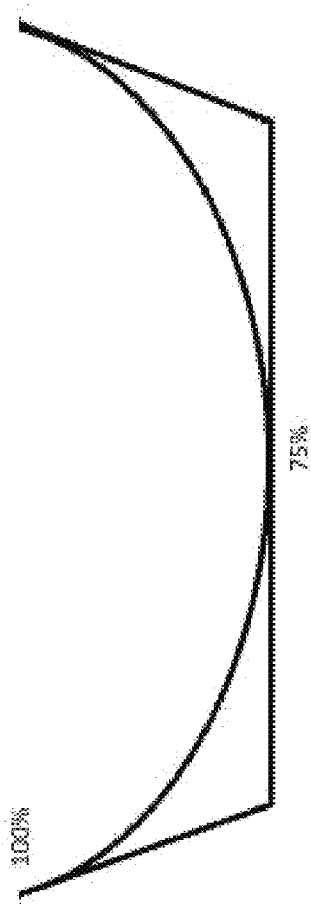
FIG. 38B is an example of a cross section of the cone in FIG. 38A after modification to have super saturated colors.

FIG. 38A is an example of a Hue, Saturation, Value (HSV) cone. By reducing the luminance in the center, a cross section of the cone would result in a shape similar to FIG. 38B. The slope of the valley depends on the function (e.g., linear, non-linear) used to reduce the luminance.

With systems with more than three primaries (e.g., RGB), white is defined using all color primaries (e.g., RGBCMY, RGBCEY (where E is emerald, i.e., two greens)). For example, a four primary system would normally be defined as [1 1 1 1], which would not result in white. For white, each primary is summed and then adjusted to provide the correct white (e.g., D65). This sum is naturally lower than all the primaries combined, leaving the output of the individual primaries to be more than the combination, resulting in super saturated color.

There are two main scenarios for systems with at least four primaries. In one embodiment, the relative amounts of the at least four primaries have no relation to the desired white point. For example, in a four primary system, a maximum intensity would be achieved by a [1 1 1 1] where all of the primaries are at maximum value. However, this may not be neutral white, or close to the desired white chromaticity. In this case, the maximum desired white point is generated by a combination of the primaries, and higher luminance would deviate from the desired white point chromaticity. The relative intensities of the primaries are then operable to be rescaled such that a [1 1 1 1] signal achieves the desired white point chromaticity. In another embodiment, the previously mentioned rescaling is done in the display device as a calibration such that the desired white point is achieved with a [1 1 1 1] signal. In either case, the Y reduction algorithm is then applied either in-line (e.g., using hardware) or with another calculation mechanism, such as a 3D LUT.

However, one of the differences between a three primary system and one with more than three primaries is that the achievable white point is unique in the three primary system. There is only one combination of red, green, and blue that results in the white point in any desired luminance. In a system with more than three primaries, one method of obtaining a unique solution to achieve the desired white point is with a restriction that the solution yields the highest attainable Y value. After that, lower Y values are operable to be achieved by a simple linear scaling of all the primaries. However, there are an infinite number of sets of primary combinations that are able to achieve a lower than maximum Y value for a white. This is typical of an over-determined system where the three colorimetric targets (e.g., Yxy, XYZ, etc.) are transformed into the primary intensity coefficients. The infinite number of sets are reduced in number by adding other constraints to the system (e.g., requiring the solution to yield the highest Y value for the desired white point). This applies to any system with a number of primaries greater than three.

The white level is reduced, so the display contrast range is reduced if measured in the traditional way. However, the saturation of any particular primary is operable to exceed its saturation at the white point and, thus, its contribution to luminance is increased. Advantageously, this results in less reduction of contrast range according to a subjective perception as the reduction in white point cd/m 2 might suggest. HDR displays are operable to be extremely bright. The embodiment described herein using super saturated colors is a much better use of the upper 25% of the range than limiting values in that range to super bright light sources like the sun, bright reflections, or specular light.

Figure 39:
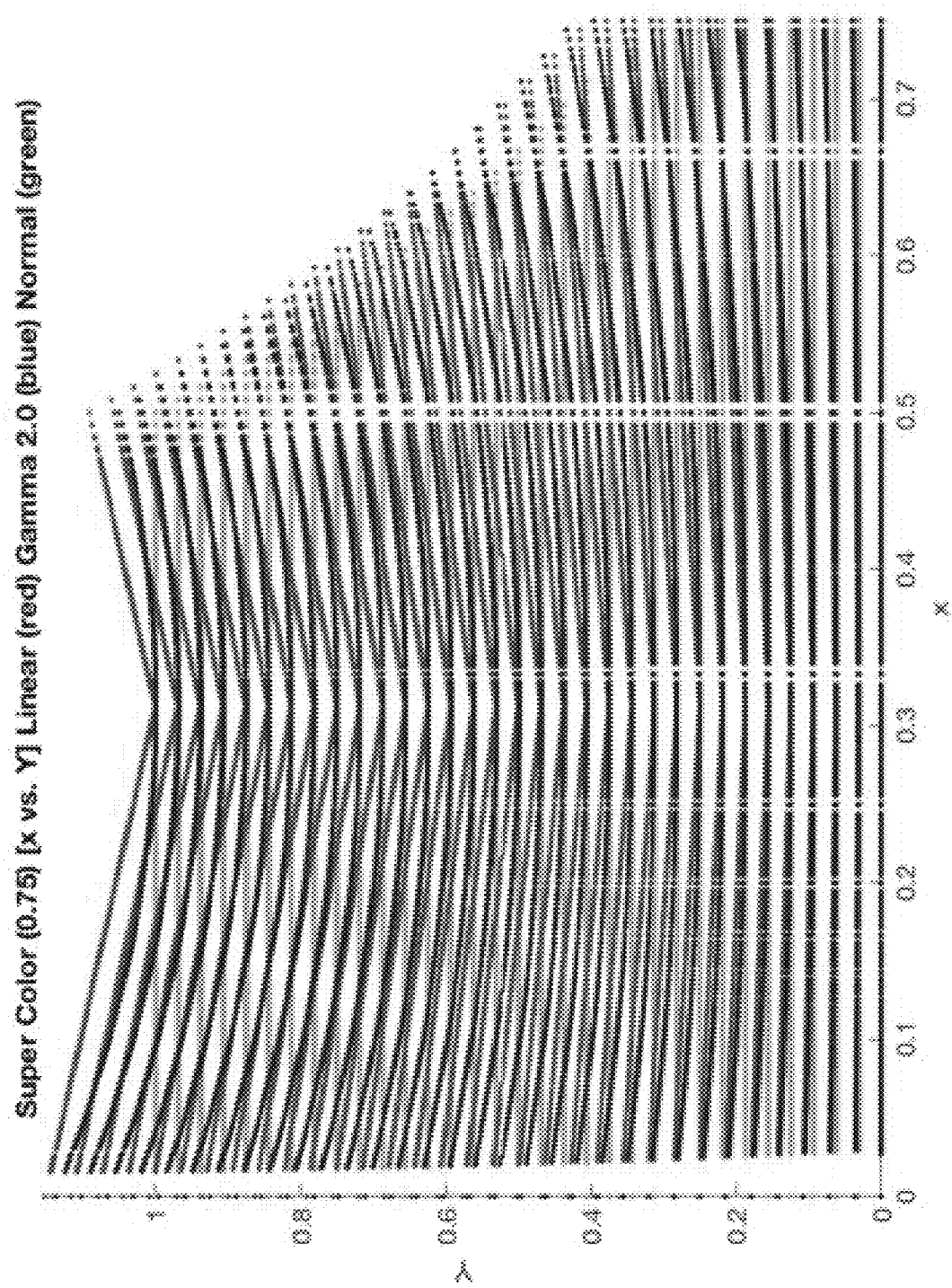
FIG. 39 is a plot of a three dimensional (3D) lookup table (LUT) in Yxy space with a normal unchanged set, a linear transform with super saturated colors, and a non-linear transform with super saturated colors.

FIG. 39 is a plot of a 33 cubed three dimensional (3D) lookup table (LUT) in Yxy space with a normal unchanged set in green. Near the center of the x axis at about 0.32 is where the x value of D65 resides. At this point the increase in luminance of a color should be minimal. The red points illustrate a linear transform reducing maximum luminance from 100% to 75%. The blue points illustrate a gamma 2.0 transform from 100% to 75%. The white Y reduction is rescaled to compare with the unchanged set (green). This is reasonable if after this algorithm, the display or viewing device is increased in overall luminance to achieve a specific white luminance. Moving to the left or right away from the neutral center increase the red and blue curves relative to the reference green points. The blue points indicate that the gamma 2.0 transform maintains the Y of the reference more near the neutral before increasing as the chroma increases.

Figure 40A:
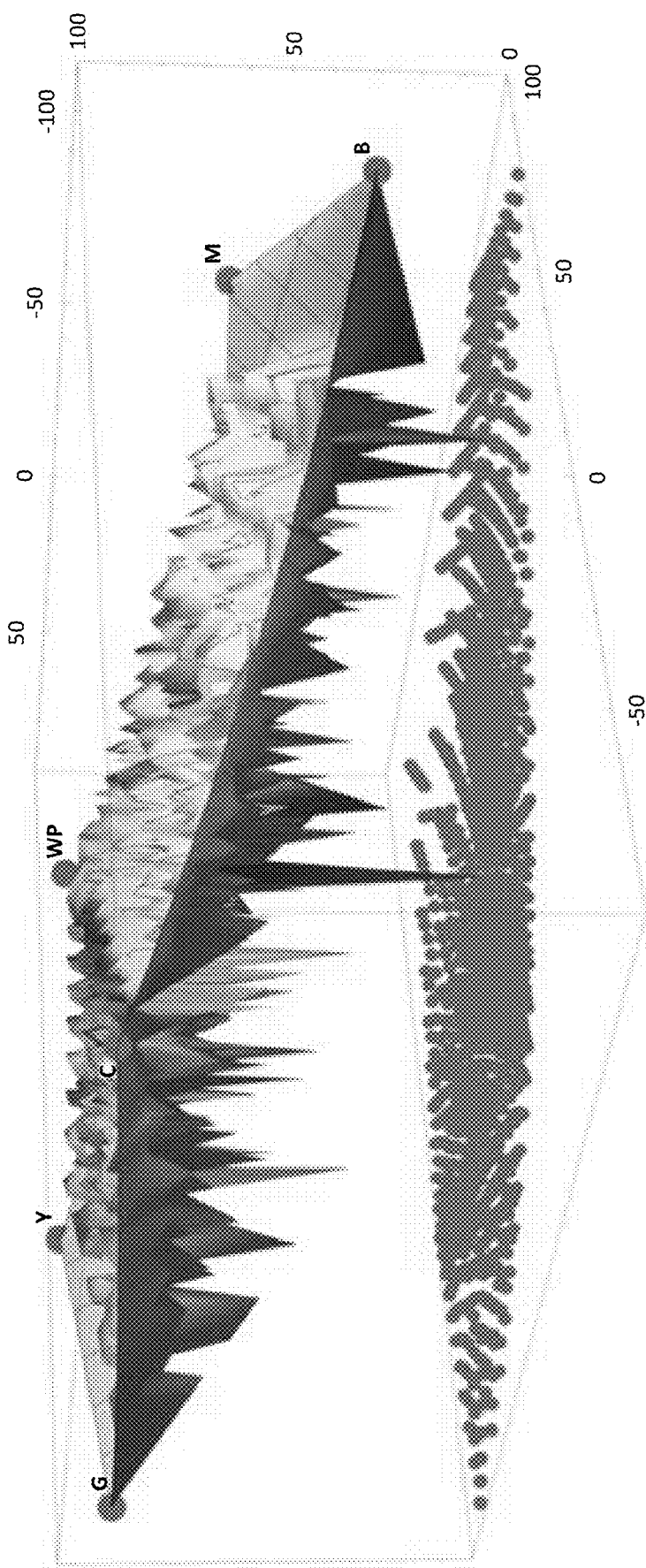
FIG. 40A is a plot of 6P-C in three-dimensional space.
Figure 40B:
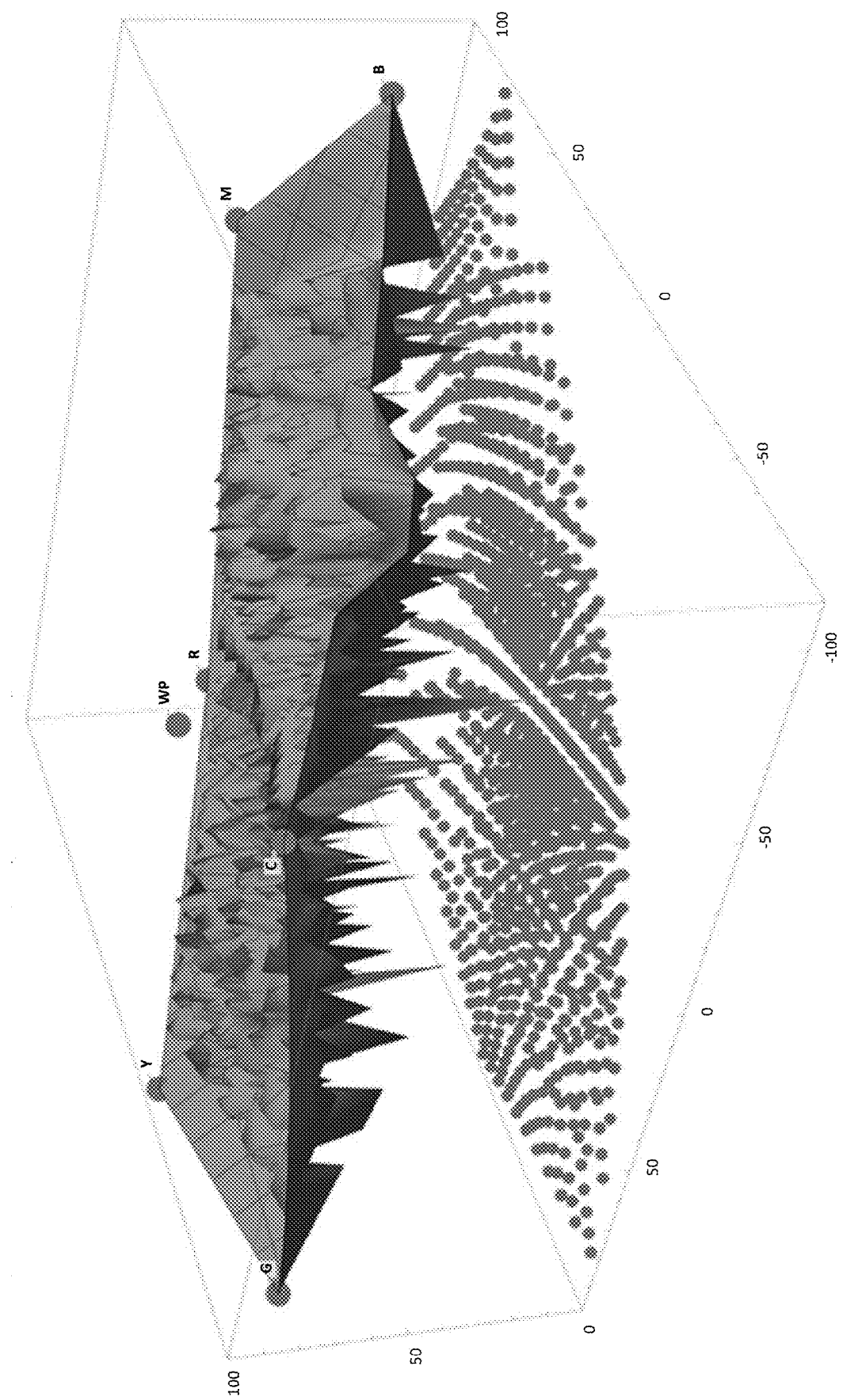
FIG. 40B is a plot of 6P-C with super saturated colors in three-dimensional space.
Figure 41:
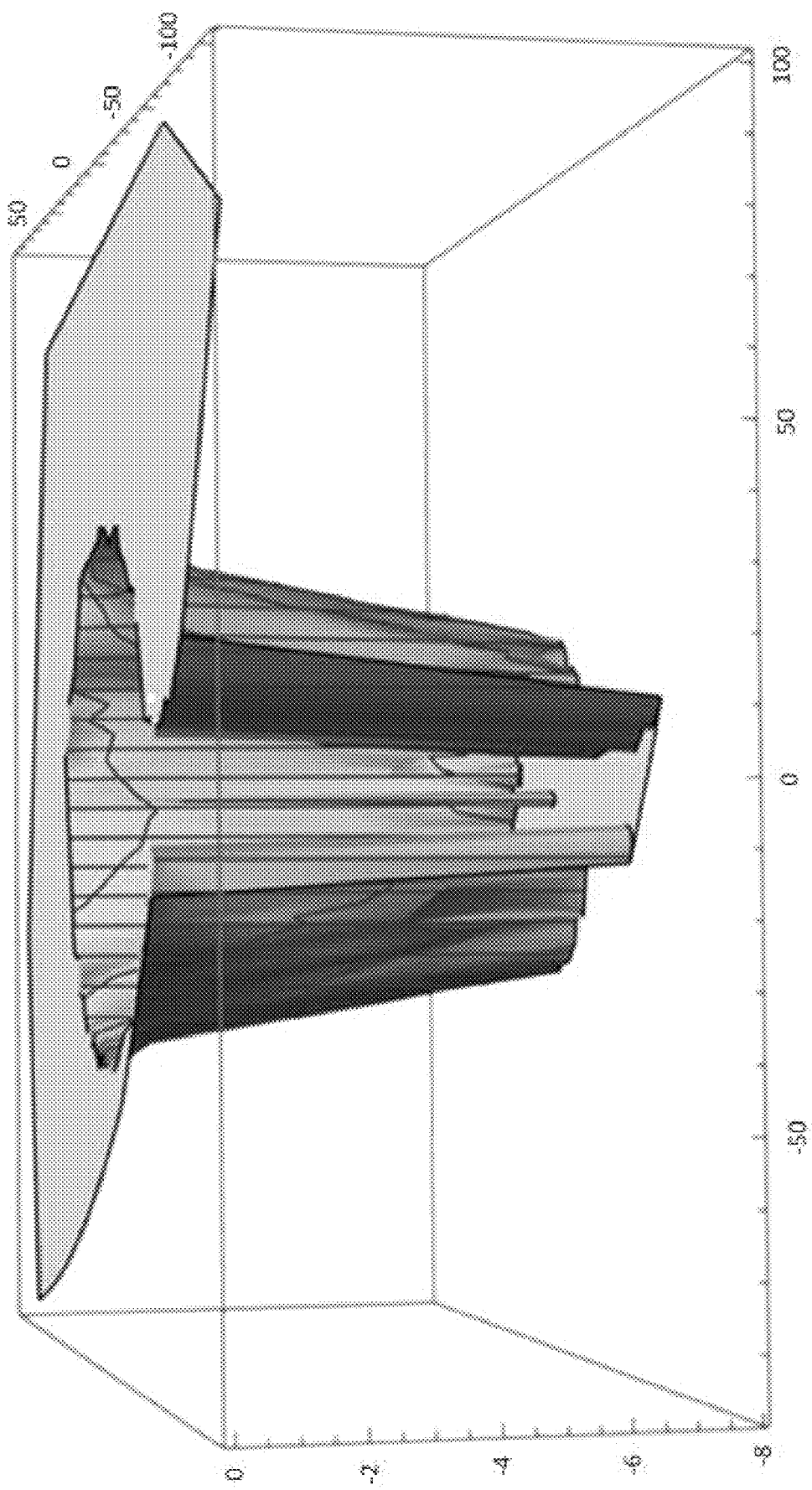
FIG. 41 illustrates a plot of 6P-C showing the transition from the white point at the bottom of the graph to the super saturated colors at the periphery.

FIG. 40A is a plot of 6P-C in three-dimensional space. The blue dots at the bottom of the plot show the chromaticity. Notably, the chromaticity does not change throughout the luminance scaling processes described in the present invention. FIG. 40B is a plot of 6P-C with super saturated colors in three-dimensional space. The blue dots at the bottom of the plot show the chromaticity, which is the same as the chromaticity in FIG. 40A. However, as can be seen in FIG. 40B, the original white point ("WP") is significantly higher in space than the area covered by a super saturated 6P-C system. FIG. 41 illustrates a plot of 6P-C showing the transition from the white point at the bottom of the graph to the super saturated colors at the periphery.

Figure 46:
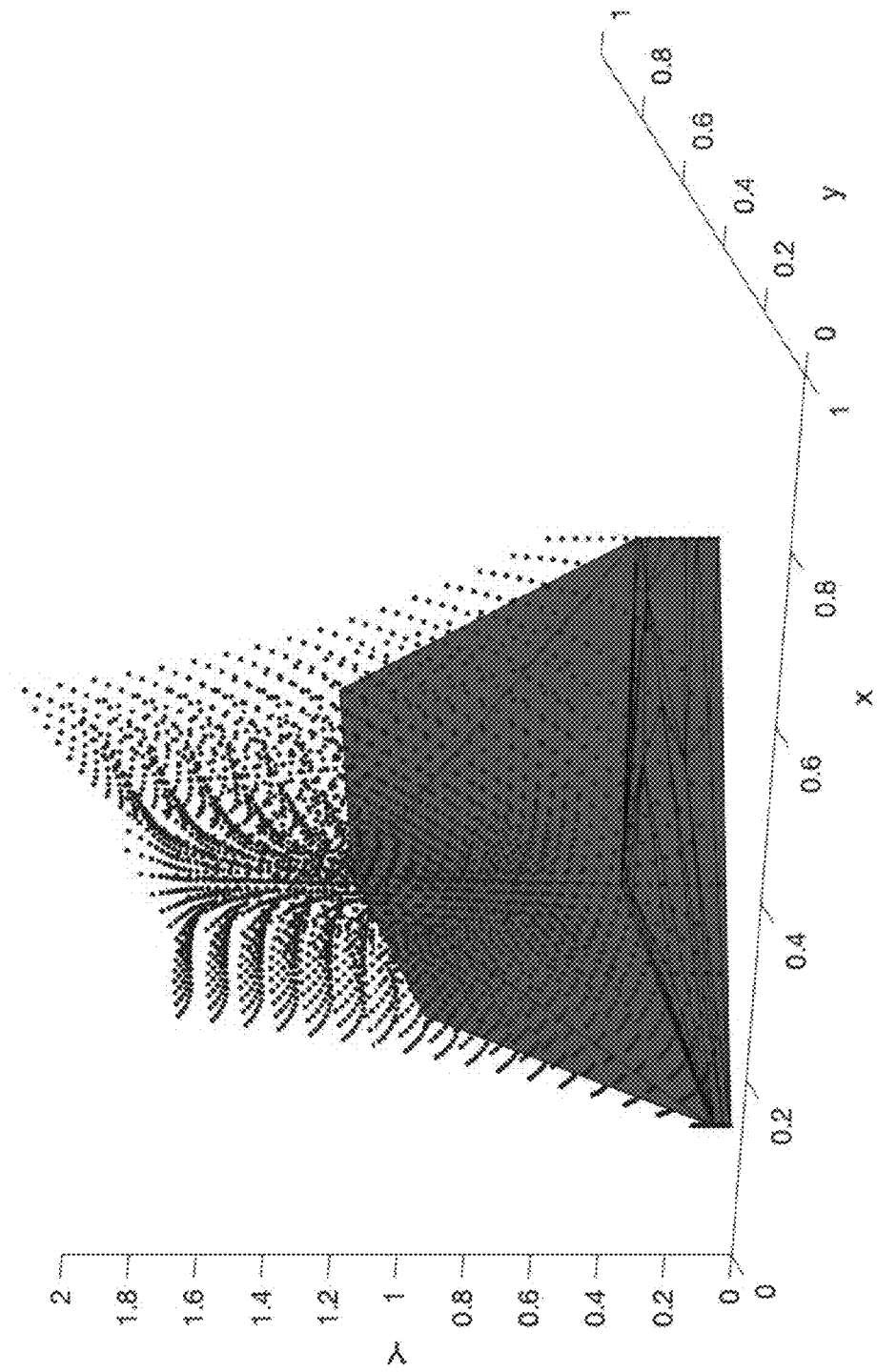
FIG. 46 illustrates a three-dimensional plot representation of super saturated color on a Rec. 2020 color space data set with a rate of 0.5.
Figure 47:
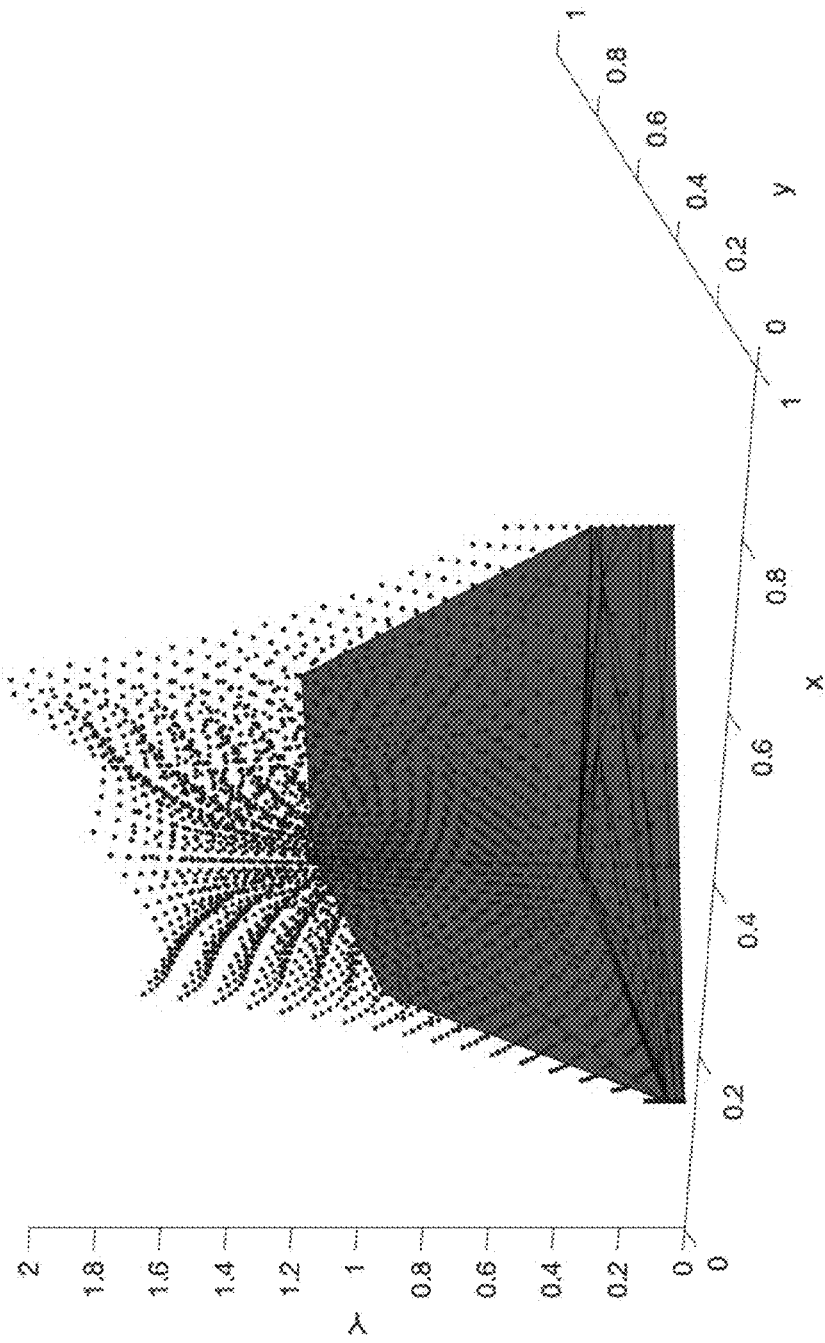
FIG. 47 illustrates a three-dimensional plot representation of super saturated color on a Rec. 2020 color space data set with a rate of 1.
Figure 48:
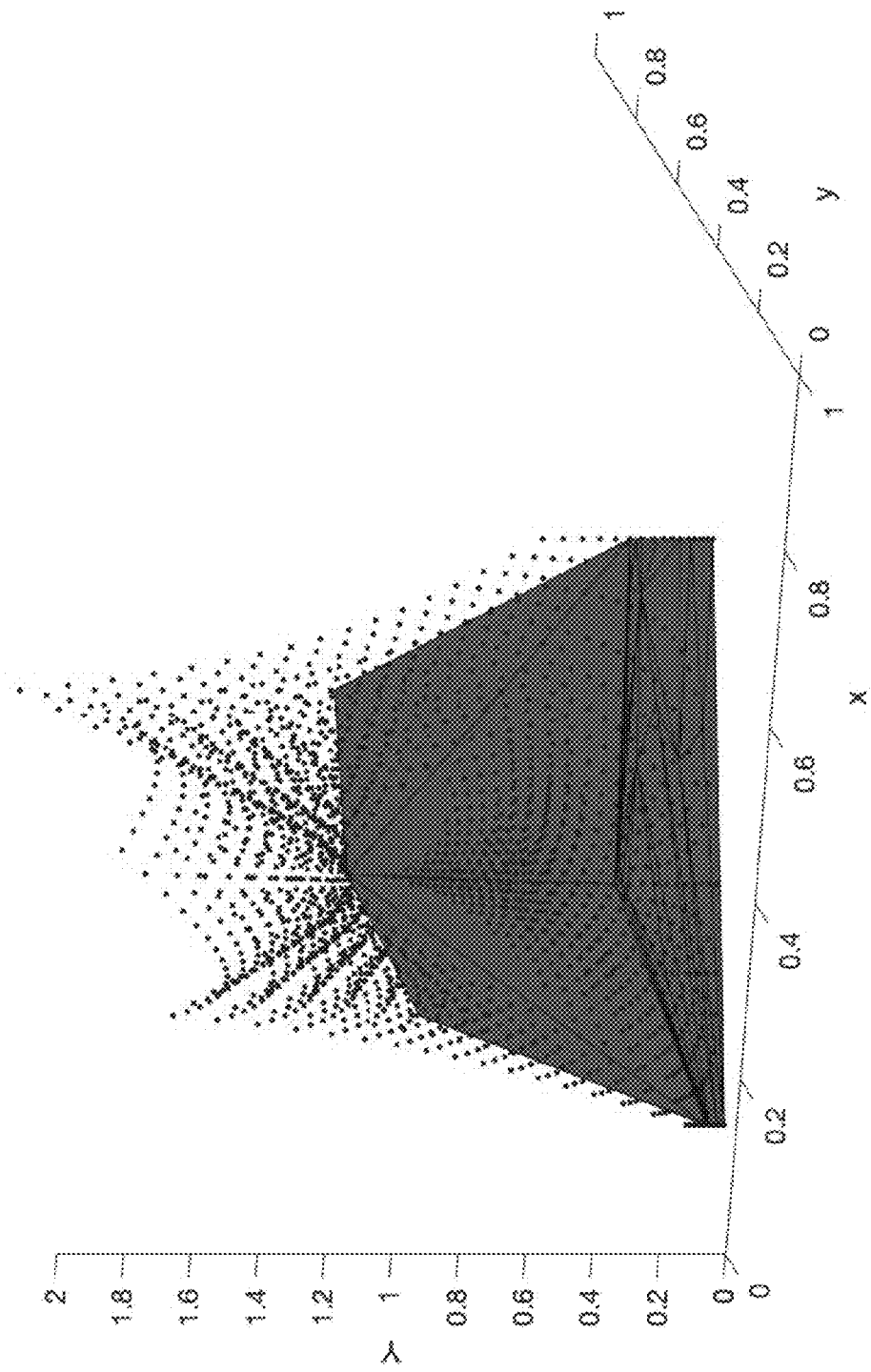
FIG. 48 illustrates a three-dimensional plot representation of super saturated color on a Rec. 2020 color space data set with a rate of 2.
Figure 49:
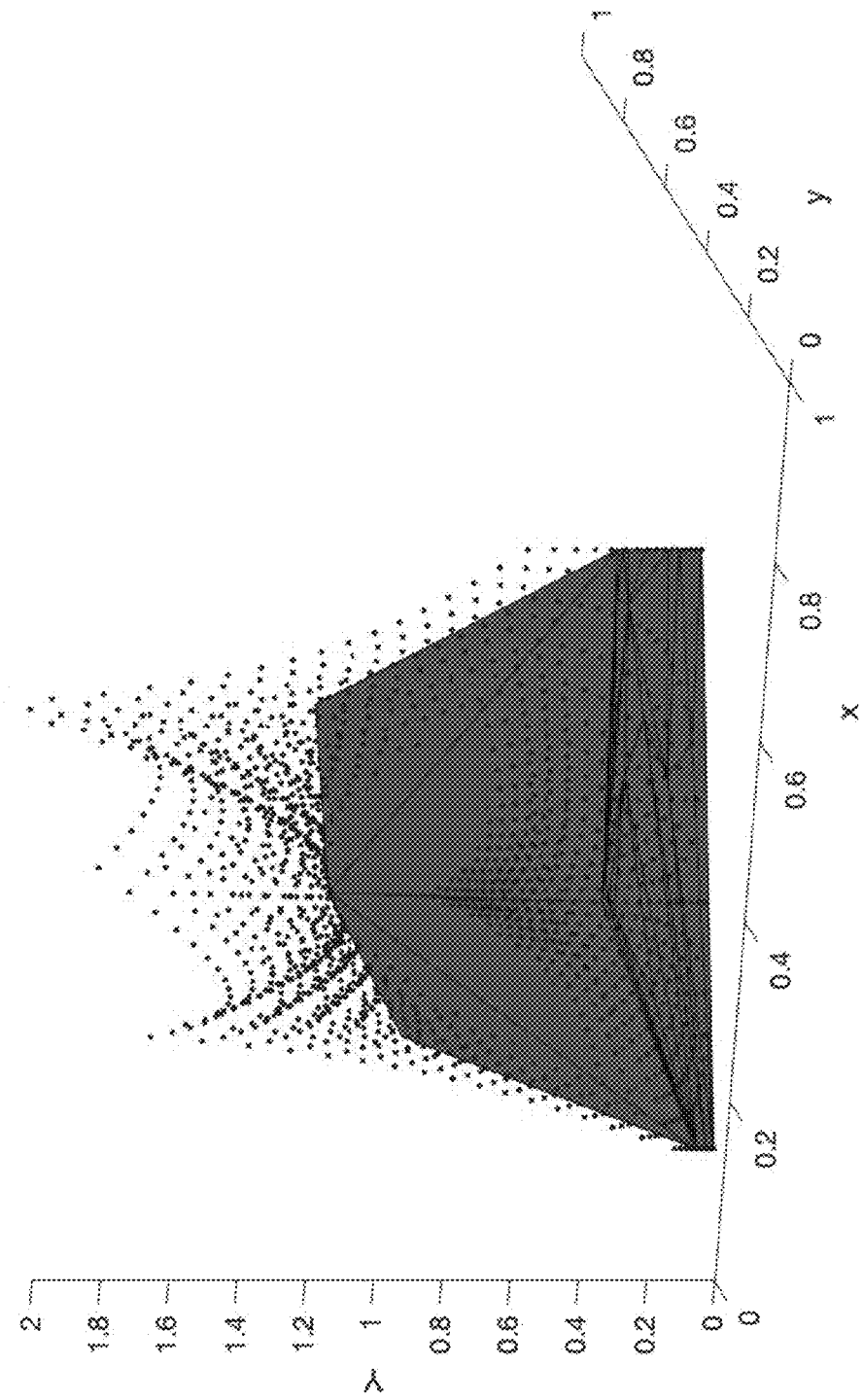
FIG. 49 illustrates a three-dimensional plot representation of super saturated color on a Rec. 2020 color space data set with a rate of 3.
Figure 50:
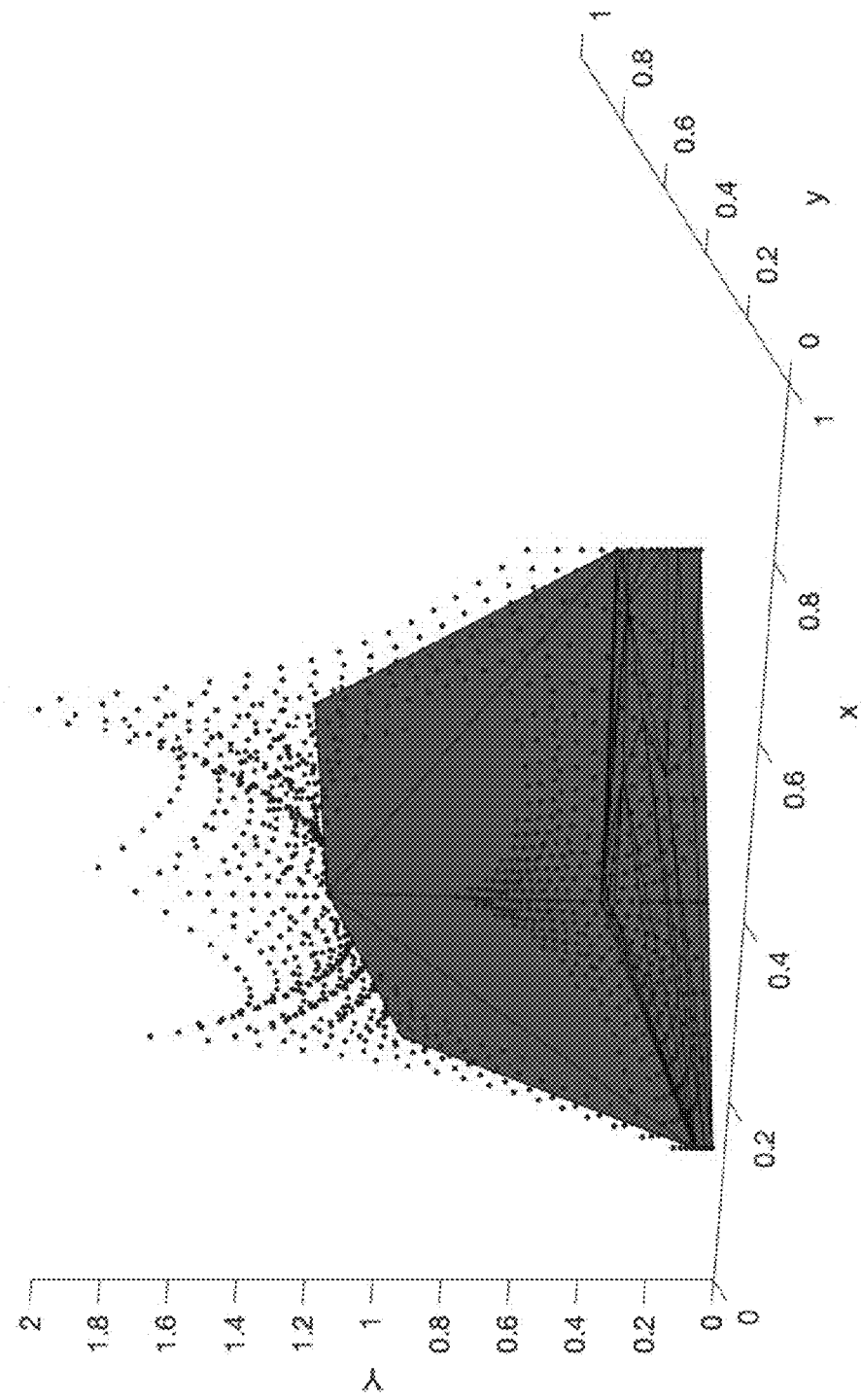
FIG. 50 illustrates a three-dimensional plot representation of super saturated color on a Rec. 2020 color space data set with a rate of 4.
Figure 51:
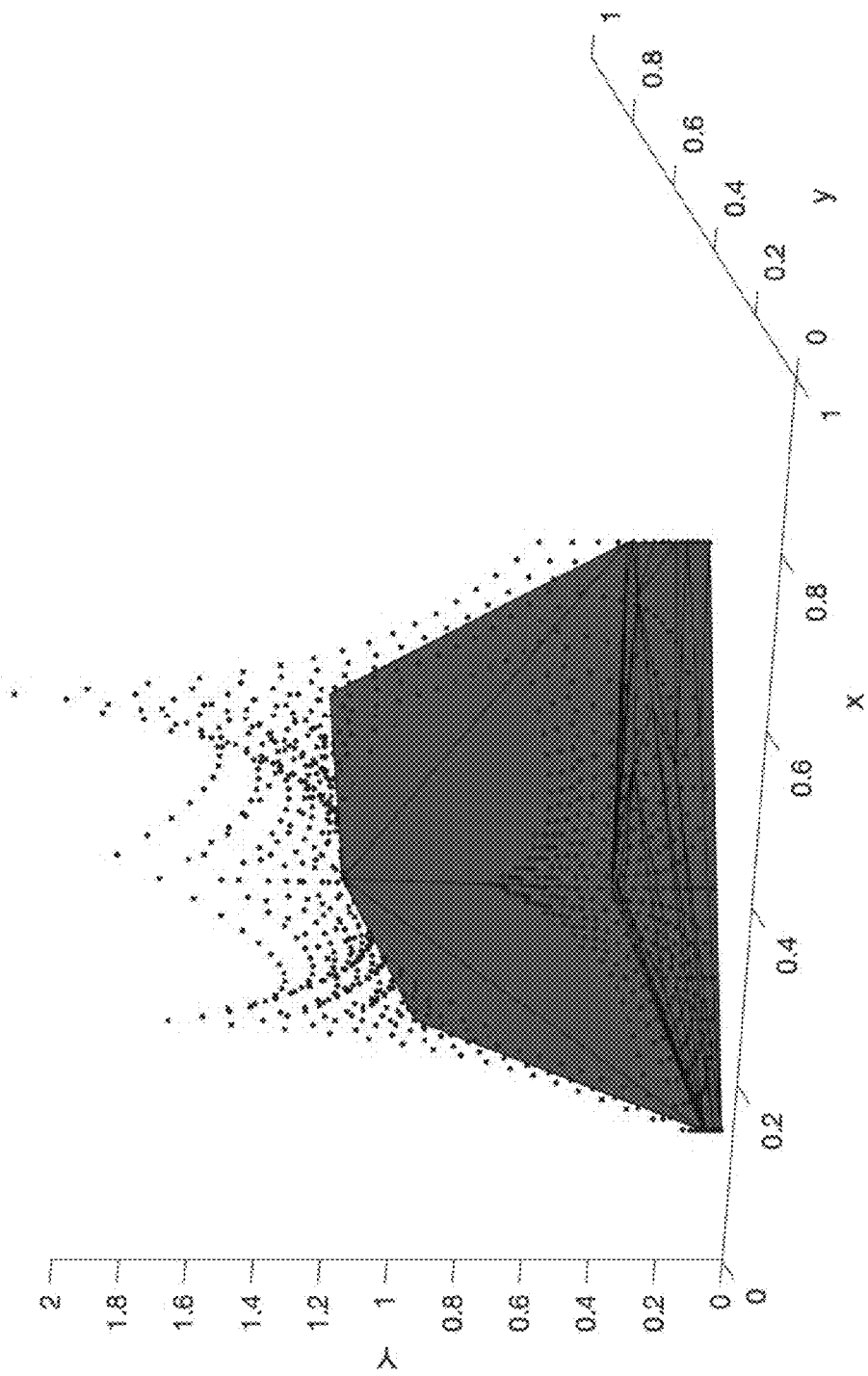
FIG. 51 illustrates a three-dimensional plot representation of super saturated color on a Rec. 2020 color space data set with a rate of 5.

FIGS. 46-51 are three-dimensional (3D) plots that represent super saturated color on a Rec. 2020 color space data set. The red plot in each of FIGS. 46-51 illustrates a Rec. 2020 volume with a peak D65 white at Y=1.0. The blue plot in each of FIGS. 46-51 illustrates a super saturated color volume where the nominal Y of the display is twice that of the normal Rec. 2020 (i.e., Y=2.0) while the neutral scale is maintained at Y=1.0. The blue plot is illustrated as dots to improve the visualization. In each plot, the title shows the rate from 0.5 to 5. The rate is exponent of the transition from neutral to full color. Thus, a rate of 3 is a transition of C^3, where C is the calculated relative chroma, which is calculated by a trilinear RGB equation. The volume ratio is also shown, where this is the ratio of the volume of the Yxy of the super saturated color relative to the Rec. 2020 normal volume. As seen in the figures, the volume increase is approximately 77.7%. FIG. 46 illustrates a three-dimensional plot representation of super saturated color on a Rec. 2020 color space data set with a rate of 0.5. FIG. 47 illustrates a three-dimensional plot representation of super saturated color on a Rec. 2020 color space data set with a rate of 1. FIG. 48 illustrates a three-dimensional plot representation of super saturated color on a Rec. 2020 color space data set with a rate of 2. FIG. 49 illustrates a three-dimensional plot representation of super saturated color on a Rec. 2020 color space data set with a rate of 3. FIG. 50 illustrates a three-dimensional plot representation of super saturated color on a Rec. 2020 color space data set with a rate of 4. FIG. 51 illustrates a three-dimensional plot representation of super saturated color on a Rec. 2020 color space data set with a rate of 5.

In one embodiment, the trilinear equation includes conversion from RGB to a cartesian TLx and TLy set as follows:

$$TLx = R - \frac{G}{2} - \frac{B}{2}$$

$$TLy = (G - B) \times \cos(30°)$$

In one embodiment, the cartesian TLx and TLy set is converted to a polar TLx TLy set as follows:

$$\text{radius} = r = (TLx^2 + TLy^2)^{1/2}$$

$$\text{hue angle} = \tan^{-1}\left(\frac{TLy}{TLx}\right) \text{ for } TLx \geq 0$$

$$\text{hue angle} = \tan^{-1}\left(\frac{TLy}{TLx}\right) \pm 180° \, TLx < 0$$

FIG. 52A is a table of primary data including RGB set, cartesian TLx and TLy set, polar TLx and TLy set, and Chroma (C) saturation values.

Figure 52B:
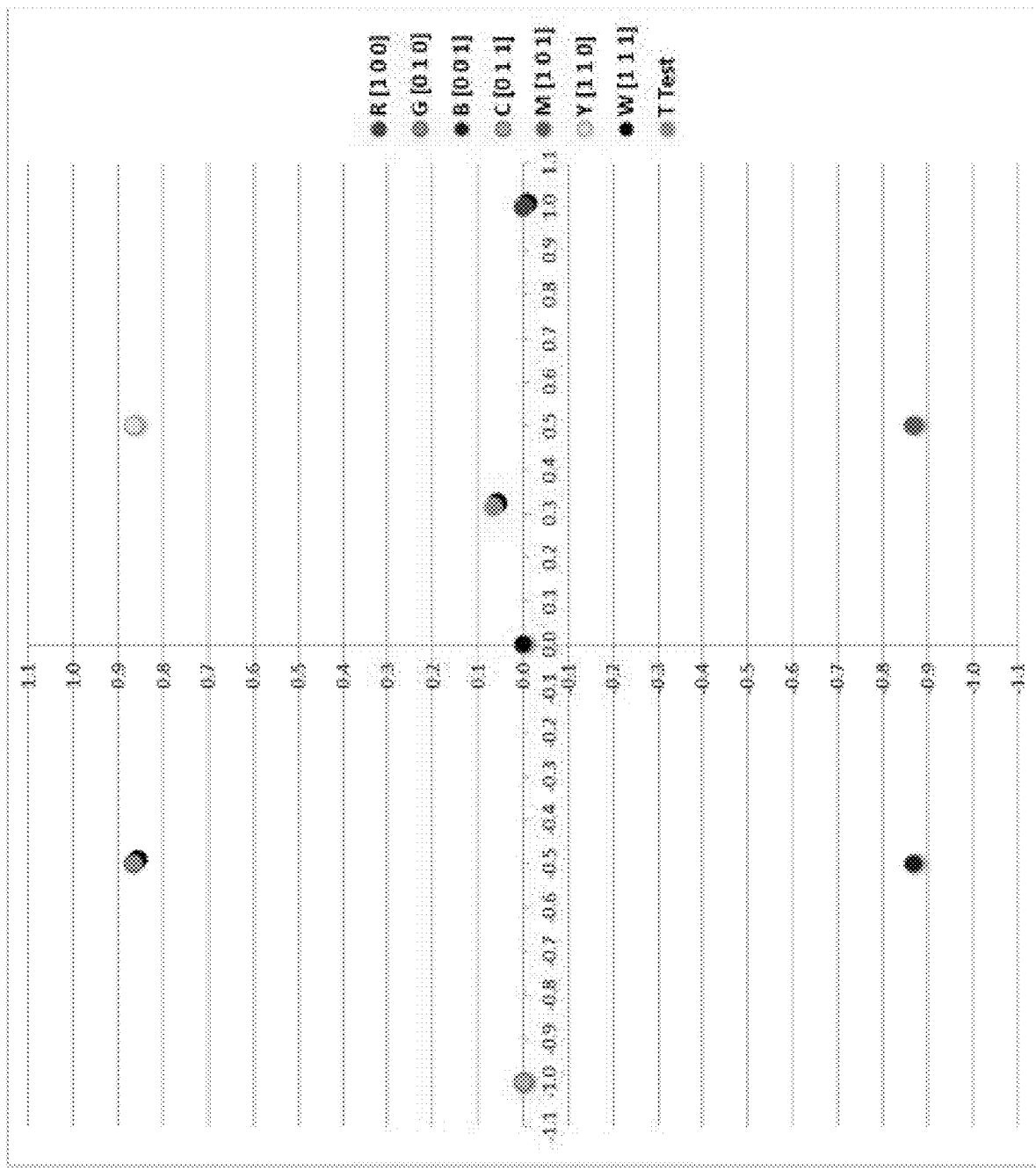
FIG. 52B is a graph of the values in FIG. 52A.

FIG. 52B is a graph of the values in FIG. 52A.

In one embodiment, the super saturated color Y ssc is calculated using the following equation:

$$Y_{SSC} = Y - (Y \times (1.0 - C_{SSC})) \times Y_{factor}$$

where $C_{SSC}$ is the altered C and $Y_{factor}$ is the reduction of the white from the maximum attainable from the display to the desired Y. For example and not limitation, $C_{SSC} = C^{\wedge}\text{power}$ (e.g., power=0.5, 1, 2, 3, 4, 5, etc.). For example and not limitation, if a display is 400 nits and the maximum Y desired is 200 nits, $Y_{factor} = 200/400 = 0.5$. In one example, the equation for $Y_{SSC}$ above is used with a $C_{SSC}$ of 0 and a $Y_{factor}$ of 0.5 to produce a $Y_{SSC}$ of 200 (i.e., $C_{SSC} = 400 - (400 \times (1.0 - 0.0)) \times 0.5 = 200$). In yet another example, the equation for $Y_{SSC}$ above is used with a $C_{SSC}$ of 0.5 and a $Y_{factor}$ of 0.5 to produce a $Y_{SSC}$ of 300 (i.e., $C_{SSC} = 400 - (400 \times (1.0 - 0.5)) \times 0.5 = 300$). In yet another example, the equation for $Y_{SSC}$ above is used with a $C_{SSC}$ of 1 and a $Y_{factor}$ of 0.5 to produce a $Y_{SSC}$ of 400 (i.e., $C_{SSC} = 400 - (400 \times (1.0 - 1.0)) \times 0.5 = 400$). However, this is only one $Y_{SSC}$ equation, and the present invention is compatible with a plurality of equations including, but not limited to, linear, log, and/or custom curves. In another embodiment, the $C_{SSC}$ is not altered under a specified value (e.g., 0.25) and then scaled to the maximum chroma from that point (e.g., if near neutrals are in question).

FIG. 53A is a table of values for C raised to various powers (e.g., 1-5). The table in FIG. 53A denotes values in the skin color range (i.e., flesh tones).

Figure 53B:
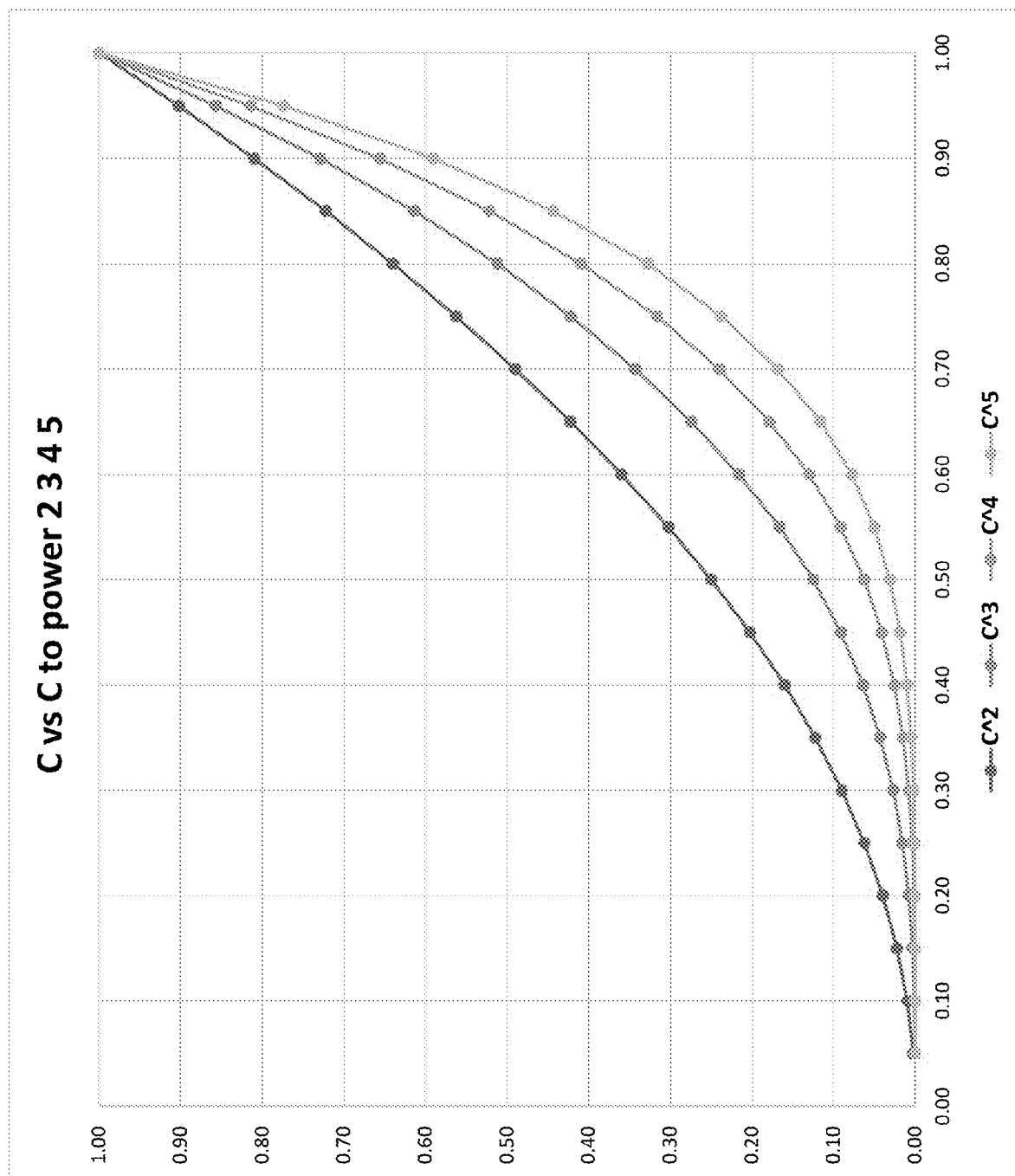
FIG. 53B is a graph of C vs. C raised to various powers (e.g., 2-5) using the values in the table in FIG. 53B.

FIG. 53B is a graph of C vs. C raised to various powers (e.g., 2-5) using the values in the table in FIG. 53B.

In one embodiment, the viewing device is operable to provide a display and/or a heads-up display (e.g., gaming, vehicles) using super saturated colors. In one embodiment, the heads-up display is operable to provide projection. In one embodiment, the super saturated colors are operable to provide additional clarity for the viewing device.

In one embodiment, the super saturated color system is operable to allow colors to saturate to 100% or beyond. Advantageously, this provides a nice separation from flesh tones, which hover around the 18% gray mark, to establish flesh tonality. This also provides a nice neon effect to the colors, if the luminance value is pushed beyond 100% percentagewise (e.g., 125%) relative to the reduced white. Allowing the luminance to be pushed high while separating it from the 18% even further provides a bold contrast that would aid in numerous applications, including, but not limited to, car navigation, AR/VR, sports, and/or gaming applications.

In the case of gaming, super saturated colors with high luminance to neon-like colors provides an advantage in a radar square showing friends or foes for a first-person shooter game or hovering over players and non-player characters in the live participation of an online game. For AR/VR, similar situations occur where the super saturated colors are able to provide greater clarity in simulations for conditions in AR/VR and overlays over the real word in the case of AR for gaming, simulation, and/or live training applications (e.g., medical, maintenance, vehicles). Further, for vehicle applications, this allows for safer conditions for the vehicle operator (e.g., driver, pilot) to see the heads-up colors with more distinction and neon-like appearance to avoid any confusion or distortion.

Single Device Image Capture and Display

In one embodiment, the present invention includes a device wherein the device is operable to acquire image data, process image data, and/or display image data. The device includes, but is not limited to, a camera (e.g., digital video camera, still camera), a mobile device (e.g., a smartphone), a tablet, a computer (e.g., desktop computer, laptop computer), a monitor, a wearable device, a personal digital assistant (PDA), an electronic book reader, a digital media player, a video gaming device, a video teleconferencing device, a video streaming device, a heads up display, and/or an augmented reality/virtual reality (AR/VR) device (e.g., a headset, a pair of goggles, smart lenses). The device does not require transport of data between separate components via a wireless connection. Additionally, the device does not require transport of data over longer wired and/or cable connections (e.g., HDMI cables, SDI cables). Advantageously, wired connections of the device (e.g., soldered connections) are operable to be shorter because the wired connections are within a single device. Thus, the device streamlines the process of acquiring and displaying image data.

In one embodiment, the device includes at least one imager for acquiring image data. The at least one imager preferably includes at least one lens and at least one image sensor (e.g., a camera, a video camera, a camcorder, a slow-motion camera, and/or a high-speed camera). Charge-coupled device (CCD) image sensors, complementary metal-oxide-semiconductor (CMOS) image sensors (e.g., active-pixel sensors (APS), hybrid CCD/CMOS image sensors), n-type metal-oxide-semiconductor (NMOS) image sensors, and quanta image sensors are compatible with the present invention. In one embodiment, the CMOS image sensor includes a quincunx pattern design. In one embodiment, the CMOS image sensor includes a 45-degree rotation of a Bayer pattern. In one embodiment, the at least one imager is a single imager with a striped filter system. Alternatively, the at least one imager includes a red imager, a green imager, and a blue imager. The at least one lens directs light towards the at least one image sensor. The at least one lens includes, but is not limited to, at least one convex lens and/or at least one concave lens. In one embodiment, the at least one image sensor is a wide gamut image sensor, e.g., a wide gamut camera. In one embodiment, the at least one image sensor is a single-pixel image sensor. In one embodiment, the at least one image sensor does not include a detector array. In one embodiment, the at least one image sensor is a plurality of image sensors. In one embodiment, one or more of the at least one imager is interchangeable such that the device is compatible with a plurality of imagers. Advantageously, this modular design enables the at least one imager to be upgraded or swapped out depending on varying image acquisition needs and/or technological developments.

In one embodiment, the at least one imager includes a plurality of lenses for a plurality of image sensors. In one embodiment, the plurality of lenses creates different focal lengths for each of the plurality of image sensors. In one embodiment, the device is operable to change the focal lengths, e.g., by zooming. Alternatively, the device is operable to interpolate signals from the plurality of image sensors with different focal lengths to create hybrid sensor data. The device is operable to combine sensor data from each of the plurality of image sensors into a single set of image data. In one embodiment, the device includes a stabilizer, e.g., a gyroscope system, an electronic stabilization system. The at least one imager is preferably located on the stabilizer and the stabilizer moves the at least one imager to counteract movements that would result in blurry images. In one embodiment, the at least one imager includes a lens mount, e.g., a screw mount, a bayonet mount, a breech lock, a tab lock, a double bayonet, Z, X, Electro-Focus (EF), EF-M, EF-S, AF, E, L, RF, G, M, SA, A, K, F, S, PL, T, C, H, RF, and/or 645 mounts.

In one embodiment, the at least one imager includes at least one filter (e.g., optical filter). In one embodiment, the at least one filter is overlaid atop a photosite on the at least one image sensor. In one embodiment, the at least one filter is an absorptive filter. Alternatively, the at least one filter is an interference filter or a dichroic filter. In one embodiment, the at least one filter has at least one cut-off wavelength and passes or blocks light based on the at least one cut-off wavelength (e.g., a long-pass filter, a short-pass filter, a bandpass filter, a multi-bandpass filter, a notch filter). In an alternative embodiment, the at least one filter modifies the intensity of all wavelengths equally, e.g., a neutral density filter. In one embodiment, the at least one filter includes at least one color filter array, e.g., a Bayer filter, a Quad Bayer filter, a diamond pattern color filter array, a Yamanaka color filter array, a vertical stripe color filter array, a diagonal stripe color filter array, a pseudo-random color filter array, and/or a human visual system-based color filter array. Filter colors compatible with the present invention include, but are not limited to, RGB, CYGM, RGBE (red, green, blue, emerald), and/or CMY. The at least one filter is operable to be modified. As a non-limiting example, a Bayer filter is modified to include a magenta filter. Alternatively, the size of the elements in the Bayer filter are adjusted to increase sensitivity of the at least one image sensor. In yet another alternative embodiment, one or more of the at least one filter is operable to be rotated. In one embodiment, the at least one filter includes a plurality of filter layers. In one embodiment, the at least one filter includes at least one filter for light outside of the visible wavelength range, e.g., ultraviolet (UV) filters, infrared (IR) filters. In one embodiment, the device is operable to convert light captured through non-visible wavelength filters into visible light for visual effects such as UV/blacklight simulation. The at least one filter includes any number of color filters. In one embodiment, the at least one filter includes inverse colors to increase a sensitivity of the at least one imager.

Single Device Acquisition

In one embodiment, the device is operable to acquire raw image data as a raw image file. A raw image file is considered unprocessed and thus cannot be edited or printed. Raw image files include image data as well as metadata and a header. The metadata includes, but is not limited to, image sensor parameters, imager parameters, timecodes, frame data, HDR metadata, colorimetric metadata, an aspect ratio, dimensions (e.g., pixel dimensions), and/or lens information (e.g., a focal length, an aperture, a shutter speed, an exposure time, a sensitivity, a white balance). Raw image formats include, but are not limited to, Digital Negative Raw (DNG), ISO 12234-2 (TIFF/EP), NIKON NEF, CANON Raw v2 (CR2), CR3, and/or REDCODE Raw (R3D) files. In one embodiment, the device is operable to store the raw image file before processing. The device is then operable to render the raw image data into rendered image data, wherein the rendered image data is operable to be viewed and/or edited. Rendering includes, but is not limited to, decoding, demosaicing (e.g., removing the effects of a Bayer filter), pixel removal (e.g., of defective pixels), interpolation (e.g., to replace removed pixels), white balancing, noise reduction, color translation, tone reproduction, optical correction, contrast manipulation, resizing, splitting, cropping, and/or compression. Alternatively, the device does not compress the raw image data. In one embodiment, the device is operable to render the image data as a pipeline process, wherein each step is performed in succession. The order of the steps is operable to be changed. Alternatively, the device is operable to render the image data in parallel steps. In yet another alternative embodiment, the device is operable to render the image data by solving a single optimization problem. The device is operable to save image prior data and/or image variation data and use the image prior data and/or the image variation data in rendering, processing, and/or displaying the image data.

In one embodiment, an acquisition color gamut is identical to a display color gamut. In one embodiment, both the acquisition color gamut and the display color gamut are expanded color gamuts and/or include at least four primaries, e.g., 6P-B, 6P-C. Alternatively, the display color gamut (e.g., RGBCMY) has a larger volume than the acquisition color gamut (e.g., RGB). In yet another alternative embodiment, the display color gamut (e.g., RGB) has a smaller volume than the acquisition color gamut (e.g., RGBCMY). The device is preferably operable to convert image data from the acquisition color gamut to the display color gamut.

In one embodiment, rendering includes converting the raw image data into a color space, e.g., CIE 1931, ITU-R BT.2020. In a preferred embodiment, the device is operable to render the image data in a three-coordinate format wherein a first coordinate is a luminance or a luma value and a second and third coordinate are both colorimetric (chroma). As a non-limiting example, the three-coordinate format is Yxy, wherein Y is a luminance coordinate and wherein x and y are orthogonal colorimetric coordinates. The device is also operable to apply a transformation (e.g., a gamma compression) to the luminance coordinate to create a luma coordinate (e.g., Y'). Relative luminance values are also compatible. Alternative three-coordinate formats include, but are not limited to, L*a*b*, ICtCp, YCbCr, YUV, Yu'v', YPbPr, and/or YIQ. Alternatively, the device is operable to render the image data as XYZ data. In one embodiment, the device includes a user interface for accepting user input. In one embodiment, the raw image data is rendered based on the user input. In one embodiment, the device is operable to apply an opto-electronic transfer function (OETF) and an electro-optical transfer function (EOTF) to the image data. Alternatively, the device is operable to apply at least one non-linear function (e.g., an OOTF) to the image data. In one embodiment, the device includes at least one lookup table (LUT). The at least one LUT is operable to be implemented in hardware (e.g., in an FPGA) and/or in software. In one embodiment, rendering includes compressing the image data, e.g., using 4:2:2 sampling, 4:2:0 sampling. In one embodiment, rendering includes applying color gamut constraints for a target color gamut. Alternatively, the image data is not compressed (4:4:4 sampling).

In one embodiment, rendering further includes HDR processing to create a larger visible range of luminance in image data. Displaying HDR images typically requires application of at least one transfer function, e.g., PQ, hybrid log-gamma (HLG). In one embodiment, the device includes a PQ-compatible display and/or an HLG-compatible display to display HDR image data with the at least one transfer function applied. In one embodiment, the device is further operable to apply at least one tone mapping curve to image data, e.g., an S-curve, to preserve highlight and shadow detail. In one embodiment, the metadata includes information about the at least one transfer function and/or the at least one tone mapping curve.

Single Device Processing

In one embodiment, the device is further able to process and/or transform the rendered image data. In one embodiment, the device includes the encoder and the decoder of the present invention in a single unit. In one embodiment, the device is operable to store processed image data that is sent from the encoder to the decoder before the processed image data is decoded. Because the encoder and the decoder are located in the same device, data is transmitted between the encoder and the decoder over a wired connection. The wired connection does not require internet connectivity, BLUETOOTH, or any other type of wireless connection. Advantageously, storing data in intermediate formats creates backup data that is operable to be used in case of corrupted or lost image data. Alternatively, the device is operable to bypass encoding and/or decoding steps because the same device is operable for both image acquisition and image display. For example, the device does not encode the image data as an HDMI input and then decode the HDMI input with an HDMI receiver circuit because HDMI connection is not necessary for displaying the image data. In an alternative embodiment, the device is operable to encode the image data for display on an additional display device separate from the device in addition to displaying the image data on the display screen. Advantageously, in one embodiment, a bit depth of the image data is kept the same in the device throughout each step from acquisition to display.

In one embodiment, the device is operable to process and/or transform the image data internally, e.g., with an embedded ARM (advanced RISC (reduced instruction set computing) machine) processor. Alternatively, the device is operable for remote image processing. For example, the device is in network communication with a platform wherein the device is operable to send image data to the platform and receive image data from the platform. The platform is operable to process the image data. In one embodiment, the platform is hosted on a server, e.g., a cloud-based server, a server hosted on a distributed edge network. Alternatively, the device is operable for wired communication with an external processor (e.g., a computer, a tablet) for image processing. In one embodiment, the device further includes a user interface, wherein the user interface is operable to accept user input to edit the image data, e.g., a brightness, a saturation, a contrast. In one embodiment, the device is operable to edit the image data for a specific feature, e.g., skin tone correction.

In one embodiment, the device is operable to subsample the image data for display. Advantageously, storing and processing the image data in a three-coordinate system such as Yxy allows the chromaticity coordinates to be subsampled for display without affecting perception. As non-limiting examples, 4:2:2, 4:2:0, and 4:1:1 subsampling are compatible with the present invention. Alternatively, the image data is fully sampled. In one embodiment, the device is operable to decompress compressed image data.

In one embodiment, processing the image data for display includes applying color matching functions (CMFs). CMFs describe the chromatic response of the human eye using three functions of wavelength $\bar{x}(\lambda)$, $\bar{y}(\lambda)$, $\bar{z}(\lambda)$. While CIE 1931 CMFs are commonly used, modifications to CIE 1931 CMFs including, but not limited to, Judd in 1951, Vos in 1978, Stiles and Burch in 1959, Stockman and Sharpe (Sharpe, L. T., Stockman, A., Jagla, W., Jägle, H. 2011. A luminous efficiency function, $V^*D65(\lambda)$, for daylight adaptation: A correction. Color Research and Application, 36, 42-46), the CIE 10-degree CMFs in 1964, CIE S 014 published in 2006, CIE 170-1:2006 published in 2006, the CIE 2-degree XYZ CMFs published in 2012, and/or CIE 170-2:2015 published in 2015 are also compatible with the present invention. Each of these publications, which describe modifications to the CIE 1931 CMF based on a colorimetric observer, is incorporated herein by reference in its entirety. Modifications to the CIE 1931 CMFs address deviations from the linear mapping between XYZ and long medium short (LMS) color space, which represents human cone cell response to long, medium, and short wavelengths of visible light. These deviations from the original mapping are especially present in the blue color region. See also, e.g., CIE Proceedings (1964) Vienna Session, 1963, Vol. B, pp. 209-220 (Committee Report E-1.4.1), Bureau Central de la CIE, Paris; Speranskaya, N. I. (1959). Determination of spectrum color co-ordinates for twenty-seven normal observers. Optics and Spectroscopy, 7, 424-428; Stiles, W. S., & Burch, J. M. (1959) NPL colour-matching investigation: Final report. Optica Acta, 6, 1-26; Wyszecki, G., & Stiles, W. S. (1982). Color Science: concepts and methods, quantitative data and formulae. (2nd ed.). New York: Wiley; CIE. (1932). Commission Internationale de l'Éclairage Proceedings, 1931. Cambridge: Cambridge University Press; Stockman, A., Sharpe, L. T., & Fach, C. C. (1999). The spectral sensitivity of the human short-wavelength cones. Vision Research, 39, 2901-2927; Stockman, A., & Sharpe, L. T. (2000). Spectral sensitivities of the middle- and long-wavelength sensitive cones derived from measurements in observers of known genotype. Vision Research, 40, 1711-1737; Sharpe, L. T., Stockman, A., Jagla, W. & Jägle, H.(2005). A luminous efficiency function, $V^*(\lambda)$, for daylight adaptation. Journal of Vision, 5, 948-968; CIE (2006).

Fundamental chromaticity diagram with physiological axes. Parts 1 and 2. Technical Report 170-1. Vienna: Central Bureau of the Commission Internationale de l'Éclairage; Judd, D. B. (1951). Report of U.S. Secretariat Committee on Colorimetry and Artificial Daylight, Proceedings of the Twelfth Session of the CIE, Stockholm (pp. 11) Paris: Bureau Central de la CIE; and Vos, J. J. (1978). Colorimetric and photometric properties of a 2-deg fundamental observer. Color Research and Application, 3, 125-128, each of which is incorporated herein by reference in its entirety.

Single Device Display

In one embodiment, the device further includes a display. The display is preferably operable to display image data using greater than three primaries. In one embodiment, the display is operable to display colors outside of an ITU-R BT.2020 color gamut. In one embodiment, the display is operable to display at least 80% of a total area covered by the CIE-1931 color space. In one embodiment, the display is as described in U.S. Pat. No. 11,030,934, filed Oct. 1, 2020 and issued Jun. 8, 2021, which is incorporated herein by reference in its entirety. In one embodiment, the display is a screen, e.g., a liquid crystal display (LCD) screen, a light-emitting diode (LED) screen, an LED-backlit screen, an organic LED (OLED) screen, an active matrix OLED (AMOLED) screen, a quantum dot (QD) display, an LCD display using QD backlight, a perovskite display, and/or a laser display (e.g., using discrete modulation, grating modulation). In an alternative embodiment, the display includes at least one projector. The device is operable to display the image data after it has been acquired, rendered, and/or processed by the device. Additionally or alternatively, the device is operable to receive image data for display from an external source. In another embodiment, the display includes a plurality of display devices (e.g., screens, projectors).

In one embodiment, the device is operable to modify display parameters of the image data, including, but not limited to, a gamut, a frame rate, a sampling rate, an aspect ratio, a data format, metadata, and/or SDP parameters. In one embodiment, the display of the device is interchangeable. In one embodiment, the device is also operable to project the image data onto a second display wherein the second display is separate from the device. For example, the device is operable to cast the image data onto a second display wherein the second display mirrors the display of the device (e.g., via a wireless or wired connection). Alternatively, the second display extends the first display. The device is further operable to optimize the image data for display on the second display, e.g., by applying a tone curve, changing a resolution, changing a color space of the image data.

Augmented Reality/Virtual Reality

In one embodiment, the system includes a headset configured for virtual reality, augmented reality, and/or mixed reality environments ("AR/VR"). The headset preferably includes a display, an eyewear component, at least one power supply component, at least one image capturing device, and/or control electronics. In one embodiment, the headset is a pair of goggles. Alternatively, the headset is a pair of glasses. In one embodiment, the headset includes at least one strap and/or temples. In one embodiment, the power supply component includes at least one battery, at least one supercapacitor, or other similar power supply components. In another embodiment, the battery includes at least one rechargeable battery. In yet another embodiment, the at least one rechargeable battery includes a lithium ion battery.

The headset is configured to receive and display an image of a virtual scene, movie, and/or environment. The headset is further operable to receive audio data and communicate the audio data to a wearer via a speaker, headphones, and other similar audio playback devices. In one embodiment, the headphones are noise-cancelling headphones. The noise-cancelling headphones are configured to block out external noise such that the wearer is completely immersed in the AR/VR environment.

Examples of headsets and/or AR/VR systems include, but are not limited to, those described in U.S. Pat. Nos. 8,217, 856; 8,743,145; 9,094,677; 9,223,136; 9,635,450; 9,671, 614; 9,710,887; 9,733,480; 9,734,402; 9,766,462; 9,846, 483; 9,858,703; 9,897,812; 9,989,998; 10,025,060; 10,037, 084; 10,055,645; 10,055,887; 10,061,352; 10,061,391; 10,082,672; 10,102,674; 10,122,990; 10,124,251; 10,133, 305; 10,185,390; 10,209,769; 10,244,226; 10,254,547; 10,261,579; 10,318,007; 10,395,111; 10,419,731; 10,429, 647; 10,452,911; 10,540,003; 10,656,423; 10,656,822; 10,701,342; 10,769,438; 10,825,255; 10,838,206; 10,843, 067; 10,890,941; 10,911,734; 10,922,886; 10,928,613; 10,951,880; 10,979,681; 11,030,719; 11,055,879; 11,106, 276; 11,145,031; 11,145,096; 11,159,713; 11,170,678; 11,217,021; 11,228,745; 11,275,945; 11,281,290; and 11,288,027 and U.S. Patent Publication Nos. 20200049946, 20210243384, and 20220130103, each of which is incorporated herein by reference in its entirety.

In one embodiment, the at least one strap is configured to wrap around a wearer's head and attach to the eyewear component via at least one attachment mechanism. The at least one attachment mechanism includes a hook and loop fastener, a latch, a button, a buckle, a snap, a tie, a clip, and other similar attachment mechanisms. The at least one strap is adjustable to a wearer's head. Advantageously, this allows the headset to be used for wearers of different head sizes. For example, and not limitation, the at least one strap includes a tightening mechanism. In one embodiment, the tightening mechanism is configured to rotate in one direction and increase the tension in the head strap and rotate in the opposite direction to loosen the tension in the head strap. In yet another embodiment, the at least one strap includes at least two straps. In one embodiment, the at least two straps do not overlap and are in a parallel position around a wearer's head. Alternatively, the at least two straps are configured to intersect in the center of the back of a wearer's head to provide a tighter fit.

Advantageously, the headset is configured to provide minimal pressure to a wearer's face. In one embodiment, the headset includes a nose component. In one embodiment, a wearer's nose is operable to rest inside the nose component. In one embodiment, the nose component is adjustable. In one embodiment, the nose component is configured to move left, right, up, and/or down. In one embodiment, the nose component is operable to expand. Alternatively, the headset is designed to rest on the ridge of the wearer's nose. In yet another embodiment, the headset covers a wearer's entire face.

In one embodiment, the at least one image capturing device is a motion sensor camera. In one embodiment, the motion sensor camera is configured to capture a wearer's body movement. Additionally or alternatively, the at least one image capturing device includes a LIDAR camera. The at least one image capturing device is further operable to determine a wearer's positioning and provide at least one recommendation to correct a wearer's positioning based on the display.

The control electronics preferably include at least one processor. By way of example, and not limitation, the processor includes a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that is operable to perform calculations, process instructions for execution, and/or other manipulations of information. In one embodiment, one or more of the at least one processor is operable to run predefined programs stored in at least one memory of the control electronics.

The control electronics preferably includes at least one antenna, which allows the control electronics to receive and process input data (e.g., AR/VR settings) from at least one remote device (e.g., smartphone, tablet, laptop computer, desktop computer). In a preferred embodiment, the at least one remote device is in wireless network communication with the control electronics. The wireless communication is, by way of example and not limitation, radiofrequency, BLUETOOTH®, ZIGBEE®, WI-FI®, wireless local area networking, near field communication (NFC), or other similar commercially utilized standards. Alternatively, the at least one remote device is in wired communication with the control electronics through USB or equivalent.

In one embodiment, the at least one processor is a microcontroller. The microcontroller includes a transceiver, BLUETOOTH module, WI-FI module, a microprocessor, an ultra-low-power co-processor, read-only memory (ROM), random-access memory (RAM) (e.g., static random-access memory (SRAM)), flash memory, a power management unit, and/or a digital-to-analog converter.

In a preferred embodiment, the headset includes at least one sensor. The at least one sensor includes, but is not limited to, at least one gyroscope, at least one accelerometer, at least one magnetometer, and/or at least one eye tracker. The at least one sensor is preferably connected to the at least one processor. The at least one processor is operable to track and plot movement (e.g., user's head, user's eyes), for example, and not limitation, in an XYZ plane that is different than the at least one image capturing device. In one embodiment, the headset is operable to provide foveated rendering. Alternatively, the headset is operable to provide fixed foveated rendering.

In yet another embodiment, the AR/VR system is operable to receive wearer voice input data. The AR/VR system includes a microphone that is operable to receive and record a wearer's voice. The headset is further operable to change the display based on the wearer's words. For example, and not limitation, the AR/VR system is configured to receive the words "start virtual reality game" from a wearer, and activate the virtual reality game. The headset is operable to communicate, preferably wirelessly, with at least one remote device including, but not limited to, a mobile phone or a tablet. The mobile phone is operable to be any mobile phone that (1) is capable of running mobile applications and (2) is capable of communicating with the headset. The mobile phone includes, for example, an ANDROID™ phone, an APPLE® IPHONE®, or a SAMSUNG® GALAXY® phone. Likewise, the tablet is operable to be any tablet that (1) is capable of running mobile applications and (2) is capable of communicating with the headset. The tablet includes, for example, the 3G or 4G version of the APPLE® IPAD® or the 5G version of the Samsung Galaxy Tab S6.

Further in the AR/VR system, the remote device is in communication with a cellular network and/or a network. The network is operable to be any network for providing wired or wireless connection to the Internet, such as a local area network (LAN) or a wide area network (WAN).

In one embodiment, an AR/VR mobile application is installed and running at the remote device. The AR/VR system mobile application is implemented according to the type (i.e., the operating system) of remote device on which it is running. The AR/VR system mobile application is designed to receive wearer information from the headset. In one embodiment, the AR/VR mobile application is operable to provide graphical, audible, and/or tactile feedback to the wearer. In one embodiment, the AR/VR system is configured to develop a personalized profile based on a wearer's prior AR/VR environments and/or response. Additional details about personalization are included U.S. Provisional Patent Application No. 63/309,273, which is incorporated herein by reference in its entirety.

In one embodiment, the headset is operable to provide approximately 220° of viewing. Other ranges are compatible with the present invention. Color vision in humans is generally best in the central vision and decreases moving into the periphery (e.g., near peripheral, mid peripheral, and far peripheral). Full color vision extends about 30 degrees from the sight line. The angle of view at which a human loses the color perception varies by color frequency. Red and green acuity drops off between 30 and 40 degrees, then yellow, and finally blue at around 70 degrees. These limits are determined experimentally by turning a white or colored light on or off in the subject's peripheral vision. For example, at 40 degrees, subjects can tell a white light from a blue or yellow light, but cannot distinguish red or green. See, e.g., (1) Tilley, A. R., & Henry Dreyfuss Associates (Eds.). (2002). The measure of man and woman: Human factors in design (Rev. ed). Wiley and (2) Hansen, T., Pracejus, L. and Gegenfurtner, K R. Color perception in the intermediate periphery of the visual field. Journal of Vision 9(4):26, (2009), 1-12, each of which is incorporated herein by reference in its entirety.

Maximum eye rotation right or left from the sight line is 35 degrees, but the eyes seldom move that far to look at something; rather, the head moves with the eyes at about 5-10 degrees. For near displays, there is a problem introduced by the change in distance and angle in relationship to the display. Specifically, things visible in the periphery are operable to disappear when the subject looks in that direction, which does not occur in the real world. See also, e.g., McDowall, Ian. (2014). Head mounted display engineering: human factors to optical design. SIGGRAPH 2014 (Vancouver), which is incorporated herein by reference in its entirety. Advantageously, near-eye displays and/or headsets are operable to use the super saturated color system described above to save bandwidth and reduce latency. In one embodiment, the super saturated color system is used within 30 degrees of where a subject is looking. For example, and not limitation, for 70 degrees off axis or more, the display is operable to be monochrome. Further, humans are very sensitive to motion and flicker in the peripheral vision, but less so in the center of vision. In one embodiment, the headset is a multi-primary display that covers 30-35 degrees off of the sight line.

The AR/VR system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The AR/VR system is operable to use any of the aforementioned learning techniques alone or in combination.

Further, the AR/VR system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The AR/VR system is preferably operable to recommend and/or perform actions based on historical data, external data sources, ML, AI, NNs, and/or other learning techniques. The AR/VR system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Figure 45:
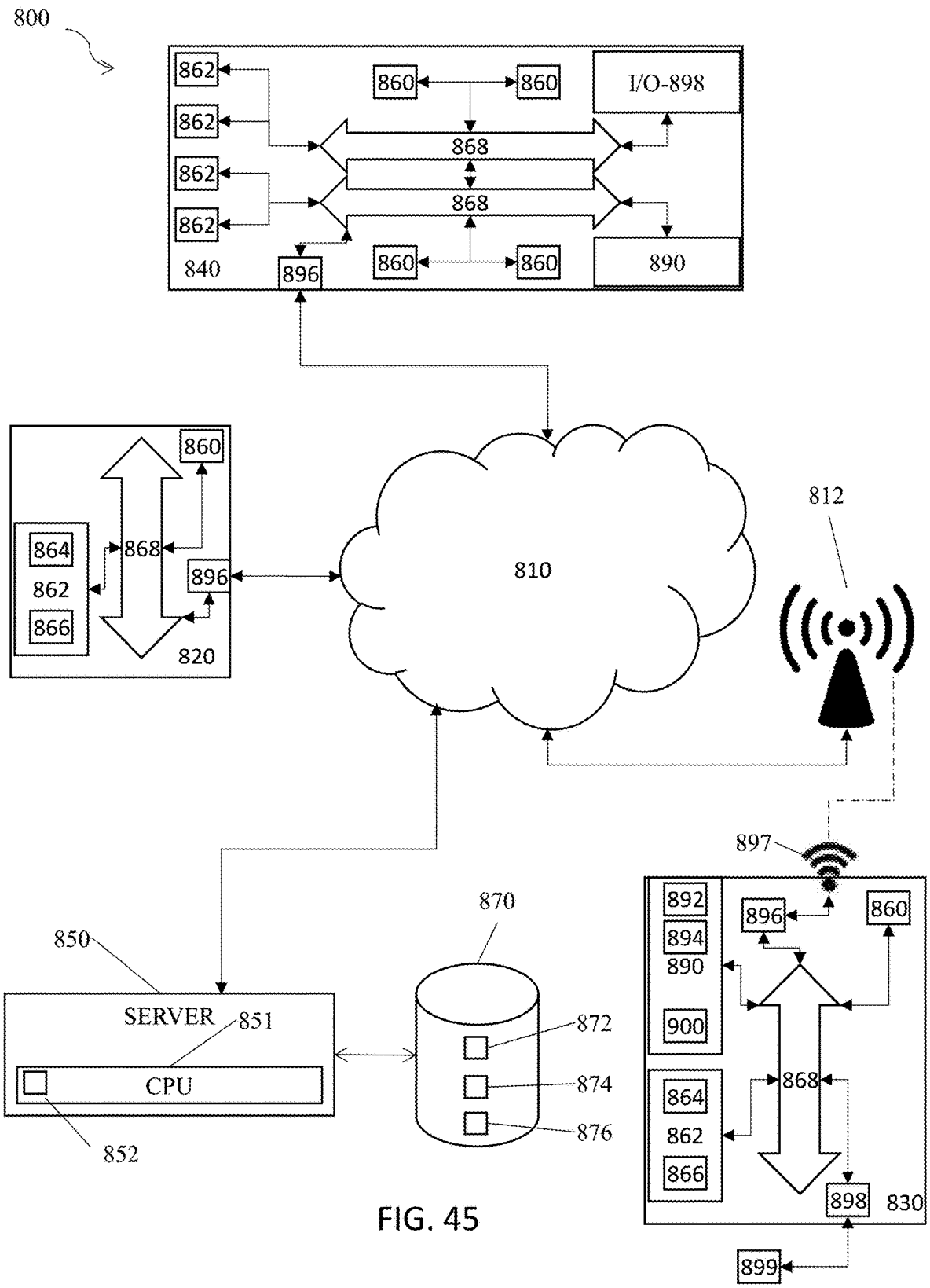
FIG. 45 is a schematic diagram of an embodiment of the invention illustrating a computer system.

FIG. 45 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFD)), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, notebook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 45 multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840 through a network 810. A computing device 830 may connect to a network 810 through a network interface unit 896 connected to a bus 868. Computing devices may communicate communication media through wired networks, direct-wired connections or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any deliver media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology, discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for computing devices 820, 830, and 840. The distributed computing devices 820, 830, and 840 are connected to an edge server in the edge computing network based on proximity, availability, latency, bandwidth, and/or other factors.

It is also contemplated that the computer system 800 may not include all of the components shown in FIG. 45 may include other components that are not explicitly shown in FIG. 45 or may utilize an architecture completely different than that shown in FIG. 45. The various illustrative logical blocks, modules, elements, circuits, and algorithms described in connection with the embodiments discussed herein may be implemented as electronic hardware, computer software, or combinations of both. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or positioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present

The invention claimed is:

1. A system for displaying a primary color system, comprising:
    a set of image data including a set of primary color signals, wherein the set of primary color signals corresponds to a set of values in a color space, wherein the set of values in the color space includes two colorimetric coordinates and a luminance;
    an image data converter operable to encode and decode the set of values in the color space; and
    at least one viewing device;
    wherein the at least one viewing device and the image data converter are in network communication;
    wherein the encode and the decode includes transportation of processed data;
    wherein the processed data includes data related to a relative luminance and the two colorimetric coordinates;
    wherein the image data converter is operable to convert the set of image data for display on the at least one viewing device;
    wherein the at least one viewing device is operable to display the primary color system based on the set of image data; and
    wherein the relative luminance increases as a distance of a chroma of the two colorimetric coordinates increases from a neutral point or a white point of the at least one viewing device.

2. The system of claim 1, wherein the primary color system displayed on the at least one viewing device is based on the set of image data.

3. The system of claim 1, wherein the image data converter is operable to convert the set of primary color signals to the set of values in the color space.

4. The system of claim 1, wherein the image data converter is operable to convert the set of values in the color space to a plurality of color gamuts.

5. The system of claim 1, wherein the image data converter is operable to fully sample the processed data related to the relative luminance and subsample the processed data related to the two colorimetric coordinates.

6. The system of claim 1, wherein the processed data related to the relative luminance and the two colorimetric coordinates are fully sampled.

7. The system of claim 1, wherein a white value corresponds to the white point of the at least one viewing device.

8. The system of claim 1, wherein the encode includes converting the set of primary color signals to XYZ data and then converting the XYZ data to create the set of values in the color space.

9. The system of claim 1, wherein the decode includes converting the processed data to XYZ data and then converting the XYZ data to a format operable to display on the at least one viewing device.

10. The system of claim 1, wherein the luminance is converted to the relative luminance using at least one linear function, at least one non-linear function, or at least one lookup table (LUT).

11. The system of claim 1, wherein the relative luminance is equal to or lower than the luminance.

12. The system of claim 1, wherein the encode includes scaling of the two colorimetric coordinates, thereby creating scaled colorimetric coordinates, and wherein the decode includes rescaling of the scaled colorimetric coordinates.

13. The system of claim 1, wherein the encode includes application of a data range reduction function with a value between about 0.25 and about 0.9 and the decode includes application of an inverse data range reduction function with a value between about 1.1 and about 4.

14. The system of claim 1, wherein the primary color system is a Red, Green, and Blue (RGB) primary system or a multi-primary system.

15. The system of claim 1, wherein the white point of the at least one viewing device has a limited luminance.

16. The system of claim 1, wherein the image data converter does not modify primary colors within a specified hue angle range and a specified chroma range.

17. A system for displaying a primary color system, comprising:
- an image data converter operable to encode and decode a set of values corresponding to a set of primary color signals in a color space; and
- at least one viewing device;
- wherein the set of values in the color space includes two colorimetric coordinates and a luminance;
- wherein the at least one viewing device is operable to receive data from the image data converter;
- wherein the encode and the decode includes transportation of processed data;
- wherein the processed data includes data related to a relative luminance and the two colorimetric coordinates;
- wherein the image data converter is operable to convert the set of image data for display on the at least one viewing device;
- wherein the at least one viewing device is operable to display the primary color system based on the set of image data; and
- wherein the relative luminance increases as a distance of a chroma of the two colorimetric coordinates increases from a neutral point or a white point of the at least one viewing device.

18. The system of claim 17, wherein the luminance is converted to the relative luminance using at least one linear function, at least one non-linear function, or at least one lookup table.

19. A method for displaying a primary color system, comprising:
- providing a set of image data including a set of primary color signals, wherein the set of primary color signals corresponds to a set of values in a color space, wherein the set of values in the color space includes two colorimetric coordinates and a luminance;
- encoding the set of image data in the color space;
- decoding the set of image data in the color space; and
- the image data converter converting the set of image data for display on the at least one viewing device;
- wherein the encoding and the decoding include transportation of processed data, wherein the processed data includes data related to a relative luminance and the two colorimetric coordinates;
- wherein the at least one viewing device is operable to display the primary color system based on the set of image data; and
- wherein the relative luminance increases as a distance of a chroma of the two colorimetric coordinates increases from a neutral point or a white point of the at least one viewing device.

20. The method of claim 19, wherein the luminance is converted to the relative luminance using at least one linear function, at least one non-linear function, or at least one lookup table (LUT).

* * * * *